(12) United States Patent
Sato et al.

(10) Patent No.: US 7,230,064 B2
(45) Date of Patent: Jun. 12, 2007

(54) PROCESS FOR THE PREPARATION OF URETHANE RESINS AND URETHANE RESIN COMPOSITIONS

(75) Inventors: Shinichi Sato, Urawa (JP); Akihiro Sato, Kokubunji (JP)

(73) Assignee: Konishi Co., Ltd., Osaka (JP)

( * ) Notice: Subject to any disclaimer, the term of this patent is extended or adjusted under 35 U.S.C. 154(b) by 70 days.

(21) Appl. No.: 10/085,213

(22) Filed: Feb. 28, 2002

(65) Prior Publication Data

US 2003/0092867 A1 May 15, 2003

Related U.S. Application Data

(62) Division of application No. 09/242,525, filed as application No. PCT/JP98/02661 on Jun. 17, 1998.

(30) Foreign Application Priority Data

Jun. 17, 1997 (JP) .................... P9-160079

(51) Int. Cl.
  C08G 18/32  (2006.01)
  C08G 18/38  (2006.01)
  C08G 18/62  (2006.01)
  C08G 18/64  (2006.01)
  C08G 18/77  (2006.01)

(52) U.S. Cl. .................... 528/28; 528/29

(58) Field of Classification Search ............. 528/28, 528/29
See application file for complete search history.

(56) References Cited

U.S. PATENT DOCUMENTS

| 4,067,844 | A | | 1/1978 | Barron et al. ............. 260/37 N |
| 4,889,903 | A | * | 12/1989 | Baghdachi ................. 528/17 |
| 5,272,224 | A | * | 12/1993 | Baghdachi et al. ......... 525/460 |
| 5,364,955 | A | * | 11/1994 | Zwiener et al. ............. 556/418 |
| 5,468,791 | A | | 11/1995 | Yuan .......................... 524/108 |
| 5,614,604 | A | | 3/1997 | Krafcik ....................... 528/28 |
| 6,001,946 | A | * | 12/1999 | Waldman et al. ............ 528/28 |

FOREIGN PATENT DOCUMENTS

| EP | 0 596 360 A1 | 5/1994 |
| EP | 0 676 403 A1 | 10/1995 |
| JP | 06-211879 | 8/1994 |
| JP | 10-204144 | 8/1998 |

OTHER PUBLICATIONS

Sukejima et al: "Acrylic Polyurethane Coating Compositions" Chemical Abstracts and Indexes, American Chemical Society. Columbus, Ohio, US, vol. 16, No. 118, Apr. 19, 1993; XP0900404729; 1 page.

Database WPI, Section Ch, Week 198721, Derwent Publications Ltd., London, GB; AN 1987-147652, XP002302637 & JP 62 086026 A, Apr. 20, 1987, Abstract; 1 page.

Database WPI, Section Ch, Week 199004, Derwent Publications Ltd., London, GB; AN 1990-027908, XP002302954 & JP 01 307475 A, Dec. 12, 1989, Abstract, 1 page.

* cited by examiner

*Primary Examiner*—Rabon Sergent
(74) *Attorney, Agent, or Firm*—Thomas, Kayden, Horstemeyer & Risley, LLP

(57) ABSTRACT

A process for the preparation of urethane resins, which comprises the steps of: preparing a product(A) having a hydrolysable group directly bonded to 1–10 silicon atoms and having less than two secondary amino groups in one molecule; preparing a product(B) having a terminal isocyanate group in an amount 4% or less by weight of said product(B); and reacting said product(A) with said product (B) in proportions of at least 0.5 equivalent of the product (A) per free NCO group of said product(B). The process can readily give urethane resins which exhibit excellent storage stability and are enhanced in the degrees of freedom of physical properties of products of curing.

4 Claims, 2 Drawing Sheets

PROCESS FOR THE PREPARATION OF URETHANE RESINS AND URETHANE RESIN COMPOSITIONS

Division of U.S. patent application Ser. No. 09/242,525, filed on Feb. 17, 1999, files as a national phase of international application No. PCT/JP98/02661, filed on Jun. 17, 1998, which claims priority to Japanese Application No. 9-160079, filed on Jun. 17, 1997.

FIELD OF THE INVENTION

The present invention relates to a process for the preparation of urethane resins and urethane resin compositions. More particularly, the present invention relates to a process for the preparation of urethane resins endowed with fast curing property and non-foaming property by modification of the terminal of an isocyanate resin and urethane resin compositions.

DESCRIPTION OF THE RELATED ART

An isocyanate group terminal moisture-curing type resin has excellent adhesion against wide range of materials to be adhered, however, when the isocyanate group content is low, there are defects that long period of time is necessary for curing though it forms an excellent elastomer, and storage stability is poor depending on the kind of the isocyanate compound, and the like. There are trials for reducing curing time that a prepolymer is produced using partially an amine polyol, various catalysts are used, and the like, however, effects thereof are not sufficient. Japanese Patent Application Publication (JP-B) No. 2594024 shows a method for producing a urethane resin in which a urethane prepolymer is terminally-capped with an arylaminosilane, however, there are problems that the production of the arylaminosilane is expensive, and the like.

Further Japanese Patent Application Laid-Open (JP-A) No. 8-283367 describes a wet-curing resin composition obtained by compounding a polymerization inhibitor of a free mercapto group into a urethane prepolymer system containing an alkoxysilyl group and a free mercapto group. This composition aims for improvement of curing inhibition due to the reaction of the urethane prepolymer with the mercaptosilane, however, the curing speed can not be evaluated sufficient. Moreover, if a urethane prepolymer is wished to be modified only with a mercaptosilane, curing inhibition is caused when the amount of the mercaptosilane is over equivalent to the amount of the isocyanate (in the case of use of a usual tin catalyst), and thickening can not be avoided due to the remaining isocyanate and control of the reaction is extremely difficult when the amount of the mercaptosilane is too low.

Recently, in adhesion of different materials having different expansion coefficients, elastic resins are noticed and use range thereof is enlarged since it has been found that such resins have various excellent properties. The elastic resins naturally manifest value as a base for sealing materials. Further, there exists background that one-liquid adhesives containing no solvent should be increasingly required from now on in view of environmental problems, workability and the like. For producing a urethane elastic adhesive which is relatively cheap, the content of an isocyanate group has to be restricted to at most 5% by weight or less, and particularly when sufficient elongation is expected, the content has to be restricted to 4.0% by weight or less. In this case, however, the following problems occur. (1) Storage stability deteriorates depending on the kind of isocyanate compounds, and particularly in the case of an aromatic compound, it significantly deteriorates. (2) Curing is delayed significantly irrespective of the kind of isocyanate compounds, and particularly in the case of an aromatic compound, the delay is remarkable. (3) Foaming, and reduction in physical properties and adhesion due to low content of an isocyanate group may occur. For solving these problems, various means as described in the conventional technologies have been tried, however, complete solution has not been accomplished yet.

Though it is believed that reactivity can be solved by introducing a reactive group such as a hydrolyzable group-containing silyl group, hydrolyzable group-containing titanate group, epoxy group, (meta)acryloyl group, vinyl group, ethynylene group and the like into the terminal of a molecule, the problem is means thereof. When a primary amino group-containing alkoxysilane is solely used for modification, securing of safety is extremely difficult. Further, isocyanate silane compounds for which application of aryl-modification and other modification methods as described in the conventional technologies are easily thought out include problems such as high cost and the like.

Namely, the present invention has been accomplished for solving the above-described conventional problems, and an object thereof is to provide a process for the preparation of urethane resins which can easily produce urethane resins having features that modification of the terminal of a molecule is easy, curing speed is fast, degree of freedom of physical properties of a cured material is extremely high.

For attaining the above-described object, the present inventors have been intensively studied and as a result, have found a modification method by which modification of the terminal of a molecule can be easily conducted even in a urethane prepolymer having low isocyanate group content, and which provides excellent curing property and storage stability, and found that there exists a system in which physical properties of a cured material and curing time can be freely modified by controlling the amount and modification method thereof in modifying a terminal isocyanate group or isocyanate monomer in a urethane prepolymer with the modified compounds, further have found that cost reduction per unit weight is possible even with the above-described arylaminosilane and isocyanatesilane by modification using a second component and that a mercapto group-containing silane coupling agent can be used by contriving use method and modification method thereof, completing the present invention.

DISCLOSURE OF THE INVENTION

Namely, in one aspect, the present invention relates to a process for the preparation of urethane resins (hereinafter, referred to as preparation process (1)), which comprises the steps of (1) reacting one or more compounds selected from a zircoaluminate compound and a compound (compound (a)) which has an organic group (I) carrying at least one group selected from primary amino, secondary amino, acryloyl, hydroxy, epoxy and mercapto groups in the group and has a hydrolyzable group selected from alkoxy, acetoxy and oxime groups directly bonded to 1 to 10 silicon or titanium atoms, with one or more organic compounds (compound (b)) which can produce a compound having a secondary amino or hydroxy group by reacting with the organic group (I) or zircoaluminate compound, simultaneously or sequentially, to produce a zircoaluminate reaction product or compound (product A) having less than 2, preferably from 0.2 to 1.5 secondary amino or hydroxy groups in one molecule and having the hydrolyzable group directly bonded to 1 to 10 silicon or titanium atoms, (2) reacting one or more compounds or products selected from a polyol compound (compound (c)), a polythiol compound (compound (c-1)) and a product C obtained in the following step (4), with one or more compounds selected from a polyisocyanate compound (compound (d)) and a polyisothiocyanate (compound (d-1)), to produce a (thio) urethane prepolymer (product B) containing terminal isocyanate and/or isothiocyanate groups in an amount of 4% by weight or below, and (3) reacting the product A with the product B in proportions of at least 0.5 equivalent or more, preferably from 0.5 to 10 equivalent of the product A per free isocyanate and/or isothiocyanate group of the product B:

Step (4): a compound (compound (e)) having at least one group (II) selected from amino, acryloyl, epoxy and mercapto groups at the terminal of the molecule and having a number-average molecular weight of 50 to 25000 is reacted with a compound (compound (f)) which can produce a compound having a secondary amino or hydroxy group by reacting with the group (II), to produce a compound (product (c)) having 0.2 or more secondary amino or hydroxy groups at the terminal of the molecule and having a number-average molecular weight of 50 to 25000.

In another aspect, the present invention relates to a process for the preparation of urethane resins (hereinafter, referred to as preparation process (2)) in which the above-described product A, and one or more compounds selected from a compound (compound (g)) which has an organic group (III) carrying a primary amino, secondary amino, hydroxy and/or mercapto group in the group and has a hydrolyzable group selected from alkoxy, acetoxy and oxime groups directly bonded to 1 to 10 silicon or titanium atoms, a zircoaluminate compound and a compound (compound (h)) having an organic group reactive with an isocyanate or isothiocyanate group are reacted simultaneously or sequentially in proportions of at least 0.5 equivalent or more, preferably from 0.5 to 10 equivalent of the total amount of the above-described product A and one or more compounds per free isocyanate and/or isothiocyanate group of the above-described product B.

In the preparation process (1) and preparation process (2) of the present invention, the above-described compound (a) is a compound (compound (a-1)) in which the above-described organic group (I) is a group having one primary amino group, and the above-described compound (b) is an α, β-unsaturated carbonyl compound or α, β-unsaturated nitrile compound (compound (i)).

In the preparation process (1) and preparation process (2) of the present invention, the above-described compound (a) is a compound (compound (a-2)) in which the above-described organic group (I) is a group having 2 or more primary or secondary amino groups or at least one primary amino group and secondary amino group, and the above-described compound (b) is the above-described compound (i), a compound (compound (l)) having less than 2, preferably from 0.2 to 1.5 isocyanate groups and/or isothiocyanate groups in the molecule obtained by reacting a compound (compound (j)) having 2 or more isocyanate groups and/or isothiocyanate groups with a compound (compound (k)) having 1 to 2 active hydrogen atoms reactive with an isocyanate or isothiocyanate group in the molecule, or a monoisocyanate compound or monoisothiocyanate compound (compound (m)).

In the preparation process (1) and preparation process (2) of the present invention, the above-described compound (k) is a compound selected from a monoalcohol, monoprimary amine, monosecondary amine, monoamide compound, monomalonyl compound, monocarboxylic acid and monothiol.

In the preparation process (1) and preparation process (2) of the present invention, the above-described compound (a) is a compound (compound (a-3)) in which the above-described organic group (I) is a group having an acryloyl group, and the above-described compound (b) is a monoprimary amine compound (compound (n)), or a compound (compound (o)) having 2 or more primary or secondary amino groups, or at least one primary amino group and secondary amino group.

In the preparation process (1) and preparation process (2) of the present invention, the above-described silicon compound (a) is a compound (compound (a-4)) in which the above-described organic group (I) is a group having an epoxy group, and the above-described compound (b) is a compound (compound (p)) having 0.2 or more active hydrogen atoms.

In the preparation process (1) and preparation process (2) of the present invention, the above-described compound (a) is a compound (compound (a-5)) in which the above-described organic group (I) is a group having a mercapto group or a compound (compound (a-2)) in which the above-described organic group (I) is a group having an amino group, and the above-described compound (b) is a compound having at least one epoxy group, a hydroxy group-containing acrylate, a hydroxy group-containing maleimide, a compound (compound (q)) having at least one allyl group and one hydroxy group, a compound (compound (r)) having at least one epoxy group and having a hydrolyzable group selected from alkoxy, acetoxy and oxime groups directly bonded to 1 to 10 silicon or titanium atoms, or a zircoaluminate compound.

In the preparation process (1) and preparation process (2) of the present invention, the above-described compound (a) is a compound (compound (a-6)) in which the above-described organic group (I) is a group having a hydroxy group, and the above-described compound (b) is the above-described compound (l) or the above-described compound (m).

In further aspect, the present invention relates to a process for the preparation of urethane resins (hereinafter, referred to as preparation process (3)), which comprises the steps of (1) reacting the above-described compound (a-3) and the above-described compound (n) or the above-described compound (o), then, reacting one or more compounds selected from the above-described compound (i), the above-described compound (l) and the above-described compound (m) simultaneously or sequentially to produce a compound (product D) having less than 2, preferably from 0.2 to 1.5 secondary amino or hydroxy groups in one molecule and having the hydrolyzable group directly bonded to 1 to 10 silicon atoms, and (2) reacting the product D with the product B in proportions of at least 0.5 equivalent or more, preferably from 0.5 to 10 equivalent of the product D per free isocyanate and/or isothiocyanate group of the product B.

In further aspect, the present invention relates to a process for the preparation of urethane resins (hereinafter, referred to as preparation process (4)), which comprises the steps of (1) reacting the above-described compound (a-4) and the above-described compound (p), then, reacting one or more compounds selected from the above-described compound (i), the above-described compound (l) and the above-described compound (m) simultaneously or sequentially to produce a compound (product E) having less than 2, preferably from 0.2 to 1.5 secondary amino or hydroxy groups in one molecule and having the hydrolyzable group directly bonded to 1 to 10 silicon or titanium atoms, and (2) reacting the product E with the product B in proportions of at least 0.5 equivalent or more, preferably from 0.5 to 10 equivalent of the product E per free isocyanate and/or isothiocyanate group of the product B.

In further aspect, the present invention relates to a process for the preparation of urethane resins (hereinafter, referred to as preparation process (5)), which comprises the steps of (1) reacting the above-described compound (a-5) and/or the above-described compound (a-2) and, the above-described compound (q), the above-described compound (r) or a zircoaluminate compound, then, reacting one or more compounds selected from the above-described compound (i), the above-described compound (l) or the above-described compound (m) simultaneously or sequentially to produce a compound (product F) having less than 2, preferably from 0.2 to 1.5 secondary amino or hydroxy groups in one molecule and having the hydrolyzable group directly bonded to 1 to 10 silicon or titanium atoms, and (2) reacting the product F with the product B in proportions of at least 0.5 equivalent or more, preferably from 0.5 to 10 equivalent of the product F per free isocyanate and/or isothiocyanate group of the product B.

In further aspect, the present invention relates to a process for the preparation of urethane resins (hereinafter, referred to as preparation process (6)) in which a compound (compound (s)) having one hydroxy group and having a hydrolyzable group selected from alkoxy, acetoxy and oxime groups directly bonded to a silicon atom is reacted with the above-described product B in proportions of 1 equivalent, preferably from 1 to 10 equivalent of the above-described compound (s) per free isocyanate and/or isothiocyanate group of the above-described product B.

In further aspect, the present invention relates to a process for the preparation of urethane resins (hereinafter, referred to as preparation process (7)), which comprises the steps of (1) reacting a compound (compound (t)) having over one hydroxy groups and one or more (meta)acryloyl groups with one or more compounds selected from the above-described compound (l) and the above-described compound (m) simultaneously or sequentially to produce a compound (product (G)) having less than 2, preferably from 0.2 to 1.5 hydroxy groups in one molecule and having at least one (meta) acryloyl group, and (2) reacting the above-described product B with the above-described product G or a compound (compound (t-1)) having one hydroxy group and at least one (meta)acryloyl group in an amount of 0.1 to 5 equivalent, or with the above-described product G or the above-described compound (t-1) in an amount of 0.1 to 5 equivalent and the above-described product A in an amount of 0.2 equivalent or more per free isocyanate and/or isothiocyanate group of the product B.

In further aspect, the present invention relates to a process for the preparation of urethane resins (hereinafter, referred to as preparation process (8)), which comprises the steps of (1) reacting a compound (compound (u)) having over one hydroxy groups and one or more epoxy groups with one or more compounds selected from the above-described compound (l) and the above-described compound (m) simultaneously or sequentially to produce a compound (product (H)) having less than 2, preferably from 0.2 to 1.5 hydroxy groups in one molecule and having at least one epoxy group, and (2) reacting the above-described product B with the above-described product H or a compound (compound (u-1)) having one hydroxy group and at least one hydroxy group in an amount of 0.1 to 5 equivalent, or with the above-described product H or the above-described compound (u-1) in an amount of 0.1 to 5 equivalent and the above-described product H in an amount of 0.9 equivalent or less per free isocyanate and/or isothiocyanate group of the product B, then reacting the product with the above-described product A in an amount of less than 6 equivalent per epoxy group of the above-described compound (u-1) or the above-described product H.

In further aspect, the present invention relates to a process for the preparation of urethane resins (hereinafter, referred to as preparation process (9)), which comprises the steps of (1) reacting a compound (compound (v)) having 2 or more epoxy or acryloyl groups in the molecule with a zircoaluminate compound or a compound (compound (w)) which has an organic group (VI) carrying at least one group selected from primary amino, secondary amino and mercapto groups in the group and has a hydrolyzable group selected from alkoxy, acetoxy and oxime groups directly bonded to 1 to 10 silicon or titanium atoms in an amount of 0.5 to 2 equivalent based on the above-described compound (v), then reacting one or more compounds selected from the above-described compound (i), the above-described compound (l) and the above-described compound (m) simultaneously or sequentially, to produce a zircoaluminate reaction product or compound (product I) having less than 2, preferably from 0.2 to 1.5 secondary amino or hydroxy groups in one molecule and having the hydrolyzable group directly bonded to 1 to 10 silicon or titanium atoms, and (2) reacting the above-described product I with the above-described product B in proportions of at least 0.5 equivalent or more, preferably from 0.5 to 10 equivalents of the above-described product I per free isocyanate and/or isothiocyanate group of the above-described product B.

In further aspect, the present invention relates to a process for the preparation of urethane resins (hereinafter, referred to as preparation process (10)), which comprises the steps of (1) reacting a compound (compound (x)) having over one groups reactive with a isocyanate and/or isothiocyanate group and at least one epoxy, (meta)acryloyl, vinyl or ethynylene group with one or more compounds selected from the above-described compound (i), the above-described compound (l) and the above-described compound (m) simultaneously or sequentially to produce a compound (product (J)) having less than 2, preferably from 0.2 to 1.5 hydroxy or amino groups in one molecule and having at least one epoxy, (meta) acryloyl, vinyl or ethynylene group, and (2) reacting the above-described product B with the above-described product J or a compound (compound (x-1)) having one group reactive with an isocyanate and/or isothiocyanate group and at least one epoxy, (meta)acryloyl, vinyl or ethynylene group in an amount of 0.1 to 5 equivalent, or with the above-described product J or the above-described compound (x-1) in an amount of 0.1 to 5 equivalent and the above-described product A in an amount of 0.9 equivalent or less per free isocyanate and/or isothiocyanate group of the product B, then reacting the product with the above-described product A in an amount of less than 6 equivalent based on the above-described compound (x-1) or the above-described product J to produce a reaction product (product K), and further curing the product K with a curing agent.

In further aspect, the present invention relates to a process for the preparation of urethane resins (hereinafter, referred to as preparation process (11)), which comprises the steps of (1) polymerizing a (meta)acryloyl group-containing monomer, a hydroxy group-containing (meta)acrylate and/or a silicon compound (compound (y)) having at least a (meta) acryloyl group and having a hydrolyzable group selected from alkoxy, acetoxy and oxime groups directly bonded to 1 to 10 silicon atoms in the presence of one or more compounds or products selected from the above-described compound (c), the above-described compound (c-1) and the above-described product C to obtain a polymer (product L), (2) reacting the product L with one or more compounds selected from the above-described compound (d) and the above-described compound (d-1) to produce a (thio)urethane prepolymer (product M) containing an isocyanate and/or isothiocyanate group on the terminal thereof in an amount of 4% by weight or less, and (3) reacting one or more products or compounds selected from the above-described product A, the above-described product D, the above-described product E, the above-described product F, the above-described product I, the above-described product (a-1), the above-described product (a-2), the above-described product (g), the above-described product (h), the above-described product (k), the above-described product (o), the above-described product (p), the above-described product (q), the above-described product (s), the above-described product (t), the above-described product (t-1), the above-described product (u) and the above-described product (u-1) with the above-described product M simultaneously or sequentially in proportions of the above-described one or more products or compounds of 0.5 equivalent or more, preferably from 0.5 to 10 equivalent per free isocyanate and/or isothiocyanate group of the above-described product M.

In further aspect, the present invention relates to a process for the preparation of urethane resins (hereinafter, referred to as preparation process (12)) in which the above-described product B or the above-described product M is reacted with one or more products or compounds selected from the above-described product D, the above-described product E, the above-described product F, the above-described product I, the above-described product (a-1), the above-described product (a-2), the above-described product (g), the above-described product (h), the above-described product (k), the above-described product (o), the above-described product (p), the above-described product (q), the above-described product (s), the above-described product (t), the above-described product (t-1), the above-described product (u) and the above-described product (u-1) simultaneously or sequentially in proportions of the total amount of the above-described compound A and the above-described one or more products or compounds of 0.5 equivalent or more, preferably from 0.5 to 10 equivalent per free isocyanate and/or isothiocyanate group of the above-described product B or the above-described product M.

In further aspect, the present invention relates to a process for the preparation of urethane resins (hereinafter, referred to as preparation process (13)) in which the above-described product B or the above-described product M is reacted with a zircoaluminate compound or a compound (compound (z)) which has an organic group carrying a mercapto group on the terminal in an amount of less than 1 equivalent per free isocyanate and/or isothiocyanate group of the above-described product B or the above-described product M and has a hydrolyzable group selected from alkoxy, acetoxy and oxime groups directly bonded to 1 to 10 silicon or titanium atoms, then, one or more products or compounds selected from the above-described product A, the above-described product D, the above-described product E, the above-described product F, the above-described product I, the above-described product (a-1), the above-described product (a-2), the above-described product (g) (excepting compounds having a mercapto group), the above-described product (h) (excepting compounds having a mercapto group), the above-described product (k), the above-described product (o), the above-described product (p), the above-described product (q), the above-described product (s), the above-described product (t), the above-described product (t-1), the above-described product (u) and the above-described product (u-1) and zircoaluminate compound are reacted in proportions of the total amount with the above-described compound (z) or zircoaluminate compound of 0.5 equivalent or more, preferably from 0.5 to 10 equivalent per the above-described isocyanate and/or isothiocyanate group.

In further aspect, the present invention relates to a process for the preparation of urethane resins (hereinafter, referred to as preparation process (14)), which comprises the steps of (1) reacting a zircoaluminate compound and a compound (compound (ab)) which has at least one active hydrogen atom reactive with an isocyanate or isothiocyanate group in the molecule and has a hydrolyzable group selected from alkoxy, acetoxy and oxime groups directly bonded to 1 to 10 silicon or titanium atoms with one or more compounds selected from the above-described compound (l), the above-described compound (m) and the above-described compound (i) simultaneously or sequentially to produce a zircoaluminate reaction product or compound (product N) having less than 2, preferably from 0.2 to 1.5 active hydrogen atoms reactive with an isocyanate or isothiocyanate group in the molecule and having the hydrolyzable group directly bonded to 1 to 10 silicon or titanium atoms, (2) reacting the product N with the above-described compound (j) or a compound (compound (bb)) having 1.1 or more isocyanate or isothiocyanate groups in the molecule obtained by reacting the above-described compound (j) with the above-described compound (k) to produce a silicon compound (product O) having less than 2, preferably from 0.2 to 1.5 isocyanate or isothiocyanate groups in the molecule and having the hydrolyzable group directly bonded to at least one silicon or titanium atom, and (3) reacting the product O with one or more compounds or products selected from the above-described compound (c), the above-described compound (c-1), a compound (compound (cb)) having at least one primary amino or secondary amino group in the molecule, the above-described product C and the above-described product L.

In the preparation process (14) of the present invention, the above-described compound (ab) is a compound carrying at least one group selected from primary amino, secondary amino, mercapto and hydroxy groups, and the above-described compound (k) is a compound selected from monoalcohol, monoprimary amine, monosecondary amine, monomalonyl compound, monocarboxylic acid, monothiol and monoamide compound.

In further aspect, the present invention relates to a process for the preparation of urethane resins (hereinafter, referred to as preparation process (15)), which comprises the steps of (1) reacting a compound (compound (db)) which has at least one active hydrogen atom reactive with an isocyanate or isothiocyanate group in the molecule and has at least one organic group (VII) selected from epoxy, (meta)acryloyl, vinyl and ethynylene groups with one or more compounds selected from the above-described compound (l), the above-described compound (m) and the above-described compound (i) simultaneously or sequentially to produce a compound (product P) having less than 2, preferably from 0.2 to 1.5 active hydrogen atoms reactive with an isocyanate or isothiocyanate group in the molecule and having at least one organic group (VII), (2) reacting the product P with the above-described compound (j) or the above-described compound (compound (bb)) to produce a compound (product Q) having less than 2, preferably from 0.2 to 1.5 isocyanate or isothiocyanate groups in the molecule and having at least one organic group (VII), and (3) reacting the product Q with one or more compounds or products selected from the above-described compound (c), the above-described compound (c-1), the above-described compound (cb), the above-described product C and the above-described product L.

In the preparation process (15) of the present invention, the above-described compound (db) is a compound having at least one hydroxy group and at least one epoxy group.

In the preparation process (15) of the present invention, the above-described compound (db) is a compound having at least one hydroxy or carboxyl group and at least one (meta)acryloyl group.

In the preparation process (15) of the present invention, the above-described compound (db) is a compound having at least one group selected from primary amino, secondary amino, mercapto, hydroxy and carboxyl groups and having at least one vinyl or ethynylene group.

In further aspect, the present invention relates to a process for the preparation of urethane resins (hereinafter, referred to as preparation process (16)), which comprises the steps of (1) reacting a zircoaluminate compound or a silicon compound (compound (eb)) which has an organic group (VIII) carrying at least one group selected from acryloyl, epoxy and mercapto groups in the group and has a hydrolyzable group selected from alkoxy, acetoxy and oxime groups directly bonded to at least one silicon atom with a compound (compound (fb)) which can produce a compound having a secondary amino or hydroxy group by reacting with the organic group (VIII), or after the reaction with the above-described compound (fb), reacting the product with one or more compound selected from the above-described compound (l), the above-described compound (m) and the above-described compound (i) simultaneously or sequentially, to produce a zircoaluminate reaction product or silicon compound (product R) having less than 2, preferably from 0.2 to 1.5 secondary amino or hydroxy groups in the molecule and having the hydrolyzable group directly bonded to at least one silicon atom, (2) reacting the product R with the above-described compound (j) or the above-described compound (bb) to produce a silicon compound (product S) having less than 2, preferably from 0.2 to 1.5 isocyanate or isothiocyanate groups in the molecule and having at least one hydrolyzable group directly bonded to a silicon atom, and (3) reacting the product S with one or more compounds or products selected from the above-described compound (c), the above-described compound (c-1), the above-described compound (cb), the above-described product C and the above-described product L.

In the preparation process (16) of the present invention, the above-described compound (eb) is a compound in which the above-described organic group (VIII) is composed of a group having at least one acryloyl group, and the above-described compound (fb) is a compound having at least one group selected from primary and secondary amino groups.

In the preparation process (16) of the present invention, the above-described compound (eb) is a compound in which the above-described organic group (VIII) is composed of a group having at least one epoxy group, and the above-described compound (fb) is a compound having an active hydrogen atom reactive with an epoxy group.

In the preparation process (16) of the present invention, the above-described compound (eb) is a compound in which the above-described organic group (VIII) is composed of a group having at least one mercapto group, and the above-described compound (fb) is a compound having at least one epoxy group.

In further aspect, the present invention relates to a process for the preparation of urethane resins (hereinafter, referred to as preparation process (17)), which comprises the steps of (1) reacting a compound (compound (gb)) which has an organic group (IX) carrying at least one group selected from acryloyl, epoxy and mercapto groups in the group and has at least one organic group (X) selected from epoxy, (meta)acryloyl, vinyl and ethynylene groups with a compound (compound (hb)) which can produce a compound having a secondary amino or hydroxy group by reacting with the organic group (IX), or after the reaction with the above-described compound (hb), reacting the product with one or more compound selected from the above-described compound (l), the above-described compound (m) and the above-described compound (i) simultaneously or sequentially, to produce a compound (product T) having 0.2 to 1.5 secondary amino or hydroxy groups in the molecule and having at least one organic group (X), (2) reacting the product T with the above-described compound (j) or the above-described compound (bb) to produce a compound (product U) having 0.2 to 1.5 isocyanate groups in the molecule and having at least one organic group (X), and (3) reacting the product U with one or more compounds or products selected from the above-described compound (c), the above-described compound (c-1), the above-described compound (cb), the above-described product C and the above-described product L.

In the preparation process (17) of the present invention, the above-described compound (gb) is a compound in which the above-described organic group (IX) is a compound composed of a group having 2 or more epoxy groups, and the above-described compound (hb) is a monothiol compound or monosecondary amino compound.

In the preparation process (17) of the present invention, the above-described compound (gb) is a compound in which the above-described organic group (IX) is composed of a group having at least one acryloyl group and which has at least one (meta)acryloyl group, and the above-described compound (hb) is a compound having one primary amino group.

In the preparation process (17) of the present invention, the above-described compound (gb) is a compound in which the above-described organic group (IX) is composed of a group having at least one epoxy group and which has at least one (meta)acryloyl group, and the above-described compound (hb) is a compound having an active hydrogen atom reactive with an epoxy group.

In the preparation process (17) of the present invention, the above-described compound (gb) is a compound in which the above-described organic group (IX) is composed of a group having at least one acryloyl group and which has at least one vinyl group, and the above-described compound (hb) is a compound having at least one primary amino group.

In the preparation process (17) of the present invention, the above-described compound (gb) is a compound in which the above-described organic group (IX) is composed of a group having at least one mercapto group and which has at least one vinyl group, and the above-described compound (hb) is a compound having an epoxy group.

In further aspect, the present invention relates to a process for the preparation of urethane resins (hereinafter, referred to as preparation process (18)), which comprises the steps of (1) reacting a zircoaluminate compound or a compound (compound (ib)) which has one group (XI) selected from primary amino, secondary amino, hydroxy and mercapto groups in the group and has a hydrolyzable group selected from alkoxy, acetoxy and oxime groups directly bonded to at least one silicon or titanium atom with the above-described compound (j) or the above-described compound (bb) to produce a zircoaluminate reaction product or compound (product V) having less than 2, preferably from 0.2 to 1.5 isocyanate groups in the molecule and having the hydrolyzable group directly bonded to at least one silicon or titanium atom, and (2) reacting the product V with one or more compounds or products selected from the above-described compound (c), the above-described compound (c-1), the above-described compound (cb), the above-described product C and the above-described product L.

In further aspect, the present invention relates to a process for the preparation of urethane resins (hereinafter, referred to as preparation process (19)), which comprises the steps of (1) reacting a compound (compound (jb)) which has one group (XII) selected from primary amino, secondary amino, mercapto, hydroxy and carboxyl groups in the group and has at least one organic group (XIII) selected from epoxy, (meta)acryloyl, vinyl and ethynylene groups with the above-described compound (j) or the above-described compound (bb) to produce a compound (product W) having less than 2, preferably from 0.2 to 1.5 isocyanate groups in the molecule and having at least one organic group (XIII), and (2) reacting the product W with one or more compounds or products selected from the above-described compound (c), the above-described compound (c-1), the above-described compound (cb), the above-described product C and the above-described product L.

In the preparation process (19) of the present invention, the above-described compound (jb) is a compound which has one hydroxy group and has at least one epoxy, (meta)acryloyl, vinyl or ethynylene group.

In the preparation process (19) of the present invention, the above-described compound (jb) is a compound which has one group selected from primary amino, secondary amino, mercapto and carboxyl groups and has at least one vinyl or ethynylene group.

In all preparation processes of the present invention, the above-described product O, the above-described product Q, the above-described product S, the above-described product U, the above-described product V or the above-described product W (group 1) is reacted with one or more compounds or products (group 2) selected from the above-described compound (c), the above-described compound (cb), the above-described product C and the above-described product L, in an amount of the group 1 of 0.01 to 5 equivalent per hydroxy, mercapto, primary amino or secondary amino group of the group 2.

In further aspect, the present invention relates to a process for the preparation of urethane resins (hereinafter, referred to as preparation process (20)) in which a plurality of products (group 3) selected from the above-described product O, the above-described product Q, the above-described product S, the above-described product U, the above-described product V and the above-described product W are reacted with the above-described group 2, in an amount of the group 3 of 0.01 to 5 equivalent per hydroxy, mercapto, primary amino or secondary amino group of the group 2.

In the preparation process of the present invention (20), the above-described group 3 is composed of combination of one or more products (group 4) selected from the above-described product O, the above-described product S and the above-described product with one or more products (group 5) selected from the above-described product Q, the above-described product U and the above-described product W.

In further aspect, the present invention relates to a process for the preparation of urethane resins (hereinafter, referred to as preparation process (21)), which comprises the step of reacting a urethane resin obtained in the preparation process (15), a urethane resin obtained in the preparation process (17) or a urethane resin obtained in the preparation process (19) using the specific compound (jb) with a silicon compound having an organic group (XIV) reactive with an epoxy or acryloyl group, a titanium compound or zircoaluminate compound having the above-described organic group (XIV).

In further aspect, the present invention relates to a process for the preparation of urethane resins (hereinafter, referred to as preparation process (22)), which comprises the step of reacting a urethane resin obtained in the preparation process (15), a urethane resin obtained in the preparation process (17) or a urethane resin obtained in the preparation process (19) using the specific compound (jb) with a compound having an organic group reactive with an epoxy, acryloyl, vinyl or ethynylene group and having at least one organic group (X).

In further aspect, the present invention relates to a urethane resin composition (hereinafter, referred to as composition (1)) comprising one or more urethane resins selected from the urethane resins obtained in any of the above-described preparation processes.

In further aspect, the present invention relates to a urethane resin composition (hereinafter, referred to as composition (2)) comprising one or more urethane resins selected from the urethane resins obtained by any of the above-described preparation processes, a modified silicone resin, a curing catalyst for the above-described urethane resins and a curing catalyst for the modified silicone resin.

In further aspect, the present invention relates to a urethane resin composition (hereinafter, referred to as composition (3)) comprising a reaction product obtained by polymerization of (meta) acryloyl group-containing monomer in the presence of one or more urethane resins selected from the urethane resins obtained by any of the above-described preparation processes and a modified silicone, or a reaction product obtained by polymerization of the above-described (meta)acryloyl group-containing monomer in the presence of a (meta)acrylsilane compound or a compound having a mercapto group, and a curing catalyst for the above-described resins.

In further aspect, the present invention relates to a urethane resin composition (hereinafter, referred to as composition (4)) comprising (1) one or more urethane resins which are selected from urethane resins obtained by any of the above-described preparation processes and having the above-described hydrolyzable group, silicon atom, titanium or zirconium atom and aluminum atom, (2) an epoxy resin, (3) a ketimine compound, and (4) a curing catalyst for the above-described resin In further aspect, the present invention relates to a urethane resin composition (hereinafter, referred to as composition (5)) comprising (1) a modified silicone resin and/or one or more urethane resins selected from urethane resins obtained by any of the above-described preparation processes, (2) an epoxy resin, and one or more urethane resins selected from urethane resins obtained by in any of the above-described preparation processes and having an epoxy group, (3) a ketimine compound, and (4) a curing catalyst for the above-described modified silicone resin and/or a curing catalyst for one or more urethane resins selected from urethane resins obtained by any of the above-described preparation processes.

In further aspect, the present invention relates to a urethane resin composition (hereinafter, referred to as composition (6)) comprising (1) liquid A comprising one or more urethane resins selected from urethane resins obtained by any of the above-described preparation processes and having the above-described hydrolyzable group and silicon atom, titanium or zirconium atom and aluminum atom, and a curing resin for an epoxy resin, and (2) liquid B comprising an epoxy resin, and a curing resin for the above-described urethane resins in the above-described liquid A (1).

In further aspect, the present invention relates to a urethane resin composition (hereinafter, referred to as composition (7)) comprising (1) liquid A comprising a modified silicone resin and/or one or more urethane resins selected from urethane resins obtained by any of the above-described preparation processes and having the above-described hydrolyzable group and silicon atom, titanium or zirconium atom and aluminum atom, and a curing resin for an epoxy resin, and (2) liquid B comprising one or more urethane resins selected from urethane resins obtained by any of the above-described preparation processes and having an epoxy group, and a curing catalyst for the above-described modified silicone resin.

In further aspect, the present invention relates to a urethane resin composition (hereinafter, referred to as composition (8)) comprising (1) liquid A comprising one or more urethane resins selected from urethane resins obtained by any of the above-described preparation processes, a (meta)acryloyl group-containing monomer and a polymerization initiator or polymerization promoter for the above-described monomer (a polymerization initiator when a polymerization promoter is used in the following (2)), and (2) liquid B comprising a (meta)acryloyl group-containing monomer, a polymerization promoter or polymerization initiator for the above-described monomer (a polymerization promoter when a polymerization initiator is used in the above-described (1)), and a curing catalyst for urethane resins in the above-described liquid A (1).

In further aspect, the present invention relates to a urethane resin composition (hereinafter, referred to as composition (9)) comprising (1) liquid A comprising the above-described modified silicone resin, a (meta)acryloyl group-containing monomer, a curing catalyst for urethane resins in the following (2), and a polymerization initiator or polymerization promoter for the above-described monomer (a polymerization initiator when a polymerization promoter is used in the following (2), a polymerization promoter when a polymerization initiator is used in the following (2)), and (2) liquid B comprising one or more urethane resins selected from urethane resins obtained by any of the above-described preparation processes, a (meta)acryloyl group-containing monomer, a polymerization promoter or polymerization initiator for the above-described monomer (a polymerization promoter when a polymerization initiator is used in the (1), a polymerization initiator when a polymerization promoter is used in the (1)), and a curing catalyst for the above-described modified silicone resin.

BRIEF DESCRIPTION OF THE DRAWINGS

In FIGS. 1 and 2, 1 represents storage elastic coefficient, 2 represents loss elastic modulus (G"), and 3 represents tan δ, respectively.

BEST MODE FOR CARRYING OUT THE INVENTION

Figure 1:
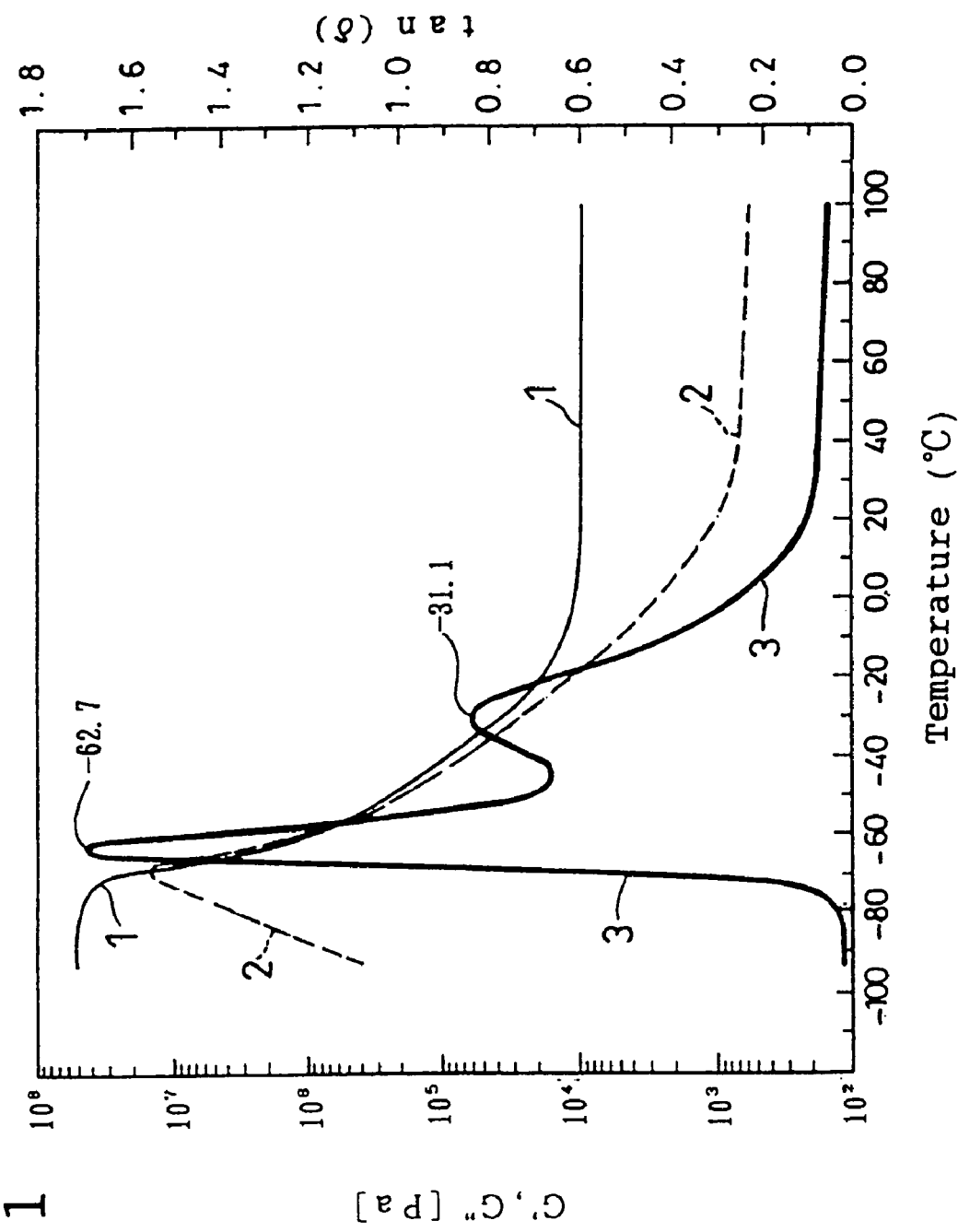
FIG. 1 shows a spectrum of dynamic viscoelasticity of the cured material of the product obtained in Example 5.

The preparation process (1) of the present invention comprises the following three steps.

In the first step, the above-described compound (a) and/or a zircoaluminate compound is reacted with the above-described compound (b) at a temperature from −20° C. to 150° C. for 1 to 1000 hours to produce a zincoaluminate reaction product or a compound (product A) having less than 2, preferably from 0.1 to 1.5 secondary amino groups (—NH—) or hydroxy groups (—OH) in one molecule and having 1 to 10 above-described hydrolyzable groups directly bonded to a silicon or titanium atom. The reaction may be effected in the presence of a medium such as an organic solvent and the like, and can be effected for over 1000 hours without any problem. The compound (a), compound (b) or zircoaluminate compound may be used not only alone but also in combination of two or more. Regarding use ratio of the compound (a) and/or zircoaluminate compound and the compound (b), the amount of the compound (b) is usually $\alpha$ τ (0.1 to 9) mol ($\alpha \leq 1$) or ($\alpha-1$) τ (0.1 to 9) mol ($\alpha > 1$) per one mol of the compound (a) and/or zircoaluminate compound when the number of the organic group (I) in the compound (a) or zircoaluminate compound is represented by $\alpha$, however, this amount is appropriately controlled depending on the reaction conditions of the product A and product B in the third step described below, odor produced, and the like. The compound (b) may also be used in excess amount to be allowed to remain in the final cured material and to act as a plasticizer, however, such large amount to cause bleeding is not preferable. However, even if the compound (b) is used in excess amount, when the compound (b) is a compound which is polymerized by photo-curing initiator and the like such as $\alpha$, $\beta$-unsaturated carbonyl compound, $\alpha$, $\beta$-unsaturated nitrile compound and the like, there is no problem if it is used together with a photo-curing initiator and is cured.

Then, in the second step, one or more compounds or products selected from the above-described compound (c), the-above-described compound (c-1) and the above-described product C are reacted with the above-described compound (d) and/or the above-described compound (d-1) to produce a (thio)urethane prepolymer (product B) containing terminal isocyanate and/or isothiocyanate groups in an amount of 4% by weight or below. In this procedure, it is necessary that the content of the isocyanate and/or isothiocyanate groups in the product B is 4% by weight or below, and when it is over 4% by weight, the object of the present invention is not attained. The reaction of the compound (c), the above-described compound (c-1) or the product C with the compound (d) and/or the compound (d-1) may advantageously follow methods usually conducted in preparing urethaneprepolymers.

Further, in the third step, the above-described product A is reacted with the above-described product B in proportions of 0.5 equivalent or more, preferably from 0.5 to 10 equivalent of the product A per free isocyanate and/or isothiocyanate group of the product B to produce a urethane resin (product X). More particularly, the number of the free isocyanate and/or isothiocyanate group is represented by $\beta$ and the number of the active hydrogen reactive with the isocyanate or isothiochanate group in the above-described product A is represented by $\gamma$, the amount of the above-described product A shall be $\beta/\gamma$ $\tau$ (1 to 10) equivalent and the free isocyanate and/or isothiocyanate group shall all disappear. The reaction of the product A with the product B is desirably conducted in the presence or absence of a compound having catalytic action, preferably in the atmosphere of an inert gas such as a nitrogen gas and the like at a temperature from room temperature to 110° C. for 1 to 1000 hours. Alternatively, this reaction can also be conducted in the presence of a medium such as an organic solvent and the like.

As the above-described compound having catalytic action, an organotin catalyst, metal complex, basic substance, organic phosphoric acid compound and the like can be used, and examples of the organotin catalyst include dibutyltin dilaurate, dibutyltin diacetate, dibutyltin oxide, stannous octoate, dibutyltin phthalate, dibutyltin methoxide, dioctyltin dimaleate, dibutyltin diacetylacetate, dibutyltin diversatate and the like, examples of the metal complex include titanate compounds such as tetrabutyl titanate, tetraisopropyl titanate, triethanolamine titanate, tetrakis(2-ethylhexyloxy)titanium, tetrastearyloxytitanium, diisopropoxy•bis(acetylacetonato)titanium, di-n-butoxy•bis(triethanolaminato)titanium, titanium•isopropoxyoctylene glycolate and the like, titanium carboxylates such as titanium stearate and the like, metal carboxylates such as lead naphthenate, nickel naphthenate, cobalt octyalte, lead octylate, cobalt naphthenate and the like, and metal acetyl acetonate complexes such as aluminum acetyl acetonate complex, vanadium acetyl acetonate complex and the like, examples of the basic substance include aminosilanes such as γ-aminopropyltrimethoxysilane and the like, quaternary ammonium salts such as tetramethylammonium chloride, benzalconium chloride and the like, and straight-chain or cyclic tertiary and quaternary ammonium salts containing a plurality of nitrogen atoms such as DABCO (registered trade mark) series, DABCO BL series and the like manufactured by Sankyo Air Products, examples of the organic phosphoric acid compound include monomethylphosphoric acid, di-n-butylphosphoric acid, triphenyl phosphate and the like.

In this reaction, the free isocyanate and isothiocyanate groups in the product B all react with the product A and the isocyanate group and the isothiocyanate group completely disappear. The amount used of the compound A is practically satisfactory when it is within the above-described range, however, even if the compound A is used in an amount over the range, there is almost no problem in ability thereof except slightly delayed curing. However, use in an amount over the above-described range is not preferably since cost increases. The above-described catalyst can also be utilized as a curing catalyst for the reaction product.

The product C is produced by reacting the compound (e) with the compound (f) in proportions of $\delta$ $\tau$ (0.1 to 3) mol of the compound (f) per mol of the compound (e) when the total number of the group (II) in the compound (e) is represented by $\delta$, at a temperature from about −20° C. to 150° C. for 0.1 to 1000 hours. There is naturally no problem if a plurality of an amino group, acryloyl group, epoxy group, mercapto group and the like are contained in the same molecule in the compound (e) used in the above-described reaction. The above-described reaction may also be conducted in the presence of a medium such as an organic solvent and the like, and there occurs no problem if the reaction is conducted for over 1000 hours. In the above-described reaction, a catalyst such as an organotin compound, amine compound, organometal compound and the like may be added without any problem. The compound (e) and the compound (f) may be used not only alone but also in combination of two or more. Use proportion of the compound (e) to the compound (f) is appropriately controlled depending on reaction conditions, cost and safety.

The product X can be produced by the following preparation process (2) instead of the above-described preparation process (1). In the preparation process (2), the above-described product A in an amount of less than $\beta/\gamma$ equivalent per free isocyanate and/or isothiocyanate group in the above-described product B, a compound (g) which has an organic group (III) carrying a primary amino, secondary amino, hydroxy and/or mercapto group in the group and has 1 to 10 hydrolyzable groups selected from alkoxy, acetoxy and oxime groups directly bonded to a silicon or titanium atom, a zircoaluminate compound or a compound (h) having an organic group reactive with an isocyanate or isothiocyanate group (these are referred to as compound Y) and the above-described compound B, are reacted in proportions of $\beta/\epsilon$ $\tau$ (1 to 10) equivalent of the total amount of the above-described product A and compound Y per free isocyanate group in the above-described product B if the number of active hydrogen atoms reactive with an isocyanate or isothiocyanate group in the above-described product A and compound Y is $\epsilon$.

The reaction conditions of the product A, compound Y and the product B may advantageously follow those in the case of the reaction of the product A with the product B in the third step in the preparation process (1), however, the reaction order thereof is important. Namely, the product A is reacted with the product B previously, then, the compound Y is reacted with the product B, or the product A and the compound Y are simultaneously reacted with the product B.

In the above-described preparation process (1) and preparation process (2), the product A can be produced by reacting the above-described product (a) with the above-described compound (b) as described above, and more preferable embodiments [1] to [5] are described below. By adopting the following embodiments, it becomes possible to control not only the skeleton of the product B but also the physical properties thereof.

[1] A compound (compound (a-1)) in which the above-described organic group (I) has one primary amino group is used as the above-described compound (a) and the above-described compound (i) is used as the above-described compound (b), respectively, and both of them are subjected to nucleophilic addition reaction at a temperature from −20° C. to 80° C. for 0.1 to 1000 hours in proportions of 0.2 to 1.7 mol of the compound (i) per mol of the compound (a-1). The nucleophilic addition reaction of them may be conducted at room temperature to 80° C., and cooling is necessary depending on occasion. When the compound (i) is a monomaleimide, toughness is improved. However, when the third step is initiated before completion of all reactions depending on reaction conditions, the compound (i) may be used in an amount over 1.7 mol without any problem.

[2] A compound (compound (a-2)) in which the above-described organic group (I) has 2 or more primary or secondary amino groups and/or at least one primary amino group and secondary amino group is used as the above-described compound (a) and the above-described compound (i), the above-described compound (l) or the above-described compound (m) is used as the above-described compound (b), respectively, and both of them are subjected to nucleophilic addition reaction at a temperature from −20° C. to 80° C. for 0.1 to 1000 hours in proportions of $(\zeta-1) \tau$ (0.1 to 9) mol of the above-described compound (i), the above-described compound (l) or the above-described compound (m) per mol of the compound (a-2) when the number of active hydrogen atoms in one molecule of the compound (a-2) is represented by $\zeta$. The nucleophilic addition reaction of them may be conducted at room temperature to 80° C., and cooling is necessary depending on occasion. When the compound (i) is a monomaleimide, toughness is improved. However, when the third step is initiated before completion of all reactions depending on reaction conditions, the compound (i), the compound (l) or the compound (m) may be used in an amount over the above-described range without any problem. The above-described compound (i), the above-described compound (l) and the above-described compound (m) can be used not only alone but also in combination of two or more.

[3] A compound (compound (a-3)) in which the above-described organic group (I) has an acryloyl group is used as the above-described compound (a), and the above-described compound (n) or the above-described compound (o) is used as the above-described compound (b), respectively, and both of them are subjected to nucleophilic addition reaction at a temperature from −20° C. to 80° C. for 0.1 to 1000 hours in proportions of $\eta \tau$ 0.1 mol or more, preferably $\eta \tau$ (0.2 to 1.5) mol of the above-described compound (n) or the above-described compound (o) per mol of the compound (a-3) when the number of the acryloyl group in the compound (a-3) is represented by $\eta$.

[4] A compound (compound (a-4)) in which the above-described organic group (I) has an epoxy group is used as the above-described compound (a) and the above-described compound (p) is used as the above-described compound (b), respectively, and both of them are mixed and reacted at a temperature from −20° C. to 130° C. for 0.1 to 1000 hours in proportions of $\theta \tau$ 0.1 mol or more, preferably $\theta \tau$ (0.2 to 1.5) mol of the above-described compound (p) per mol of the compound (a-4) when the total number of the above-described organic groups (I) in the compound (a-4) is represented by $\theta$.

[5] A compound (compound (a-5)) in which the above-described organic group (I) has a mercapto group or amino group or a compound (compound (a-2)) in which the above-described organic group (I) has an amino group is used as the above-described compound (a) and the above-described compound (q) or the above-described compound (r) is used as the above-described compound (b), respectively, and they are mixed and reacted at a temperature from −20° C. to 130° C. for 0.1 to 1000 hours in proportions of $\tau\tau$ 0.1 mol or more, preferably $\tau\tau$ (0.2 to 1.5) mol of the above-described compound (q) or the above-described compound (r) per mol of the compound (a-5) or the compound (a-2) when the number of active hydrogen atoms in the compound (a-5) or the compound (a-2) is represented by $\tau$. The reaction when a compound containing at least one allyl group and one hydroxy group is used as the compound (q) may be conducted by ultraviolet ray irradiation (from 1 minute to about 5 hours). The above-described compound (l) used in the above-described process [2] is obtained by reacting the above-described compound (j) with the above-described compound (k), and is produced by reacting 1 mol of the above-described compound (j) with $(\kappa-1) \tau$ (0.1 to 1.9) mol of the above-described compound (k) at a temperature from about −20° C. to 150° C. for 0.1 to 1000 hours when the number of isocyanate and/or isothiocyanate groups in the compound (j) is represented by $\kappa$.

The preparation process (3) of the present invention is a process for the preparation of the product X, which comprises the steps of (1) reacting the above-described compound (a-3) and the above-described compound (n) or the above-described compound (o), then, reacting one or more compounds selected from the above-described compound (i), the above-described compound (l) and the above-described compound (m) simultaneously or sequentially to produce a compound (product D) having less than 2, preferably from 0.1 to 1.5 secondary amino or hydroxy groups in one molecule and having the hydrolyzable group directly bonded to 1 to 10 silicon or titanium atoms, and (2) reacting the product D with the product B in proportions of at least 0.5 equivalent or more, preferably from 0.5 to 10 equivalent of the above-described product D per free isocyanate and/or isothiocyanate group of the above-described product B.

The reaction of the above-described compound (a-3) and the above-described compound (n) or the above-described compound (o) is conducted by reaction at a temperature from −20° C. to 80° C. for 0.1 to 1000 hours in proportions of 0.1 mol or more, preferably from 0.2 to 1.5 mol of the above-described compound (n) or the above-described compound (o) per mol of the above-described compound (a-3), to produced a precursor of the above-described product D (product (1-D)). The reaction of the above-described product (1-D) with the above-described compound is conducted at a temperature from −20° C. to 80° C. for 0.1 to 1000 hours in proportions of $\lambda \tau$ 0.1 mol or more, preferably $\lambda \tau$ (0.2 to 1.5) mol of the above-described compound (i), the above-described compound (l) or the above-described compound (m) per mol of the above-described product (1-D) when the number of secondary amino groups in the above-described product (1-D) is represented by $\lambda$, to produce the above-described product D. The reaction of the above-described compound D with the above-described compound B subsequently conducted may be the same as the reaction of the above-described compound A with the above-described compound B.

The preparation process (4) of the present invention is a process for the preparation of the product X, which comprises the steps of (1) reacting the above-described compound (a-4) and the above-described compound (p), then, reacting one or more compounds selected from the above-described compound (i), the above-described compound (l) and the above-described compound (m) simultaneously or sequentially to produce a compound (product E) having less than 2, preferably from 0.1 to 1.5 secondary amino or hydroxy groups in one molecule and having the hydrolyzable group directly bonded to 1 to 10 silicon or titanium atoms, and (2) reacting the product E with the product B in proportions of at least 0.5 equivalent or more, preferably from 0.5 to 10 equivalent of the product E per free isocyanate and/or isothiocyanate group of the product B.

The process for the preparation of the product E in which the above-described compound (a-4) and the above-described compound (p) are reacted, then, one or more compounds selected from the above-described compound (i), the above-described compound (l) and the above-described compound (m) are reacted may be the same as the process for the preparation of the product D in which the above-described compound (a-3) and the above-described compound (n) or the above-described compound (o) are reacted, then, one or more compounds selected from the above-described compound (i), the above-described compound (l) and the above-described compound (m) are reacted. The reaction of the above-described compound E with the above-described compound B subsequently conducted may be the same as the reaction of the above-described compound A with the above-described compound B.

The preparation process (5) of the present invention is a process for the preparation of the product X, which comprises the steps of (1) reacting the above-described compound (a-5) and/or the above-described compound (a-2) and, the above-described compound (q), the above-described compound (r) or a zircoaluminate compound, then, reacting one or more compounds selected from the above-described compound (i), the above-described compound (l) or the above-described compound (m) simultaneously or sequentially to produce a compound (product F) having less than 2, preferably from 0.1 to 1.5 secondary amino or hydroxy groups in one molecule and having the hydrolyzable group directly bonded to 1 to 10 silicon or titanium atoms, and (2) reacting the product E with the product B in proportions of at least 0.5 equivalent or more, preferably from 0.5 to 10 equivalent of the product F per free isocyanate and/or isothiocyanate group of the product B.

The process for the preparation of the product F in which the above-described compound (a-5) and/or the above-described compound (a-2), and the above-described compound (q), the above-described compound (r) or a zircoaluminate compound are reacted, then, one or more compounds selected from the above-described compound (i), the above-described compound (l) and the above-described compound (m) are reacted may be the same as the process for the preparation of the product D in which the above-described compound (a-3) and the above-described compound (n) or the above-described compound (o) are reacted, then, one or more compounds selected from the above-described compound (i), the above-described compound (l) and the above-described compound (m) are reacted. The reaction of the above-described compound F with the above-described compound B subsequently conducted may be the same as the reaction of the above-described compound A with the above-described compound B.

The preparation process (6) of the present invention is a process for the preparation of the product X in which a compound (compound (s)) having one hydroxy group and having a hydrolyzable group selected from alkoxy, acetoxy and oxime groups directly bonded to a silicon atom is reacted with the above-described product B in proportions of more than 1 equivalent, preferably from 1 to 10 equivalent of the above-described compound (s) per free isocyanate and/or isothiocyanate group of the above-described product B. The reaction of the above-described compound (s) with the above-described compound B may be the same as the reaction of the above-described compound A with the above-described compound B.

The preparation process (7) of the present invention is a process for the preparation of the product X, which comprises the steps of (1) reacting the above-described compound (t) with one or more compounds selected from the above-described compound (l) and the above-described compound (m) simultaneously or sequentially to produce a product G, and (2) reacting the above-described product B with the above-described compound (t-1) or the above-described product G in an amount of 0.1 to 5 equivalent, or with the above-described compound (t-1) or the above-described product G in an amount of 0.1 to 5 equivalent and the above-described product A in an amount of 0.2 equivalent or more per free isocyanate and/or isothiocyanate group of the product B.

The reaction of the above-described compound (t) with one or more compounds selected from the above-described compound (l) and the above-described compound (m) may be the same as the process for the preparation of the product D in which one or more compounds selected from the above-described compound (i), the above-described compound (l) and the above-described compound (m) are reacted. The reaction to be conducted subsequently of the above-described compound B with the above-described compound (t-1) or the above-described product G, or with the above-described compound (t-1) or the above-described product G and the above-described product A is conducted at a temperature from −20° C. to 100° C. for 0.1 to 1000 hours. The above-described reaction may be conducted in the presence of an organic solvent and the like. When the product X obtained in the above-described reaction is unstable, control may be provided by reaction with the above-described compound (l) or the above-described compound (m).

The preparation process (8) of the present invention is a process for the preparation of the product X, which comprises the steps of (1) reacting the above-described compound (u) with one or more compounds selected from the above-described compound (l) and the above-described compound (m) simultaneously or sequentially to produce a product H, and (2) reacting the above-described product B with the above-described compound (u-1) or the above-described product H in an amount of 0.1 to 5 equivalent, or with the above-described compound (u-1) or the above-described product H in an amount of 0.1 to 5 equivalent and the above-described product H in an amount of 0.9 equivalent or less per free isocyanate and/or isothiocyanate group of the product B, then reacting the product with the above-described product A in an amount of less than 6 equivalent per epoxy group of the above-described compound (u-1) or the above-described product H.

The reaction of the above-described compound (u) with one or more compounds selected from the above-described compound (l) and the above-described compound (m) may be the same as the process for the preparation of the product D in which one or more compounds selected from the above-described compound (i), the above-described compound (l) and the above-described compound (m) are reacted. The reaction to be conducted subsequently of the above-described compound B with the above-described compound (u-1) or the above-described product H, or with the above-described compound (u-1) or the above-described product H and the above-described product H is conducted at a temperature from −20° C. to 100° C. for 0.1 to 1000 hours. The above-described reaction may be conducted in the presence of an organic solvent and the like. The reaction with the above-described product A further conducted is conducted at a temperature from −20° C. to 100° C. for 0.1 to 1000 hours. The above-described reaction may be conducted in the presence of an organic solvent and the like. When the product X obtained in the above-described reaction is unstable, control may be provided by reaction with the above-described compound (l) or the above-described compound (m) like in the case of the above-described preparation process (7).

The preparation process (9) of the present invention is a process for the preparation of the product X, which comprises the steps of (1) reacting the above-described compound (v) with a zircoaluminate compound or the above-described compound (w) in an amount of from 0.5 to 2 equivalent based on the compound (v), then reacting one or more compounds selected from the above-described compound (i), the above-described compound (l) and the above-described compound (m), to produce a zircoaluminate compound reaction product or compound (product I) having less than 2, preferably from 0.1 to 1.5 secondary amino or hydroxy groups in one molecule and having 1 to 10 hydrolyzable groups directly bonded to a silicon or titanium atom, and (2) reacting the above-described product I with the above-described product B in proportions of at least 0.5 equivalent or more, preferably from 0.5 to 5 equivalents of the above-described product A per free isocyanate and/or isothiocyanate group of the above-described product B.

The reaction of the above-described compound (v) with the above-described compound (w) or zicroaluminate compound is conducted at a temperature from −20° C. to 100° C. for 0.1 to 1000 hours. The reaction to be conducted subsequently with one or more compounds selected from the above-described compound (i), the above-described compound (l) and the above-described compound (m) may be the same as the process for the preparation of the product D in which one or more compounds selected from the above-described compound (i), the above-described compound (l) and the above-described compound (m) are reacted in the above-descried preparation process (3). The reaction of the above-described compound I with the above-described compound B subsequently conducted may be the same as the reaction of the above-described compound A with the above-described compound B.

The preparation process (10) of the present invention is a process for the preparation of the product X, which comprises the steps of (1) reacting the above-described compound (x) with one or more compounds selected from the above-described compound (i), the above-described compound (l) and the above-described compound (m) simultaneously or sequentially to produce the above-described product J, and (2) reacting the above-described product B with the above-described product J or the above-described compound (x-1) in an amount of 0.1 to 5 equivalent, or with the above-described product J or the above-described compound (x-1) in an amount of 0.1 to 5 equivalent and the above-described product A in an amount of 0.9 equivalent or less per free isocyanate and/or isothiocyanate group of the product B, then reacting the product with the above-described product A in an amount of less than 6 equivalent based on the above-described compound (x-1) or the above-described product J to produce the above-described product K, and further curing the product K with a curing agent.

The reaction of the above-described compound (x) with one or more compounds selected from the above-described compound (i), the above-described compound (l) and the above-described compound (m) may be the same as the step (1) in the above-described preparation process (7). The reaction to be conducted subsequently of the above-described compound B with the above-described compound (x-1) or the above-described product J, or with the above-described compound (x-1) or the above-described product J and the above-described product A may be the same as the step (2) in the above-described preparation process (7). The reaction with the above-described product A further conducted A may be the same as the step (2) in the above-described preparation process (8).

The preparation process (11) of the present invention is a process for the preparation of the product X, which comprises the steps of (1) polymerizing the above-described compound (y) in the presence of one or more compounds or products selected from the above-described compound (c), the above-described compound (c-1) and the above-described product C to obtain a polymer (product L), (2) reacting the product L with one or more compounds selected from the above-described compound (d) and the above-described compound (d-1) to produce a (thio)urethane prepolymer (product M) containing an isocyanate and/or isothiocyanate group on the terminal thereof in an amount of 4% by weight or less, and (3) reacting one or more products or compounds selected from the above-described product A, the above-described product D, the above-described product E, the above-described product F, the above-described product I, the above-described product (a-1), the above-described product (a-2), the above-described product (g), the above-described product (h), the above-described product (k), the above-described product (o), the above-described product (p), the above-described product (q), the above-described product (s), the above-described product (t), the above-described product (t-1), the above-described product (u) and the above-described product (u-1) obtained in the above-described methods with the above-described product M simultaneously or sequentially in proportions of the above-described one or more products or compounds of 0.5 equivalent or more, preferably from 0.5 to 10 equivalent per free isocyanate and/or isothiocyanate group of the above-described product M.

The process in which the above-described compound (y) is polymerized in the presence of one or more compounds or products selected from the above-described compound (c), the above-described compound (c-1) and the above-described product C to obtain a polymer (product L) is conducted at a temperature from 40 to 150° C. for 0.1 to 1000 hours under nitrogen flow in the presence of a radical polymerization catalyst for radical polymerization of the above-described compound (y). In this procedure, existence of a chain transfer agent such as a thiol, mercaptosilane and the like is preferable. The reaction of the product L with one or more compound selected from the above-described compound (d) and the above-described compound (d-1) may advantageously be conducted in the same manner as in the second step in the preparation process (1), and the reaction of the above-described product M with the above-described one or more products or compounds may advantageously be conducted in the same manner as in the third step in the preparation process (1).

The preparation process (12) of the present invention is a process for the preparation of the product X in which the above-described product B and the above-described product M are reacted with one or more products or compounds selected from the above-described product D, the above-described product E, the above-described product F, the above-described product I, the above-described product (a-1), the above-described product (a-2), the above-described product (g), the above-described product (h), the above-described product (k), the above-described product (o), the above-described product (p), the above-described product (q), the above-described product (s), the above-described product (t), the above-described product (t-1), the above-described product (u) and the above-described product (u-1) simultaneously or sequentially in proportions of the total amount of the above-described compound A and the above-described one or more products or compounds of 0.5 equivalent or more, preferably from 0.5 to 10 equivalent per free isocyanate and/or isothiocyanate group of the above-described product B or the above-described product M. The reaction of the above-described product B or the above-described product M with the above-described one or more products or compounds may advantageously be conducted in the same manner as in the third step in the above-described preparation process (1).

The preparation process (13) of the present invention is a process for the preparation of the product X in which the above-described product B or the above-described product M is reacted with a zircoaluminate compound or the above-described compound (z) in an amount of less than 1 equivalent per free isocyanate and/or isothiocyanate group of the above-described product B or the above-described product M, then, one or more products or compounds selected from the above-described product A, the above-described product D, the above-described product E, the above-described product F, the above-described product I, the above-described product (a-1), the above-described product (a-2), the above-described product (g) (excepting compounds having a mercapto group), the above-described product (h)(excepting compounds having a mercapto group), the above-described product (k), the above-described product (o), the above-described product (p), the above-described product (q), the above-described product (s), the above-described product (t), the above-described product (t-1), the above-described product (u) and the above-described product (u-1) obtained in the above-described methods and zircoaluminate compound are reacted in proportions of the total amount with the above-described compound (z) or zircoaluminate compound of 0.5 equivalent or more, preferably from 0.5 to 10 equivalent per the above-described isocyanate and/or isothiocyanate group.

The above-described reaction of the above-described product B or the above-described product M with the above-described compound (z) or zircoaluminate compound is conducted at a temperature from −20° C. to 150° C. for 0.1 to 1000 hours. The reaction with the above-described one or more products or compounds to be conducted subsequently may advantageously be conducted in the same manner as in the third step in the above-described preparation process (1).

The preparation process (13) manifests an effective means when the terminal of the above-described product B is silylated with a mercapto group-containing silicon compound (compound (z)). Namely, when an isocyanate group remains, the viscosity of the system tends to increase, and when the amount of the above-described compound (z) is too high, curing with a tin-based catalyst is delayed. The preparation process (13) is an effective means for improving these defects. However, even in the above-described means, an isocyanate group may remain and the amount of the above-described compound (z) may be too high, and in this case, a monoisocyanate compound, monoepoxidized compound and the like exhibiting excellent reactivity with the remaining compound (z) are further allowed to reacted to delete the remaining mercapto group, then, the excess isocyanate group or epoxy group is allowed to react with products such as the product A used in the preparation process (13) and the like and compounds such as the compound (a-1) and the like to delete the isocyanate group or epoxy group. In particular, remaining of an isocyanate compound bonded to a principal chain should be noticed since it will be a cause of thickening.

Compounds used in preparing the above-described products X will be described in detail below.

Examples of the compound (a) include, but not limited to, compounds (a-1) in which the above-described organic group (I) has one primary amino group such as γ-aminopropyltriethoxysilane, γ-aminopropyltrimethoxysilane, γ-aminopropyl-methyldiethoxysilane, γ-aminopropyl-methyldimethoxysilane and the like; compounds (a-2) in which the above-described organic group (I) has a primary amino group and/or secondary amino group such as N-phenyl-γ-aminopropyltrimethoxysilane, N-β(aminoethyl)-γ-aminopropyltrimethoxysilane, N-β(aminoethyl)-γ-aminopropyltriethoxysilane, N-β(aminoethyl)-γ-aminopropylmethyldimethoxysilane, other special amino silanes manufactured by Shin-Etsu Chemical Co., Ltd available under trade names: KBM 6063, X-12-896, KBM 576, X-12-565, X-12-580, X-12-806, X-12-666, X-12-5263, KBM 6123, X-12-577, X-12-575, X-12-563B, X-12-562 and the like; compounds (a-3) in which the above-described organic group (I) has an acryloyl group such as γ-acryloylpropyltrimethoxysilane, γ-acryloylpropylmethyldimethoxysilane and the like; compounds (a-4) in which the above-described organic group (I) has an epoxy group such as β-(3,4-diepoxycyclohexyl)ethyltrimethoxysilane, γ-glycidoxypropyltrimethoxysilane, γ-glycidoxypropylmethyldiethoxysilane and the like; compounds (a-5) in which the above-described organic group (I) has a mercapto group such as γ-trimethoxysilylpropylmercaptane, γ-methyldimethoxysilylpropylmercaptane, γ-triethoxysilylpropylmercaptane, γ-mercaptopropylmethyldiethoxysilane and the like; as well as other compounds.

As the compound (a), the following titanium compounds are listed in addition to the above-described silicon compounds. There can be exemplified, as the titanium compounds, compounds (a-6) having a hydroxy group such as tetraoctylbis(ditridecylphosphite)titanate, tetrakis(2,2-diallyloxymethyl-1-butyl)bis(ditridecyl)phosphite titanate, tetraisopropylbis(dioctylphosphite)titanate, isopropyltris(dioctylpyrophosphate)titanate, bis(dioctylpyrophosphate) ethylene titanate, bis(dioctylpyrophosphate)ethylene titanate, bis(dioctylpyrophosphate)oxyacetate titanate and the like, compounds having primary and secondary amino groups such as isopropyltris(N-aminoethyl-aminomethyl) titanate and the like, as well as other compound.

In addition to the above-described compounds, compounds (s) having one hydroxy group and having the above-described hydrolyzable group directly bonded to a titanium atom, such as titanium coupling agents manufactured by Ajinomoto Co., Inc. (trade name: PLENACT; KR 41B, KR. 138S, KR 238S, 338×) and the like are listed as the titanium compounds.

As the zircoaluminate compound, compounds represented by the following general formula manufactured by Rhone Poulan Corp. can be used.

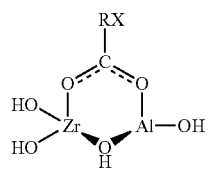

wherein, X represents NH₂, COOH or SH.

As the above-described compound (b), α, β-unsaturated carbonyl compounds such as α, β-unsaturated carboxyl compounds, α, β-unsaturated ketone compounds, α, β-unsaturated aldehyde compounds and the like or α, β-unsaturated nitriles (however, these compounds do not contain a hydroxy group) (compound (i)), monoprimary amine compounds (compound (n)), compounds containing one active hydrogen (compound (p)), compounds having at least one epoxy group, hydroxy group-containing acrylates, hydroxy group-containing maleimides, compounds containing one allyl group and one hydroxy group (compound (q)).

Specific examples of the compound (i) include acrylates such as methyl acrylate, ethyl acrylate, n-butyl acrylate, isobutyl acrylate, 2-ethylhexyl acrylate, lauryl acrylate, 2-methoxyethyl acrylate, cyclohexyl acrylate, benzyl acrylate, isobornyl acrylate, dicyclopentadienyl acrylate, 2-ethoxyethyl acrylate, tetrahydrofurfuryl acrylate, cyclohexyl acrylate, n-stearyl acrylate, dodecyl acrylate, 2-cyano acrylate, ethyl 2-cyano acrylate and the like; monofunctional special acrylates of Aronix manufactured by Toagosei Co., Ltd (trade name: M-101, M-102, M-110, M-111, M-113, M-117, M-120, M-156, M-5300, M-5400, M-5600, M-5700), compounds manufactured by Daicel Chemical Industries, Ltd. available under trade name: Placccel FA-1 and the like, acryloylsilane compounds such as γ-acryloylpropyltrimethoxysilane, γ-acryloylpropylmethyldimethoxysilane and the like, 2-cyano acrylate, ethyl 2-cyanoacrylate, monomaleimides such as N-cyclohexylmaleimide, N-phenylmaleimide, N-laurylmaleimide, diethylphenylmaleimide and the like, acrylonitrile, maleic anhydride, maleates such as diethyl maleate, dibutyl maleate, di-n-butyl maleate and the like, fumarates such as diethyl fumarate and the like, examples of the compound (n) include ethylamine, allylamine, isopropylamine, 2-ethylhexylamine, 2-ethylhexyloxylpropylamine, 3-ethoxypropylamine, 3-diethylaminopropylamine, dibutylaminopropylamine, t-butylamine, sec-butylamine, propylamine, dimethylaminopropylamine, 3-methoxypropylamine, stearylamine, 2-phenylethylamine, N-phenyl-γ-aminopropyltrimethoxysilane, various imidazole compounds and the like, and examples of the compound (o) include any compound containing 0.2 or more active hydrogens in the molecule such as aminosilane, mercaptosilane and the like. Examples thereof include various silane compounds manufactured by Shin-Etsu Chemical Co., Ltd. (trade name: KBM 602, KBM 603, KBM 6063, X-12-896, X-12-565, X-12-580), allyl urea, diethylamine and the like. Of course, examples thereof are not limited to the listed compounds. In addition, reaction products and the like of the above-described silane compounds, for example, KBM 602 with 2-ethylhexyl acrylate can also be used. The compound (p) also include compounds having one secondary amine such as diisopropylamine, diethylamine, diisobutylamine, di-2-ethylhexylamine, 2-pyrrolidone, various imidazole compounds, pyrrolidine, piperidine, 1-benzylpiperazine and the like, various aminosilanes, monomercaptane compounds such as ethylmercaptane, propylmercaptane, butylmercaptane, n-octylmercaptane, n-dodecylmercaptane, t-dodecylmercaptane, hexadecylmercaptane, n-octadecylmercaptane and the like, further, the above-described compound (a-1), the above-described compound (a-2), the above-described compound (a-5) and the like. Examples of the compound (q) include cresyl glycidyl ether, P-tert-butylphenyl glycidyl ether, ethylhexyl glycidyl ether, long-chain aliphatic glycidyl ether, phenyl glycidyl ether, allyl glycidyl ether, butyl glycidyl ether, cresol glycidyl ether, other various alkyl glycidyl ether, alkylphenol glycidyl ether, monoepoxysilane compounds, monoepoxy compounds such as styrene oxide, cyclohexene oxide and the like, hydroxy group-containing acrylate compounds such as hydroxyethyl acrylate, hydroxypropyl acrylate, pentaerythritol triacryalte, 2-hydroxy-3-phenoxypropyl acrylate and the like, monomaleimide compounds containing at least one hydroxy group such as p-hydroxylphenylmonomaleimide and the like, compound having one allyl group and one hydroxy group such as allyl alcohol, allylphenol, pentaerythritol triallyl ether and the like, as well as other compounds.

Among the compounds (m), examples of monoisocyanates include compounds represented by the general formula R—NCO such as ethyl isocyanate, n-dodecy isocyanate, p-toluenesulfonyl isocyanate, n-hexyl isocyanate, benzyl isocyanate, 2-methoxyphenyl isocyanate and the like, in addition, isocyanatesilanes such as KBE 9007 (trade name) manufactured by Shin-Etsu Chemical Co., Ltd, and the like, and examples of monothioisocyanates include compounds represented by the general formula R—NCS such as ethyl isothiocyanate, phenyl isothiocyanate, benzyl isothiocyanate, methyl isocyanate, 2-methylphenyl isocyanate and the like.

The compound (j) used in preparing the compound (l) is selected from compounds (d) described below.

The monoalcohol as the compound (k) used in preparing the compound (l) is a monoalcohol which does not have a group reactive with an isocyanate group excepting a hydroxy group, such as a primary amino group, secondary amino group, carboxyl group, malonyl group, mercapto group or the like, among compounds represented by the general formula ROH. Monoesters of polyester diols such as diethylene glycol monobutyl ester and the like, aromatic compounds such as phenol and the like are also included in the examples. The monoprimary amine is a monoprimary amine which does not have a group reactive with an isocyanate group excepting a primary amino group, such as a hydroxy group, secondary amino group, carboxyl group, malonyl group, mercapto group or the like, among compound represented by the general formula RNH₂. Aminosilanes such as γ-aminopropyltrimethoxysilane and the like, aromatic compounds such as aniline, benzylamine, and the like are also included in the examples. The monosecondary amine is a monosecondary amine which does not have a group reactive with an isocyanate group excepting a secondary amino group, such as a hydroxy group, primary amino group, carboxyl group, malonyl group, mercapto group or the like, among compound represented by the general formula RNHR'. Arylaminosilanes such as N-phenyl-γ-aminopropyltrimethoxysilane and the like, heterocyclic compounds such as piridine, piperidine and the like are also included in the examples. The monomalonyl compound is a monomalonyl compound which does not have a group reactive with an isocyanate group excepting a malonyl group, such as a hydroxy group, primary amino group, secondary amino group, carboxyl group, mercapto group or the like, among compounds represented by the general formula RCOCH$_2$COR'. Malonates, acetylacetone and the like are included in the examples. The monocarboxylic acid is a monocarboxylic acid compound which does not have a group reactive with an isocyanate group excepting a carboxyl group, such as a hydroxy group, primary amino group, secondary amino group, malonyl group, mercapto group or the like, among compounds represented by the general formula RCOOH. Aromatic compounds such as benzoic acid and the like are also included in the examples. The monothiol is a monithiol which does not have a group reactive with an isocyanate group excepting a mercapto group, such as a hydroxy group, primary amino group, secondary amino group, carboxyl group, malonyl group, mercapto group or the like, among compounds represented by the general formula RSH. γ-mercaptopropyltrimethoxysilane and the like are also included in the examples.

As the polyol compound (c), a polyether polyol and a polyester polyol are listed. Examples of the polyether polyol include diols such as ethylene glycol, diethylene glycol, propylene glycol, dipropylene glycol, 1,3-butanediol, 1,4-butanediol, 1,6-hexanediol, neopentyl glycol, Bisphenol A and the like, triols such as trimethylolethane, trimethylolpropane, glycerin and the like, sorbitol and the like, further, random or block copolymers obtained by ring-opening polymerization of ethylene oxide, propylene oxide, butylene oxide, styrene oxide and the like in the presence of one or more amines such as ammonia, ethylenediamine, urea, monomethyldiethanolamine, monoethyldiethanolamine and the like, in addition, polyols of polyolefin skeletons having an ethylene, a olefine skeleton, polyols of acrylic skeletons, and mixtures thereof as well as other compounds. Further, polyol compounds containing a fluorine atom, silicon atom, nitrogen atom, sulfur atom and the like are also included in the examples in addition to the above-described compounds.

As the polyester polyol, there are listed, for example, polymers obtained by polycondensation of a dicarboxylic acid such as maleic acid, fumaric acid, adipic acid, sebacic acid, phthalic acid and the like, alone or combination thereof, with the above-described diols, alone or combination thereof; ring-opened polymers such as ε-caprolactone, valerolactone and the like, active hydrogen compounds having two or more active hydrogen atoms such as castor oil and the like, and usually compounds having a molecular weight of 50 to 25,000 are used, they may advantageously be used depending on use object and ability.

As the polythiol compound (c-1), liquid polysulfides represented by the general formula HS—(R—SS)$_n$—R—SH (wherein, R represents —C$_2$H$_4$—, —C$_3$H$_6$—, —C$_2$H$_4$—O—C$_2$H$_4$—, —C$_2$H$_4$—O—CH$_2$—O—C$_2$H$_4$—, —C$_3$H$_6$—O—C$_3$H$_6$—O—C$_3$H$_6$— or —C$_2$H$_4$—O—(C$_2$H$_4$—O)$_m$—C$_2$H$_4$—, and n and m represent an integer from 2 to 50) are listed.

As the polyisocyanate compound (compound (d)), diisocyanate compounds, and polyisocyanate compounds not including the diisocyanate compounds are listed. As the diisocyanate compound, for example, aliphatic compounds, alicyclic compounds, aromatic aliphatic compounds, aromatic diisocyanate compounds and the like are listed. Specific examples thereof are listed below.

The aliphatic diisocyanate compounds: trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, 2,6-diisocyanate methylcaproate, and the like.

The alicyclic diisocyanate compound: 1,3-cyclopentene diisocyanate, 1,4-cyclohexane diisocyanate, 1,3-cyclohexane diisocyanate, 3-isocyanatemethyl-3,5,5-trimethylcyclohexyl isocyanate, 4,4'-methylenebis(cyclohexyl isocyanate), methyl-2,4-cyclohexane diisocyanate, methyl-2,6-cyclohexane diisocyanate, 1,3-bis(isocyanatemethyl)cyclohexane, 1,4-bis(isocyanatemethyl)cyclohexane, isophorone diisocyanate and the like.

Aromatic aliphatic diisocyanate compound: 1,3- or 1,4-xylylene diisocyanate or mixtures thereof, ω, ω'-diisocyanate-1,4-diethylbenzene, 1,3- or 1,4-bis(1-isocyanate-1-methylethyl)benzene or mixtures thereof.

Aromatic diisocyanate compound: m-phenylene diisocyanate, p-phenylne diisocyanate, 4,4'-diphenyl diisocyanate, 1,5-naphthalene diisocyanate, 4,4'-diphenylmethane diisocyanate, 2,4- or 2,6-tolylene diisocyanate, 4,4'-toluidine diisocyanate, 4,4'-diphenyl ether diisocyanate and the like.

As the polyisocyanate compound excepting the diisocyanate compound, for example, aliphatic compounds, alicyclic compounds, aromatic aliphatic compounds, aromatic polyisocyanate compounds and the like are listed. Specific examples thereof are listed below.

The aliphatic polyisocyanate compound: lysine ester triisocyanate, 1,4,8-triisocyanate octane, 1,6,11-triisocyanate undecane, 1,8-diisocyanate-4-isocyanatemethyloctane, 1,3,6-triisocyanate hexane, 2,5,7-trimethyl-1,8-diisocyanate-5-isocyanate methyloctane and the like.

Alicyclic polyisocyanate compound: 1,3,5-triisocyanate cyclohexane, 1,3,5-trimethyl isocyanate cyclohexane, 3-isocyanate methyl-3,3,5-trimetylcyclohexyl isocyanate, 2-(3-isocyanate propyl)-2,5-di(isocyanate methyl)-bicyclo[2,2,1]heptane, 2-(3-isocyanate propyl)-2,6-di(isocyanate methyl)-bicyclo[2,2,1]heptane, 3-(3-isocyanate propyl)-2,5-di(isocyanate methyl)bicyclo[2,2,1]heptane, 5-(2-isocyanate ethyl)-2-isocyanate methyl-3-(3-isocyanate propyl)-bicyclo[2,2,1]heptane, 6-(2-isocyanate ethyl)-2-isocyanate methyl-3-(3-isocyanate propyl)-bicyclo[2,2,1]heptane, 5-(2-isocyanate ethyl)-2-isocyanate methyl-2-(3-isoyanate propyl)-bicyclo[2,2,1]heptane, 6-(2-isocyanate ethyl)-2-isocyanate methyl-2-(3-isocyanate propyl)-bicyclo[2,2,1]heptane and the like.

Aromatic aliphatic polyisocyanate compound: 1,3,5-triisocyanate methylbenzene and the like.

Aromatic polyisocyanate compound: triphenylmethane-4,4',4"-triisocyanate, 1,3,5-triisocyanate benzene, 2,4,6-triisocyanate toluene, 4,4'-diphenylmethane-2,2',5,5'-tetraisocyanate and the like.

As the polyisothiocyanate compound (compound (d-1)), phenyl diisothiocyanate and the like are listed.

When these compounds (d) and compounds (d-1) are used, if yellowing property is problem in use of a resin as a base for a sealing material and adhesive, aliphatic, alicyclic and aromatic aliphatic polyisocyanates are preferably used. The polyisocyanate compounds and polyisothiocyanate compounds can be used not only alone but also in combination of two or more.

As the compound (compound (e)) having at the terminal of the molecule at least one group (II) selected from an amino group, acryloyl group, epoxy group and mercapto group and having a number-average molecular weight of 50 to 25000, there are listed polyamine compounds manufactured by Texaco Chemical Corp. available under the trade name: Jephamine; M series, D series, EDR series (EDR-148 and the like), T series which are terminal monoamines, diamines and triamines having a skeleton composed of propylene oxide, ethylene oxide or a mixture thereof and having a number average molecular weight of 200 to 5000, and various polyepoxy compounds and polyacryl compounds. As the polyepoxy compound, polyvalent epoxy compounds such as Epikote 1001, 1004 (trade name, manufactured by Yuka Shell Epoxy Corp.) and the like are listed. As the polyacryl compound, polyethylene glycol diacrylate, polypropylene glycol diacrylate, various urethane acrylate and the like are listed. As the compound having a mercapto group, LP-282, LP-55 (trade name; manufactured by Toray Thiocol K.K.) and the like are listed.

As the compound (f) to be reacted with the compound (e), when the compound (e) is the above-described polyamine compound, monoacrylate compounds (silane coupling agents containing an acryloyl group are also included) are listed. These cause Michael addition reaction to produce a secondary amine. When the compound (e) is a polyepoxy compound, monomercaptane compounds, monomercaptosilane compounds, arylaminosilane compounds, various compounds having one secondary amino group, and the like are listed, and one hydroxy group is produced by the reaction. Further, when the compound (e) is a polyacryl compound, monoprimary amine compounds, monosecondary amine compounds, monoprimary or secondary amino group-containing silane compounds are listed.

As the compound (g) in the above-described preparation method (2), those exemplified as the above-described compound (a) can be used excepting silicon compounds containing a secondary amino group directly bonded to a silicon atom such as silazane and the like, and particularly, compounds (a-1) such as γ-aminopropyltriethoxysilane, γ-aminopropyltrimethoxysilane, γ-aminopropyl-methyldimethoxysilane, γ-aminopropyl-methyldimethoxysilane and the compound, compounds (a-2) such as N-β(aminoethyl)γ-aminopropyltrimethoxysilane, N-β(aminoethyl)γ-aminopropyltriethoxysilane, N-β(aminoethyl)γ-aminopropylmethyldimethoxysilane and the like, and in addition, special aminosilanes available under the trade name: KBM 6063, X-12-896, KBM 576, X-12-565, X-12-580 and the like are suitable. Further, coupling agents containing a mercapto group included in the compound (a-5) and titanium compounds included in the compound (a-6) are listed.

The above-described compound (h) may be any compound providing it has an active hydrogen, and examples thereof include monoalcohol compounds, polyhydric alcohol compounds, monothiol compounds, poly thiol compounds, monoamine compounds, polyvalent amine compounds, monocarboxyl compounds, polyvalent carboxyl compounds, various carbonate compounds and the like. These compounds can be selected from the compounds as exemplified above.

The above-described compound (r) is selected from the compounds (a-4) in the compounds (a).

The above-described compound (s) is selected from the titanium compounds in the compounds (a).

As the above-described compound (t), 2-acryloyloxyethylphosphate, compounds manufactured by Kyoeisha Kagaku K.K. available under the trade name: Epoxy Ester 40 M, 70 PA, 200 PA, 3002 A, 3002 M, 3000 M, 200 EA, 400 EA and the like are listed, and as the above-described compound (t-1), pentaerythritol triacrylate, 2-hydroxyethyl acrylate, 2-hydroxypropyl acrylate, 2-hydroxy-3-acryloyloxypropyl methacrylate, 2-hydroxy-3-phenoxypropyl acrylate, 2-acryloyloxyethylphosphate, compounds manufactured by Kyoeisha Kagaku K.K. available under the trade name: Epoxy Ester M-600A and the like are listed.

As the above-described compound (u), there are listed Bisphenol A type epoxy resins having higher molecular weight, for example, EHPE-3150: trade name: manufactured by Daicel Chemical Industries Ltd., Epikote 1001, 1004 and the like: trade name: manufactured by Yuka Shell Epoxy Corp., and as the above-described compound (u-1), there are listed glycidol, glycerol diclycidyl ether, sorbitol polyglycidyl ether and the like.

As the compound having an epoxy group included in the above-described compound (v), Bisphenol A type epoxy resins, Bisphenol F type epoxy resins, novolak type epoxy resins, epoxy resins in which amine is converted into glycidyl, epoxy resins having a heterocycle, alicyclic epoxy resins, hydrogenated Bisphenol A type epoxy resins, urethane-modified epoxy resins, hydantoin type epoxy resins and the like are listed, and they may be used alone or in combination of two or more.

Examples of the compound (v) having an acryloyl group include triethylene glycol diacrylate, polyethylene glycol (PEG)(#200) diacrylate, PEG (#400) diacrylate, PEG (#600) diacrylate, polypropylene glycol diacrylate, 1,4-butanediol diacrylate, neopentyl glycol diacrylate, 1,6-hexanediol diacrylate, 1,9-nonanediol diacrylate, dimethyloltricyclodecane diacrylate, diacrylate of ethylene oxide (EO) addition product of Bisphenol A, diacrylate of propylene oxide addition product of Bisphenol A, trimethylolpropane triacrylate, EO-modified trimethylolpropane triacrylate, pentaerythritol triacrylate, pentaerythritol tetraacrylate, dipentaerythritol hexaacrylate, trimethylolpropane-acrylic acid-benzoate, 2-hydroxy-3-acryloyloxypropyl methacrylate, hydroxypivalic acid-neopentyl glycol diacrylate, polytetramethylene glycol diacrylate, ditrimethylolpropane tetraacrylate, alkylene glycol type EO-modified compounds, and in addition, compounds manufactured by Toagosei Co., Ltd. available under the trade name: Aronix (M-400, M-408, M-450, M-1100, M-1200, M-1310, M-1600, M-6100, M-6200, M-6250, M-6500).

The above-described compound (w) is selected from the above-described compounds (a).

In the above-described compounds (x), as the compound having a vinyl group (including an allyl group), there are listed compounds having a hydroxy group such as vinyl-n-hexylcarbinol, vinylmethylcarbinol, allylalcohol, vinylmethylcarbinol, allylphenol, 1-butene-3-ol, 4-allylcatechol, α-phenylallylalcohol, allylcarbinol and the like, compounds containing a secondary amino group such as vinylaniline, allylaniline and the like, compounds containing a primary amino group such as allylamine, cinnamylamine and the like, compounds containing an primary amino group and a carboxyl group such as sec-allylcysteine and the like, compounds containing a primary amino group and a secondary amino group such as allylurea and the like, compounds having a carboxyl group such as 3-aryloxypropionic acid, allylacetic acid, 4-vinylbenzoylic acid and the like, compounds containing a mercapto group such as allylmercaptane and the like.

As the compound having an ethynylene group, there are listed compounds having a hydroxy group such as 1-ethynyl-1-cyclohexanol, ethynylestradiol, eugenol, propargyl alcohol, 1-butyne-3ol, 2-butyne-1ol and the like, compounds having a secondary amino group such as 3-ethynylaniline, 4-ethynylaniline and the like, compounds having a primary amino group such as propargylamine and the like, and compounds having a carboxyl group such as 2-butynoic acid and the like.

In addition, the compound having an epoxy group is selected from the above-described compounds (u) and the above-described compounds (u-1), and the compound having an acryloyl group is selected from the above-described compounds (t) and the above-described compounds (t-1).

The (meta)acryloyl group-containing monomer and the hydroxy group-containing (meta)acrylate in the above-described compound (y) are selected from the above-described compound (i) and the above-described compound (q), and in addition, examples thereof include monofunctional compounds such as 2-hydroxyethyl (meta)acrylate, 2-hydroxypropyl (meta)acrylate, 2-hydroxybutyl (meta)acrylate, methyl (meta)acrylate, ethyl (meta)acrylate, propyl (meta)acrylate, isopropyl (meta)acrylate, butyl (meta)acrylate, amyl (meta)acrylate, isobutyl (meta)acrylate, t-butyl (meta)acrylate, pentyl (meta)acrylate isoamyl (meta)acrylate, hexyl (meta)acrylate, heptyl (meta)acrylate, octyl (meta)acrylate, isooctyl (meta)acrylate, 2-ethylhexyl (meta)acrylate, nonyl (meta)acrylate, deceyl (meta)acrylate, isodecyl (meta)acrylate, undecyl (meta)acrylate, dodecyl (meta)acrylate, lauryl (meta)acrylate, octadecyl (meta)acryalte, steary (meta)acrylate, tetrahydrofurfuryl (meta)acrylate, butoxyethyl (meta)acrylate, ethoxydiethylene glycol (meta)acrylate, benzyl (meta)acrylate, cyclohexyl (meta)acrylate, phenoxyethyl (meta)acrylate, polyethylene glycol (meta)acrylate, polypropylene glycol (meta)acrylate, methoxyethylene glycol (meta)acrylate, ethoxyethylene glycol (meta)acrylate, methoxypolyethylene glycol (meta)acrylate, methoxypolypropylene glycol (meta)acrylate, dicyclopentadienyl (meta)acrylate, dicyclopentanyl (meta)acrylate, dicyclopentenyl (meta)acrylate, tricyclodecanyl (meta)acrylate, isobonyl (meta)acrylate, bornyl (meta)acrylate, diacetone(meta)acrylamide, isobutoxymethyl(meta)acrylamide, N-vinylpyrrolidone, N-vinylcaprolactam, N-vinylformaldehyde, N,N-dimethyl(meta)acrylamide, t-octyl(meta)acrylamide, dimethylaminoethyl (meta)acrylate, diethylaminoethyl (meta)acrylate, 7-amino-3,7-dimethyloctyl (meta)acrylate, N,N-dimethyl(meta)acrylamide, N,N'-dimethylaminopropyl(meta)acrylamide, (meta)acryloylmorpholine; vinylethers such as hydroxybutyl vinyl ether, lauryl vinyl ether, cetyl vinyl ether, 2-ethylhexyl vinyl ether and the like; maleates; fumarates and the like, and commercially available products as the above-described monofunctional compounds such as compounds manufactured by Toagosei Chemical Co., Ltd. available under the trade name: Aronix M 102, M 111, M 114, M 117, compounds manufactured by Nippon Kayaku Co., Ltd. available under the trade name: KAYAHAD TC 110S, R 629 and R 644, compounds manufactured by Osaka ORGANIC CHEMICAL INDUSTRY LTD. available under the trade name: Viscoat 3700 and the like, and these compounds may be used alone or in combination.

Further, examples thereof include polyfunctional compounds such as trimethylolpropane tri(meta)acrylate, pentaerythritol tri(meta)acrylate, pentaerythritol tetra(meta)acrylate, ethylene glycol di(meta)acrylate, tetraethylene glycol di(meta)acrylate, polyethylene glycol di(meta)acrylate, 1,4-butanediol di(meta)acrylate, 1,6-hexanediol di(meta)acryalte, neopentyl glycol di(meta)acrylate, trimethylolpropanetrioxyethyl (meta)acrylate, tris(2-hydroxyethyl) isocyanurate tri(meta)acrylate, tris(2-hydroxyethyl) isocyanurate di(meta)acrylate, tricyclodecanedimethanol di(meta)acrylate, epoxy (meta)acrylate obtained by adding (meta)acrylate to glycidyl ether of Bisphenol A and the like, and commercially available products as the above-described polyufunctional compounds such as compounds manufactured by Mitsubishi Chemical Co., Ltd. available under the trade name: Yupimer UV, SA 1002, SA 2007, compounds manufactured by Osaka ORGANIC CHEMICAL. INDUSTRY LTD. available under the trade name: Viscoat 700, compounds manufactured by Nippon Kayaku Co., Ltd. available under the trade name: KAYADAD R-604, DPCA-20, DPCA-30, DPCA-60, DPCA-120, HX-620, D-310, D-330, compounds manufactured by Toagosei Co., Ltd. available under the trade name: Aronix M-210, M-215, M-315, M-325 and the like, and these compounds may be used alone or in combination.

The above-described silicon compound is selected from the above-described compounds (a-3).

The above-described compound (z) is selected from the above-described compounds (a-5).

The preparation process (14) of the present invention is a process for the preparation of a urethane resin (referred to as a product Y), which comprises the steps of (1) reacting a zircoaluminate compound or the above-described compound (ab) with one or more compounds selected from the above-described compound (l), the above-described compound (m) and the above-described compound (i) simultaneously or sequentially to produce the above-described product N, (2) reacting the product N with the above-described compound (j) or a compound (bb) obtained by reacting the above-described compound (j) with the above-described compound (k) to produce the above-described product O, and (3) reacting the product O with one or more compounds or products selected from the above-described compound (c), the above-described compound (c-1), a compound (compound (cb)), the above-described product C and the above-described product L.

In the above-described step (1), one mol of the above-described compound (ab) or zircoaluminate compound is reacted with one or more compounds selected from the above-described compound (l), the above-described compound (m) and the above-described compound (i) in an amount of $(\mu-1) \times (0.1 \text{ to } 9)$ mol when the number of active hydrogen atoms reactive with an isocyanate group or isothiocyanate group in the above-described compound (ab) or zircoaluminate compound is represented by $\mu$, at a temperature from about $-20°$ C. to $150°$ C. for 0.1 to 1000 hours, to produce the product N.

The above-described reaction may also be conducted in the presence of a medium such as an organic solvent and the like, and can also be conducted for over 200 hours without any problem. In the above-described reactions (1) and (2), a catalyst such as an organotin compound, amine compound, organometal compound and the like can be added without any problem. The above-described compounds may be used not only alone but also in combination of two or more. The use ratio of the above-described compound (ab) or zircoaluminate compound to compounds selected from the above-described compound (l), the above-described compound (m) and the above-described compound (i) is appropriately controlled according to reaction conditions, cost and stability.

In the above-described step (2), $(v-1) \times (0.1 \text{ to } 9)$ mol of the above-described product N (wherein, $v$ represents the number of an isocyanate group and/or isothiocyanate group in the above-described compound (j) or the above-described compound (bb)) is reacted with one mol of the above-described compound (j) or the above-described compound (bb) at a temperature from about $-20°$ C. to $150°$ C. for 0.1 to 1000 hours, to produce the product O. This reaction may also be conducted in the presence of an organic solvent and the like, and can also be conducted for over 1000 hours without any problem. In the above-described reaction, a catalyst such as an organotin compound, amine compound, organometal compound and the like can be added without any problem. The above-described compounds may be used not only alone but also in combination of two or more. The use ratio of the above-described product N to the above-described compound (j) or the above-described compound (bb) is appropriately controlled according to reaction conditions, cost and stability.

The above-described compound (k) used in preparing the above-described compound (bb) is particularly preferably a compound selected from monoalcohol, monoprimary amine, monosecondary amine, monomalonyl compound, monocarboxylic acid, monothiol and monoamide compound.

In the above-described step (3), one mol of the one or more compounds or products selected from the above-described compound (c), the above-described compound (c-1), the compound (cb), the above-described product C and the above-described product L is reacted with the above-described product L in an amount of $\xi \times (0.1 \text{ to } 50)$ mol when the number of active hydrogen atoms reactive with an isocyanate group or isothiocyanate group in one molecule of the one or more compounds or products selected from the above-described compound (c), the above-described compound (c-1), the compound (cb), the above-described product C and the above-described product L is represented by $\xi$, at a temperature from about $-20°$ C. to $150°$ C. for 0.1 to 1000 hours, to produce the intended product Y. In the above-described reaction, the above-described compound (c), the above-described compound (c-1), the compound (cb), the above-described product C and the above-described product L may naturally be mixed. This reaction may also be conducted in the presence of a medium such as an organic solvent and the like, and can also be conducted for over 1000 hours without any problem. In the above-described reaction, a catalyst such as an organotin compound, amine compound, organometal compound and the like can be added without any problem. The use ratio of the one or more compounds or products selected from the above-described compound (c), the above-described compound (c-1), the compound (cb), the above-described product C and the above-described product L to the above-described product O is appropriately controlled according to reaction conditions, cost and stability.

The preparation process (15) of the present invention is a process of the preparation of the product Y, which comprises the steps of (1) reacting the above-described compound (db) with one or more compounds selected from the above-described compound (l), the above-described compound (m) and the above-described compound (i) simultaneously or sequentially to produce the above-described product P, (2) reacting the product P with the above-described compound (j) or the above-described compound (bb) to produce the product Q, and (3) reacting the product Q with one or more compounds or products selected from the above-described compound (c), the above-described compound (c-1), the above-described compound (cb), the above-described product C and the above-described product L.

The reaction conditions of this preparation process (15) may be the same as those in the above-described preparation process (14). In the preparation process (15), the above-described compound (db) is particularly preferably a compound having at least one hydroxy group and at least one epoxy group, a compound having at least one hydroxy or carboxyl group and at least one (meta)acryloyl group, or a compound having at least one group selected from primary amino, secondary amino, mercapto, hydroxy and carboxyl groups and having at least one vinyl or ethynylene group.

The preparation process (16) of the present invention is a process for the preparation of the product Y, which comprises the steps of (1) reacting a zircoaluminate compound or the above-described compound (eb) with the above-described compound (fb), or after the reaction with the above-described compound (fb), reacting the product with one or more compound selected from the above-described compound (l), the above-described compound (m) and the above-described compound (i) simultaneously or sequentially, to produce the above-described product R, (2) reacting the product R with the above-described compound (j) or the above-described compound (bb) to produce the above-described product S, and (3) reacting the product S with one or more compounds or products selected from the above-described compound (c), the above-described compound (c-1), the above-described compound (cb), the above-described product C and the above-described product L.

In the above-described step (1), the above-described compound (eb) or zircoaluminate compound is reacted with the above-described compound (fb) in an amount of $\pi \times (0.1 \text{ to } 0.3)$ mol ($\pi' \leq 1$), $\pi/(\pi'-1) \times (0.1 \text{ to } 0.3)$ mol ($\pi' > 1$), preferably 0.2 to 1.5 mol when the total number of the above-described organic group (VIII) in the above-described compound (eb) is represented by $\pi$ and the number of groups in the above-described compound (fb) reactive with the above-described organic group (VIII) per one mol of the above-described compound (eb) is represented by $\pi'$ (wherein, NH counts one and $NH_2$ counts two), at a temperature from about $-20°$ C. to $150°$ C. for 0.1 to 1000 hours, to produce the above-described product R. This reaction may also be conducted in the presence of a medium such as an organic solvent and the like, and can also be conducted for over 1000 hours without any problem. In the above-described reaction, a catalyst such as an organotin compound, amine compound, organometal compound and the like can be added without any problem. The above-described compounds may be used not only alone but also in combination of two or more. The use ratio of the above-described compound (eb) or zircoaluminate compound to the above-described compound (fb) is in the above-described range, and is appropriately controlled according to reaction conditions, cost and stability.

In the above-described step (1), it is also possible that after the reaction of the above-described compound (eb) zircoaluminate compound with the above-described compound (fb), the product is reacted with one or more compounds selected from the above-described compound (l), the above-described compound (m) and the above-described compound (i) simultaneously or sequentially. The conditions in reacting the one or more compounds selected from the above-described compound (l), the above-described compound (m) and the above-described compound (i) may advantageously follow those of the step (1) in the above-described preparation process (14).

The above-described step (2) and the above-described step (3) may be the same as the step (2) and the step (3) in the above-described preparation process (14), respectively.

In the preparation process (16), it is suitable that the above-described compound (eb) is a compound in which the above-described organic group (VIII) is composed of a group containing at least one acryloyl group and the above-described compound (fb) is a compound having at least one group selected from primary amino and secondary amino groups, or the above-described compound (eb) is a compound in which the above-described organic group (VIII) is composed of a group containing at least one epoxy group and the above-described compound (fb) is a compound having an active hydrogen atom reactive with an epoxy group, or the above-described compound (eb) is a compound in which the above-described organic group (VIII) is composed of a group containing at least one mercapto group and the above-described compound (fb) is a compound having at least one epoxy group.

The preparation process (17) of the present invention is a process for the preparation of the product Y, which comprises the steps of (1) reacting the above-described compound (gb) with the above-described compound (hb), or after the reaction with the above-described compound (hb), reacting the product with one or more compound selected from the above-described compound (l), the above-described compound (m) and the above-described compound (i) simultaneously or sequentially, to produce the above-described product T, (2) reacting the product T with the above-described compound (j) or the above-described compound (bb) to produce the above-described product U, and (3) reacting the product U with one or more compounds or products selected from the above-described compound (c), the above-described compound (c-1), the above-described compound (cb), the above-described product C and the above-described product L.

The above-described step (1) may advantageously follow the step (1) in the above-described preparation process (16).

Further, the above-described step (2) and the above-described step (3) may be the same as the step (2) and the step (3) in the above-described preparation process (14), respectively.

In the preparation process (17) of the present invention, it is suitable that the above-described compound (gb) is a compound in which the above-described organic group (IX) is a compound composed of a group having 2 or more epoxy groups and the above-described compound (hb) is a monothiol compound or monosecondary amino compound, or the above-described compound (gb) is a compound in which the above-described organic group (IX) is composed of a group having at least one acryloyl group and which has at least one (meta)acryloyl group and the above-described compound (hb) is a compound having one primary amino group, or the above-described compound (gb) is a compound in which the above-described organic group (IX) is composed of a group having at least one epoxy group and which has at least one (meta)acryloyl group and the above-described compound (hb) is a compound having an active hydrogen atom reactive with an epoxy group, or the above-described compound (gb) is a compound in which the above-described organic group (IX) is composed of a group having at least one acryloyl group and which has at least one vinyl group and the above-described compound (hb) is a compound having at least one primary amino group, or the above-described compound (gb) is a compound in which the above-described organic group (IX) is composed of a group having at least one mercapto group and which has at least one vinyl group and the above-described compound (hb) is a compound having an epoxy group.

The preparation process (18) of the present invention is a process for the preparation of the product Y, which comprises the steps of (1) reacting a zircoaluminate compound or the above-described compound (ib) with the above-described compound (j) or the above-described compound (bb) to produce the above-described product V, and (2) reacting the product V with one or more compounds or products selected from the above-described compound (c), the above-described compound (c-1), the above-described compound (cb), the above-described product C and the above-described product L.

In the above-described step (1), the above-described compound (ib) or zircoaluminate compound is reacted with the above-described compound (j) or the above-described compound (bb), in an amount of the above-described compound (ib) or zircoaluminate compound of $(\rho-1) \times (0.1 \text{ to } 10)$ mol when the number of an isocyanate group or isothiocyanate group in the above-described compound (j) or the above-described compound (bb) is represented by $\rho$, per mol of the above-described compound (j) or the above-described compound (bb), at a temperature from about $-20°$ C. to $150°$ C. for 0.1 to 1000 hours, to produce the above-described product V. This reaction may also be conducted in the presence of a medium such as an organic solvent and the like, and can also be conducted for over 1000 hours without any problem. In the above-described reaction, a catalyst such as an organotin compound, amine compound, organometal compound and the like can be added without any problem. The above-described compounds may be used not only alone but also in combination of two or more. The use ratio of the above-described compound (ib) or zircoaluminate compound to the above-described compound (j) or the above-described compound (bb) is appropriately controlled according to reaction conditions, cost and stability.

The conditions of the above-described step (2) may be the same as those of the step (3) in the above-described preparation process (14).

The preparation process (19) of the present invention is a process for the preparation of the product Y, which comprises the steps of (1) reacting the above-described compound (jb) with the above-described compound (j) or the above-described compound (bb) to produce the above-described product W, and (2) reacting the product W with one or more compounds or products selected from the above-described compound (c), the above-described compound (c-1), the above-described compound (cb), the above-described product C and the above-described product L.

The reaction conditions of the preparation process (19) may be the same as those in the above-described compound preparation process (18). The above-described compound (jb) is particularly preferably a compound which has one hydroxy group and has at least one epoxy, (meta)acryloyl, vinyl or ethynylene group, or a compound which has one group selected from primary amino, secondary amino, mercapto and carboxyl groups and has at least one vinyl or ethynylene group.

In all of the above-described preparation processes (14) to (19), when one or more products selected from the above-described product O, the above-described product Q, the above-described product S, the above-described product U, the above-described product V or the above-described product W obtained in the steps thereof (group 1) is reacted with one or more compounds or products (group 2) selected from the above-described compound (c), the above-described compound (c-1), the above-described compound (cb), the above-described product C and the above-described product L, to produce compound Y, it is preferable that the group 1 is reacted in an amount of 0.1 to 5 equivalent per hydroxy, mercapto, or secondary amino group of the group 2.

The preparation process (20) of the present invention is a process for the preparation of the product Y, in which a plurality of products (group 3) selected from the above-described product O, the above-described product Q, the above-described product S, the above-described product U, the above-described product V and the above-described product W are reacted with the above-described group 2, in an amount of the group 3 of 0.1 to 5 equivalent per hydroxy, mercapto, or secondary amino group of the group 2.

The reaction conditions in this case may advantageously follow the reaction conditions of the step (3) in the above-described preparation process (14) in the above-described range. Further, it is also possible that the above-described group 3 is separated into two groups of one or more products (group 4) selected from the above-described product O, the above-described product S and the above-described product V and one or more products (group 5) selected from the above-described product Q, the above-described product U and the above-described product W, and these two groups are combined and reacted with the above-described group 2.

The preparation process (21) of the present invention is a process for the preparation of a polyurethane resin, which comprises the step of reacting the product Y obtained in the preparation process (15), the product Y obtained in the preparation process (17), or the product Y obtained in the preparation process (19) when using a compound having one hydroxy group and at least one epoxy, (meta)acryloyl, vinyl or ethynylene group as the above-described compound (jb), with a silicon compound having an organic group (XIV) reactive with an epoxy, acryloyl, vinyl or ethynylene group, a titanium compound or zircoaluminate compound having the organic group (XIV).

The reaction of the above-described product Y with the silicon compound having an organic group (XIV) reactive with an epoxy or acryloyl group, the titanium compound or zircoaluminate compound having the organic group (XIV) is conducted at a temperature from −20° C. to 150° C. for 0.1 to 1000 hours. The above-described reaction may also be conducted in the presence of a medium such as an organic solvent and the like, and can also be conducted for over 1000 hours without any problem.

The preparation process (22) of the present invention is a process for the preparation of a polyurethane resin, which comprises the step of reacting the product Y obtained in the preparation process (15), the product Y obtained in the preparation process (17), or the product Y obtained in the preparation process (19) when using a compound having one hydroxy group and at least one epoxy, (meta)acryloyl, vinyl or ethynylene group as the above-described compound (jb), with a compound having an organic group reactive with an epoxy or acryloyl group and at least one above-described organic group (X).

The reaction conditions of the above-described product Y with a compound having an organic group reactive with an epoxy or acryloyl group and at least one above-described organic group (X) may be the same as those in the above-described preparation process (21).

The compounds used in preparing the above-described product Y will be described in detail below.

The above-described compound (ab) is selected from the above-described compounds (a-1), the above-described compounds (a-2) and the above-described compounds (a-5) in the above-described compounds (a). In addition to the above-described compounds, titanium compounds and zircoaluminate can also be used, and they may be the same as those described in the explanation of the above-described compound (a).

As the above-described compound (cb), polyamine compounds (manufactured by Texaco Chemical Corp.) in the above-described compounds (e) are listed.

As the above-described compound (eb), compounds in which the above-described organic group (VIII) has an acryloyl group such as the above-described compound (a-3) and the like, compounds in which the above-described organic group (VIII) has an epoxy group such as the above-described compound (a-4) and the like and compounds in which the above-described organic group (VIII) has a mercapto group such as the above-described compound (a-5) and the like may be listed.

As the above-described compound (fb), compounds having one more primary and secondary amino groups are listed when the above-described organic group (VIII) in the above-described compound (eb) is an acryloyl group, and compounds having a primary group and a secondary group are also included in addition to the compounds exemplified for the above-described compound (n) and the above-described compound (o). Further, one or more compounds selected from the above-described compound (p), the above-described compound (q), the above-described compound (a-1), the above-described compound (a-2), the above-described compound (a-4) and the above-described compound (a-5) can also be used.

As the above-described compound (gb), compounds having one epoxy group and one (meta)acryloyl group such as glycidyl methacrylate, glycidyl acrylate and the like; and vinyl acrylate, allylmercaptane and the like are listed, in addition to the above-described compound (v) and the above-described compound (t). These compounds can be used alone or in combination of two or more.

As the above-described compound (hb), one or more compounds selected from the above-described compound (h), the above-described compound (k), the above-described compound (n), the above-described compound (o), the above-described compound (p), the above-described compound (q), the above-described compound (v), the above-described compound (x), the above-described compound (a-1), the above-described compound (a-2), the above-described compound (a-4) and the above-described compound (a-5) can also be used.

As the above-described compound (ib), one or more compounds selected from the above-described compound (s), the above-described compound (a-1), the above-described compound (a-2), and the above-described compound (a-5) can also be used.

Regarding the above-described compound (jb), as the compound having an epoxy group, there are listed compounds having a hydroxy group such as glycidol and the like, and compounds having a carboxyl group such as glycidic acid and the like, as the compounds having a (meta)acryloyl group, there are listed compounds having a hydroxy group such as 2-hydroxymethyl (meta)acrylate, 2-hydroxypropyl (meta) acrylate and the like, compounds containing a secondary amino group such as (meta)acryliamide and the like, and compound having a carboxyl group such as acrylic acid, methacrylic acid and the like, as the compounds a vinyl group, there are listed compounds having a hydroxy group such as vinyl n-hexycarbinol, vinylmethylcarbinol, allyl alcohol, allylphenol, 1-butene-3-ol, 4-allylcatechol, α-phenylallyl alcohol, allylcarbinol and the like, compounds having a secondary amino group such as vinylaniline, allylaniline and the like, compounds having a primary amino group such as allylamine, cinnamylamine and the like, compounds having a carboxyl group such as 3-allyloxypropionic acid, allylacetic acid, 4-vinylbenzoylic acid and the like, and compounds having a mercapto group such as allylmercaptane and the like, and as the compounds having an ethynylene group, there are listed compounds having a hydroxy group such as 1-ethynyl-1-cyclohexanol, ethynylestradiol, eugenol, propargyl alcohol, 1-butyne-3-ol, 2-butyne-1-ol and the like, compounds having a secondary amino group such as 3-ethynylaniline, 4-ethynylaniline and the like, compounds having a primary amino group such as propargylamine and the like, compounds having a carboxyl group such as 2-butyne and the like, as well as other compounds.

The composition (1) of the present invention comprises one or more urethane resins selected from urethane resins obtained by any of the above-described preparation processes, and a curing catalyst for the resins.

As the curing catalyst, there can be used organotine, metal complex, base such as amine and the like, and organophosphoric acid compound and water (moisture in air) when the terminal reactive group of the resin is a hydrolyzable silicon, titanium or zircoaluminate, a polymerization initiator and a polymerization promoter when the reactive group is a (meta)

acryloyl group, platinum group (VIII group transition metal) catalyst and hydrosilane when the reactive group is a vinyl group (including an allyl group) or ethynylene, and amine and the like when the reactive group is an epoxy group.

Specifically, as the organotin compound, there are listed dibutyltin dilaurate, dioctyltin dimaleate, dibutyltin phthalate, stannous octoate, dibutyltin methoxide, dibutyltindiacetyl acetate, dibutyltin diversatate and the like.

As the metal complex, there are listed titanate compounds such as tetrabutyl titanate, tetraisopropyl titanate, triethanolamine titanate and the like, metal carboxylate salts such as lead octoate, lead naphthenate, nickel naphthenate, cobalt naphthenate and the like, metal acetylacetonate complexes such as aluminum acetylacetonate complex, vanadium acetylacetonate complex and the like.

As the base, there are listed aminosilanes such as γ-aminopropyltrimethoxysilane, γ-aminopropyltriethoxysilane and the like, quaternary ammonium salts such as tetramethylammonium chloride, benzalconium chloride and the like, straight-chain or cyclic tertiary amines and quaternary ammonium salts containing a plurality of nitrogen atoms such as DABCO (trade mark) series, DABUCO BL series and the like manufactured by Sankyo Air Products K.K., and the like.

As the organophosphoric acid compound, monomethylphosphoric acid, di-n-butylphosphoric acid, triphenyl phosphate and the like are listed.

As the polymerization initiator, dicumyl peroxide, cumene hydroperoxide, benzoyl peroxide, methyl ethyl ketone peroxide, acetyl peroxide, t-butyl hydroperoxide, cyclohexanone peroxide and the like are listed, however, the example is not limited to them providing it is a radical initiator.

As the polymerization promoter, amines such as triethylamine, tributylamine, tripropylamine, N,N-dimethyl-p-toluidine, diethylenetriamine, trietylenetetramine and the like, thioureas such as thiourea, ethylenethiourea, acetylthiourea, methylthiourea, tetramethylthiourea, dibutylthiourea and the like, metal soaps such as copper naphthenate, cobalt naphthenate and the like, salts of organic acids with metals such as copper, cobalt, manganese, vanadium and the like, inorganic acid salts, acetylaceton salts, ascorbic acid, and other known reducing agents are listed.

As the platinum group (VIII group transition metal) catalyst, chloroplatinic acid, chloroplatinic acid hexahydrate, $[(oleifn)PtCl_2]_2$, $Fe(CO)_5$, $Co_2(CO)_8$, $RuCl_3$, $IrCl_3$, $L_2Ni$ (olefin), $L_2NiCl_2$, $L_4Pd$, $L_2PdCl_2$, and $L_4Pt$ (wherein, L represents triphenylphosphine or trialkylphosphine) are listed.

The hydrosilane is a polymer having at least two Si—H bonds in the molecule and having a molecular weight of 100 to 100000, and examples thereof include polymethylsiloxanes having a terminal hydrogen atom such as tetramethyldisiloxane, and H 7322, O 9814, PS 537, PS 542, PS 543, PS 545 (trade mark) and the like manufactured by Chisso K.K., polymethylhydrosiloxanes such as PS 118, PS 119, PS 120, PS 122 and the like manufactured by the above-described company, polymethylhydro-dimethylsiloxane copolymers such as PS 123.5, PS 122.5, PS 123, PS 124.5 and the like manufactured by the above-described company, polymethylhydro-methylcyanopropylsiloxane copolymers such as PS 124 and the like manufactured by the above-described company, polymethylhydro-methyloctylsiloxane copolymers such as PS 125 and the like manufactured by the above-described company, polyethylhydrosiloxanes such as PS 128 and the like, polymethylhydrosiloxane-diphenylsiloxane-dimethylsiloxane terpolymer such as PS 129 and the like.

The compounding ratio of the resin to the above-described curing catalyst is usually 0.01 to 1000 parts by weight of the curing catalyst per 100 parts by weight of the resin.

The composition (2) comprises one or more urethane resins selected from the urethane resins obtained by any of the above-described preparation processes, a modified silicone resin, a curing catalyst for the above-described urethane resins and a curing catalyst for the modified silicone resin. The modified silicone resins are those produced by processes described in Japanese Patent Application Publication (JP-B) Nos. 56-5249, 57-26292, 59-25809, 61-25739, 61-18569, 61-18570, 61-29371, 61-36008, 63-37820, 63-61335, 63-62524, Japanese Patent Application Laid-Open (JP-A) Nos. 5-9260, 6-172630, 7-300555 and the like, and specifically, S 203, S 303, S 810, SAT 200, MA 430, MA 440 and the like manufactured by Kaneka Corp. are for example listed. Regarding compounding ratio of the urethane resin, modified silicone resin and curing catalyst, 0.01 to 10000 parts by weight of the modified silicone resin and 0.01 to 1000 parts by weight of the curing resin are usually used per 100 parts by weight of the urethane resin.

Further, the composition (3) of the present invention comprises a reaction product obtained by polymerization of a (meta)acryloyl group-containing monomer in the presence of one or more urethane resins selected from the urethane resins obtained by any of the above-described preparation processes or in the presence of the urethane resins and modified silicone resins, or a reaction product obtained by polymerization of the above-described (meta)acryloyl group-containing monomer in the presence of a (meta) acrylsilane compound or a compound having a mercapto group, and a curing catalyst for the above-described resins.

The (meta)acryloyl group-containing monomer is selected from the above-described compound (i), the above-described compound (q), the above-described compound (t), the above-described compound (v) and the like. In the process for preparing the reaction product by polymerization of a (meta)acryloyl group-containing monomer in the presence of the resin, the monomer is polymerized using a catalyst selected from polymerization initiators for the curing catalyst. The polymerization conditions may advantageously follow known processes for polymerizing the monomer using the catalyst.

In polymerizing the monomer, a (meta)acrylsilane compound or a compound having a mercapto group may be allowed to exist. The (meta)acrylsilane compound is selected from the above-described compounds (a-3), and the compound having a mercapto group is selected from the above-described compound (a-5), the above-described compound (e), the above-described compound (h) and the like. The compounding ratio of the reaction product to the curing catalyst is 0.01 to 1000 parts by weight of the curing catalyst per 100 parts by weight of the reaction product.

The composition (4) of the resent invention comprises (1) one or more urethane resins which are selected from urethane resins obtained by any of the above-described preparation processes and having the above-described hydrolyzable group, silicon atom, titanium or zirconium atom and aluminum atom, (2) an epoxy resin, (3) a ketimine compound, and (4) a curing catalyst for the above-described resin (1).

As the epoxy resin, Bisphenol A type epoxy resins, Bisphenol F type epoxy resins, novolak type epoxy resins, epoxy resins in which amine is converted into glycidyl, epoxy resins having a heterocycle, alicyclic epoxy resins, hydrogenated Bisphenol A type epoxy resins, urethane-modified epoxy resins, hydantoin type epoxy resins and the like are listed, and they may be used alone or in combination of two or more.

As the ketimine compound, there can be used compounds represented by the following structural formula and derivatives of the compound, for example, those obtained by reacting a compound having an epoxy group to an imino group of the compound.

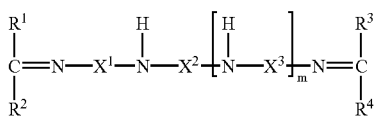

In the above-described formula, $R^1$, $R^2$, $R^3$ and $R^4$ represent the same or different groups selected from hydrogen, an alkyl group having 1 to 6 carbon atoms, a phenyl group and a phenyl group carrying an alkyl group having 1 to 6 carbon atoms, and $X_1$, $X_2$ and $X_3$ represents the same or different alkylene groups having 2 to 6 carbon atoms, and m is 0 or 1.

As the ketimine compound represented by the above-described structural formula, there are exemplified 2,5,8-triaza-1,8-nonadiene, 2,10-dimethyl-3,6,9-triaza-2,9-undecadiene, 2,10-diphenyl-3,5,9-triaza-2,9-undecadiene, 3,11-dimethyl-4,7,10-triaza-3,10-tridecadiene, 3,11-diethyl-4,7,10-triaza-3,10-tridecadiene, 2,4,12,14-tetramethyl-5,8,11-triaza-4,11-pentadecadiene, 2,4,20,22-tetramethyl-5,12,19-triaza-4,19-trieicosadiene, 2,4,15,17-tetramethyl-5,8,11,14-tetraaza-4,14-octadecadiene and the like.

As the compound having an epoxy group to be reacted to an imino group of the compound represented by the above-described structural formula, there are exemplified styrene oxide, butylglycidyl ether, allylglycidyl ether, p-tert-butylphenylglycidyl ether, p-sec-butylphenylglycidyl ether, m,p-cresylglycidyl ether, p-cresylglycidyl ether, vinylcyclohexane dioxide, glycidyl versatate, cardanol modified glycidyl ether, dimer acid glycidyl ester, 1,6-hexanediol diglycidyl ether, resorcino glycidyl ether, propylene glycol diglycidyl ether, 1,4-butanediol diglycidyl ether, neopentyl glycol diglycidyl ether and the like. Particularly, derivatives obtained by using styrene oxide are preferable. The ketimine derivative may be a compound obtained by reacting only one of two imino groups in the compound represented by the above-described structural formula with a compound having an epoxy group.

As the ketimine compound, compounds represented by the following general formula (1) and general formula (2) can also be used. In the general formula (1), n represents a number from 1 to 6. In the general formula (2), w+y+z is about 5.3.

The curing catalyst for the above-described resin (1) is selected from the curing catalysts in the above-described composition (1).

Regarding compounding ratio of the above-described resin (1), epoxy resin (2), ketimine compound (3) and the above-described resin (4), 0.1 to 200 parts by weight of the epoxy resin, 0.1 to 50 parts by weight of the ketimine compound and 0.1 to 1000 parts by weight of the curing catalyst are usually used per 100 parts by weight of the resin (1).

The composition (5) of the present invention comprises (1) a modified silicone resin and/or one or more urethane resins selected from urethane resins obtained by any of the above-described preparation processes, (2) an epoxy resin, and one or more urethane resins selected from urethane resins obtained by in any of the above-described preparation processes and having an epoxy group, (3) a ketimine compound, and (4) a curing catalyst for the above-described modified silicone resin (1) and/or a curing catalyst for the urethane resin.

The modified silicone resin, epoxy resin and ketimine compound are respectively selected from those exemplified above. The catalyst for the above-described modified silicone resin is selected from curing catalysts which can be used when the terminal reactive group in the above-described resin used in the above-described composition (1) is a hydrolyzable silicon, titanium or zircoaluminate.

Regarding compounding ratio of the above-described modified silicone resin and/or urethane resin (1), the above-described epoxy resin and urethane resin (2), the above-described ketimine compound (3) and the above-described curing catalyst (4) for the modified silicone resin, 0.1 to 100000 parts by weight of the above-described epoxy resin and urethane resin (2), 0.1 to 1000 parts by weight of the above-described ketimine compound (3) and 0.1 to 1000 parts by weight of the above-described curing catalyst (4) are usually used per 100 parts by weight of the above-described modified silicone resin and/or urethane resin (1). When a modified silicone resin and a urethane resin are used together in the above-described system (2), the compounding ratio of the modified silicone resin to the urethane resin is usually 0.1 to 1000 parts by weight of the modified silicone resin per 100 parts by weight of the urethane resin. The compounding ratio of an epoxy resin to a urethane resin is usually 0.1 to 1000 parts by weight of the urethane resin per 100 parts by weight of the epoxy resin.

The composition (6) of the present invention comprises (1) liquid A comprising one or more urethane resins selected from urethane resins obtained by any of the above-described

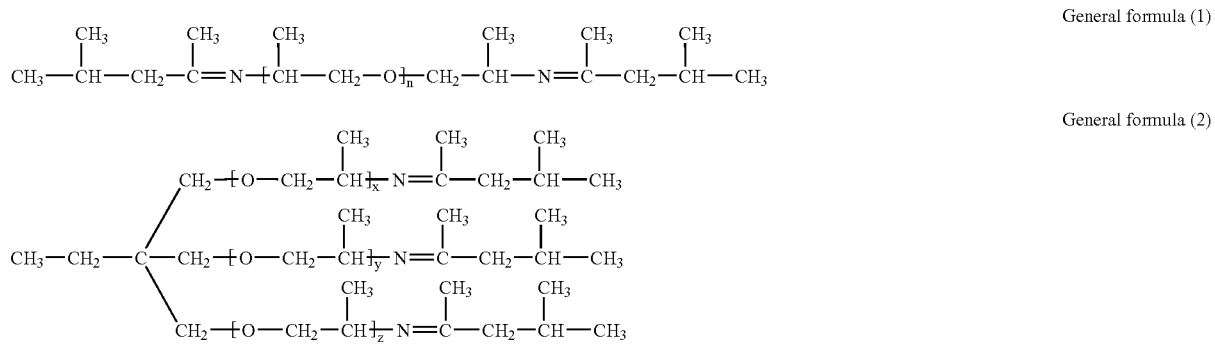

General formula (1)

General formula (2)

preparation processes and having the above-described hydrolyzable group and silicon atom, titanium or zirconium atom and aluminum atom, and a curing resin for an epoxy resin, and (2) liquid B comprising an epoxy resin, and a curing resin for the above-described urethane resins (1).

As the curing catalyst for an epoxy resin, there are listed ethylenediamine, 1,3-propanediamine, hexamethylenediamine, diethylenetriamine, triethylenetetraamine, 2,2,4-trimethyl-1,6-hexanediamine, m-xylylenediamine, bis(4-aminocyclohexyl)propane, isophoronediamine, polyamideamine, polyphenols, acid anhydrides, tertiary amines, alcohols, imdazoles, acetylacetonato metal salts, phosphines and the like, and they can be used alone or in combination of one or more.

The epoxy resin is selected from those exemplified above. The curing catalyst for the above-described urethane resins (1) is selected from the curing catalysts in the above-described composition (1).

The compounding ratio of the curing catalyst for the urethane resin (1) and epoxy resin in the liquid A is usually 0.1 to 200 parts by weight of the curing catalyst per 100 parts by weigh of the urethane resin (1). The compounding ratio of the curing catalyst for the urethane resin (1) and epoxy resin in the liquid B is usually 0.1 to 1000 parts by weight of the curing catalyst per 100 parts by weigh of the epoxy resin. Further, the compounding ratio of the liquid A to the liquid B is usually from 0.1 to 1000 parts by weight of the liquid B per 100 parts by weight of the liquid A.

The composition (7) of the present invention comprises (1) liquid A comprising a modified silicone resin and/or one or more urethane resins selected from urethane resins obtained by any of the above-described preparation processes and a curing resin for an epoxy resin, and (2) liquid B comprising one or more urethane resins selected from urethane resins obtained by any of the above-described preparation processes and having an epoxy group, and a curing catalyst for the above-described modified silicone resin (1).

The modified silicone resin and the curing catalyst for the modified silicone resin are respectively selected from those exemplified above.

The compounding ratio of the curing catalyst for an epoxy resin to the resins in the liquid A is usually 0.1 to 1000 parts by weight of the curing catalyst per 100 parts by weight of the resins. When a modified silicone resin and a urethane resin are used together in the liquid A, the compounding ratio of the modified silicone resin to the urethane resin is usually 0.1 to 1000 parts by weight of the modified silicone resin per 100 parts by weight of the urethane resin. The compounding ratio of the curing catalyst for a modified silicone resin to the resins in the liquid B is usually 0.1 to 1000 parts by weight of the curing catalyst for a modified silicone resin per 100 parts by weight of the resins. Further, the compounding ratio of the liquid A to the liquid B is usually 0.1 to 1000 parts by weight of the liquid B per 100 parts by weight of the liquid A.

The composition (8) of the present invention comprises (1) liquid A comprising one or more urethane resins selected from urethane resins obtained by any of the above-described preparation processes, a (meta)acryloyl group-containing monomer and a polymerization initiator or polymerization promoter for the above-described monomer (a polymerization initiator when a polymerization promoter is used in the following (2)), and (2) liquid B comprising a (meta)acryloyl group-containing monomer, a polymerization promoter or polymerization initiator for the above-described monomer (a polymerization promoter when a polymerization initiator is used in the above-described (1)), and a curing catalyst for urethane resins in the above-described liquid A (1).

The (meta)acryloyl group-containing monomer is selected from those used in the above-described composition (3). The polymerization initiator for the monomer is selected from the polymerization initiators for the curing catalyst in the above-described composition (1). The polymerization promoter for the monomer is selected from the polymerization promoters for the curing catalyst in the above-described composition (1). The curing catalyst for the urethane resin is selected from the curing catalysts in the above-described composition (1).

Regarding compounding ratio of the urethane resin, the (meta)acryloyl group-containing monomer and the polymerization initiator or polymerization promoter for the monomer in the liquid A, 0.1 to 1000 parts by weight of the (meta)acryloyl group-containing monomer and 0.01 to 50 parts by weight of the polymerization initiator or polymerization promoter for the monomer are usually used per 100 parts by weight of the urethane resin. Regarding compounding ratio of the (meta)acryloyl group-containing monomer, the polymerization promoter or polymerization initiator for the monomer and the curing catalyst for the urethane resin in the liquid B, 0.01 to 50 parts by weight of the polymerization promoter or polymerization initiator for the monomer, 0.01 to 1000 parts by weight of the curing catalyst for the urethane resin are usually used per 100 parts by weight of the (meta)acryloyl group-containing monomer. Further, the compounding ratio of the liquid A to the liquid B is usually 0.1 to 1000 parts by weight of the liquid B per 100 parts by weight of the liquid A.

In this composition (8), a modified silicone resin can be compounded in the liquid A, and the urethane resin, the modified silicone resin and/or the curing catalyst for the modified silicone resin in the liquid A can be compounded in the liquid B.

The composition (9) of the present invention comprises (1) liquid A comprising a modified silicone resin, a (meta)acryloyl group-containing monomer, a curing catalyst for urethane resins in the following (2), and a polymerization initiator or polymerization promoter for the above-described monomer (a polymerization initiator when a polymerization promoter is used in the following (2), a polymerization promoter when a polymerization initiator is used in the following (2)), and (2) liquid B comprising one or more urethane resins selected from urethane resins obtained by any of the above-described preparation processes, a (meta)acryloyl group-containing monomer, a polymerization promoter or polymerization initiator for the above-described monomer (a polymerization promoter when a polymerization initiator is used in the (1), a polymerization initiator when a polymerization promoter is used in the (1)), and a curing catalyst for the above-described modified silicone resin.

The (meta)acryloyl group-containing monomer and the polymerization initiator or polymerization promoter for the monomer may be the same as those in the above-described composition (8). The modified silicone resin and the curing catalyst thereof are respectively selected from the above-described compounds.

Regarding compounding ratio of the modified silicone resin, the (meta)acryloyl group-containing monomer and the polymerization initiator or polymerization promoter for the monomer in the liquid A, 0.1 to 1000 parts by weight of the monomer and 0.01 to 50 parts by weight of the polymerization promoter or polymerization initiator for the monomer are usually used per 100 parts by weight of the modified silicone resin. Regarding compounding ratio of the urethane resin, the (meta)acryloyl group-containing monomer, the polymerization promoter or polymerization initiator for the monomer and the curing catalyst for the modified silicone resin in the liquid B, 10 to 1000 parts by weight of the urethane resin, 0.01 to 50 parts by weight of the polymerization promoter or polymerization initiator for the monomer, and 0.01 to 1000 parts by weight of the curing catalyst for the modified silicone resin are usually used per 100 parts by weight of the monomer. Further, the compounding ratio of the liquid A to the liquid B is usually 0.1 to 1000 parts by weight of the liquid B per 100 parts by weight of the liquid A.

In this composition (9), one or more urethane resins selected from urethane resins obtained by any of the above-described preparation process can be compounded in the liquid A, and a modified silicone resin and/or the curing catalyst for the modified silicone resin can be compounded in the liquid B respectively, if necessary.

For the purpose of improving controlling property of curing speed and adhesion of the products X and/or the products Y obtained in the above-described preparation process of the present invention, a silicone compound having one primary or secondary amino group, two or more primary or secondary amino groups, or at least one primary and secondary amino groups, and one epoxy group, mercapto group or acryloyl group and having at least one alkoxy group in the group, silicon compound or zircoaluminate or methyl silicate, ethyl silicate and oligomer thereof (hereinafter, these are called a compound (za)) may be added in an amount of 0.1 to 10.0 parts by weight per 100 parts of the product X and/or the product Y. As the method for using the compound (za), there are listed a method in which the product A, the product D, the product E and the compound (za) are mixed, then, the product B is reacted, a method in which the product A, the product D, the product E and the product B and the compound (za) are simultaneously reacted.

Further, for improving adhesion of contaminants such as dust and the like, an air-oxidizing curing type unsaturated group-containing compound, for example, polymers or copolymers of 1,2-butadiene, 1,4-polybutadiene and $C_5$ to $C_8$ diene; various alkyd resins obtained by modifying dry oil such as tung oil, linseed oil and the like and compounds thereof; acrylic resins, epoxy resins and silicone resins modified by the dry oil; various modified compounds of the above-described polymers and copolymers (maleated modified compounds, boil oil-modified compounds and the like) may be added to the product X and/or the product Y. These compounds may be used alone or in combination of two or more. These compounds are used in an amount of 0.05 to 15 parts by weight, preferably 1 to 10 parts by weight per 100 parts by weight of the product X and/or the product Y. When the amount is less than 0.05 parts, improvement in adhesion of pollutants such as dust and the like is not sufficient, and in case of over 15 parts by weight, tensile property and the like of the cured compounds of the product X and/or the product Y are lost.

In the product X, the product Y and the above-described resin compositions obtained in the above-described preparation processes of the present invention, fillers, plasticizers, various additives, solvents, dehydrating agents and the like can be further added if necessary.

As the above-described filler, fumed silica, calcium carbonate, magnesium carbonate, clay, talc, various balloon are listed.

As the above-described plasticizer, phthalates such as dioctyl phthalate, dibutyl phthalate and the like, aliphatic carboxylates such as dioctyl adipate, dibutyl senacate and the like, can be used.

As the above-described additive, antioxidants, ultraviolet absorbing agents, pigments, various tackifiers, titanate coupling agents, aluminum coupling agents and the like are listed.

As the above-described solvents, any solvent may be used providing it has excellent compatibility with the product X, the product Y and the above-described resin compositions and the water content thereof is 500 ppm or less.

As the above-described dehydrating agent, quick lime, orthophosphates, anhydrous sodium sulfate, zeolite, methylsilicate, ethylsilicate, various alkylalkoxysilane, various vinylalkosysilane and the like are listed.

EXAMPLE

The following examples further illustrate the present invention more specifically below. In the examples and comparative examples, percent (%) and part are by weight.

Compound (a)
  KBE 903 (γ-aminopropyltriethoxysilane)
  KBM 903 (γ-aminopropyltrimethoxysilane)
  KBM 902 (γ-aminopropylmethyldimethoxysilane)
  KBM 5103 (γ-acryloylpropyltrimethoxysilane)
  KBM 403 (γ-glycidoxypropyltrimethoxysilane)
  KBM 803 (γ-trimethoxysilylpropylmercaptane)
  KBM 802 (γ-dimethoxysilylpropylmethylmercaptane)
  KBM 602 (N-β(aminoethyl)γ-aminopropylmethyldimethoxysilane)
  KBM 503 (γ-methacryloylpropyltrimethoxysilane)
  X-12-896 (N-ζ(aminoxylyl)γ-aminopropyltrimethoxysilane)
  (the above-described compounds are manufactured by Shin-Etsu Chemical Co., Ltd.)

Compound (b)
  2EHA (2-ethylhexyl acrylate)
  BA (n-butyl acrylate)
  (the above-described compounds are manufactured by Toagosei Co., Ltd.)
  LA (lauryl acrylate) (manufactured by Kyoeisha Kagaku K.K.)
  PMI (phenylmaleimide) (manufactured by Nippon Shokubai K.K.)
  2HGE (2-ethylhexyl glycidyl ether)
  PTBFGE (p-tert-butylphenyl glycidyl ether)
  (the above-described compounds are manufactured by A•C• I Japan Limited.)

Polyol (Compound (c))
  Preminol 4010, 3010 (polyether polyol having an average molecular weight of 10000)(manufactured by Asahi Glass Co., Ltd.)
  P-1000 (polyether polyol having an average molecular weight of 1000)
  P-3000 (polyether polyol having an average molecular weight of 3000)
  (the above-described compounds are manufactured by Asahi Denka Kogyo K.K.)
  HPVM 2203 (polyol having an ethylene-butylene skeleton)(manufactured by Shell Japan Corp.)
  Dynacol 7360 (polyester polyol)
  Dynacol 7361 (polyester polyol)

(the above-described compounds are manufactured by Huels Corp.)

Polyisocyanate Compound (Compound (d))
Sumidur 44S (4,4'-diphenylmethane diisocyanate) (manufactured by Sumitomo Bayer Urethane Corp.)
Takenate 500 (1,4-xylylene diisoyanate)
Takenate 600 (1,3-bisisocyanate methylcyclohexane)
(the above-described compounds are manufactured by Takeda Chemical Industries, Ltd.)
Desmodur I (3-isocyanate methyl-3,5,5-trimethylcyclohexyl isocyanate)
Sumidure T-80 (2,4-; 2,6-toluene diisocyanate)
(the above-described compounds are manufactured by Sumitomo Beyer Urethane Corp.)

Titanium Compound (Compound (s))
Plenact KR 41B (titanium coupling agent)
Plenact KR 338X (titanium coupling agent)
(the above-described compounds are manufactured by Ajinomoto Co., Inc.)

Epoxy Resin
Epikote 828 (manufactured by Yuka Shell Epoxy K.K.)

Epoxy Resin Curing Agent
Ankamine K54 (manufactured by Air Product K.K.)

Dehydrating Agent
KBE 1003 (vinyltriethoxysilane)(manufactured by Shin-Etsu Chemical Co., Ltd.)

Ketimine Compound
A compound obtained by reacting one mol of 2,4,12,14-tetramethyl-5,8,11-triaza-4,11-pentadecadiene with one mol of styrene oxide at 150° C. for 2 hours was used.

Tin Catalyst
Stann BL, No. 918 (manufactured by Sankyo Yuki Gosei K.K.)

Others
Commercially available reagents are used for all compounds.

Compound (1)
TDI or phenyl diisocyanate which is a compound (j) was placed in a reaction vessel, and ethylene glycol mono n-butyl ether or t-butanol which is a compound (k) and the compound (j) were mixed and stirred for 1 hour at room temperature under nitrogen atmosphere with dropping the compound (k) in proportions of the compound (k) to the compound (j) shown below, then, the reaction was continues for 2 hours at 80° C. to obtain a compound (l)(1-1, 1-2).
 (1-1) TDI: ethylene glycol mono n-butyl ether=174:118
 (1-2) phenyl diisocyanate:t-butanol=192:74

Product Σ
The compound (a) and the compound (b) described above were used in proportions shown below and they were mixed at room temperature, then, kept at 60° C. for 5 days, to produce products Σ ((Σ-1) to (Σ-32)). The product Σ in the examples means a general term for the above-described products A, D, E, F, I, N, P, R and T.
 (Σ-1) 2EHA:KBE 903=184:222 (g:g, hereinafter the same)
 (Σ-2) 2EHA:KBM 903=184:188
 (Σ-3) BA:KBM 903=128:187
 (Σ-4) LA:KBM 903=240:185
 (Σ-5) THFA:KBM 903=156:186
 (Σ-6) n-propyamine: KBM 5103=55:222
 (Σ-7) PMI:BA:KBM 903=17.3:51.3:95
 (Σ-8) 2-pyrrolidone:KBM 403=85.1:260
 (Σ-9) pyrrolidine:KBM 403=71:260
 (Σ-10) 2HGE:KBM 803=186:177
 (Σ-11) PTBFGE:KBM 803=206:177
 (Σ-12) phenylglycidyl ether:KBM 803=150:177
 (Σ-13) 2EHA:KBM 803=116:187
 (Σ-14) methyl acrylate:KBM 903=86:269
 (Σ-15) methyl acrylate:KBM 903=86:188
 (Σ-16) methyl acrylate:KBM 903=86:206
 (Σ-17) methyl acrylate:KBM 903=86:183
 (Σ-18) 2EHA:KBM 602=184:206
 (Σ-19) 2EHA:KBM 602=369:206
 (Σ-20) KBM 403:phenetylamine=236:121
 (Σ-21) KBE 903:phenylglycidyl ether=150:221
 (Σ-22) KBM 903:phenylmaleimide=179:173
 (Σ-23) Epikote 828:KBM 802=380:360
 (Σ-24) (Σ-23):p-toluenesulfonyl isocyanate=740:197
 (Σ-25) KBM 602:KBM 5102=206:400
 (Σ-26) KBM 403:KBM 803=236:196
 (Σ-27) KBM 602:2EHA=206:184
 (Σ-28) KBM 403:(Σ-27)=236:394
 (Σ-29) KBM 573:2HGE=255:270 (kept for week at 50° C.
 (Σ-30) KBM 573:KBM 402=255:250 (the same as above)
 (Σ-31) KBM 602 (206 g) was reacted with diethyl maleate (173 g) at 50° C. for 5 hours, then, left for 5 days at 50° C. after adding 2EHA (184 g).
 (Σ-32) KBM 602 (206 g) was reacted with diethyl maleate (173 g) at 50° C. for 5 hours, then, (Σ-27)(290 g) was added.

Examples 1 to 17, 20, 21 (Comparative Examples 6 to 8)

Into a reaction vessel were charged polyols shown in Tables 1 to 4 and Table 6 and Sumidur 44S which is a polyisocyanate compound (d) in proportions shown in the tables (ratio by weight, hereinafter the same), and they were reacted for 3 hours at 90° C. with stirring in nitrogen atmosphere to obtain products B. Each isocyanate group (NCO) content of the products B obtained in the examples was 3% or less. Subsequently, the products B were cooled to 50° C., and products Σ shown in Tables 1 to 4 and Table 6 were charged in proportions shown in the examples, and the mixture was heated up to 90° C. and reacted for 1 hour under nitrogen atmosphere to produce products.

The properties and conditions of the resulted products were observed and isocyanate contents were measured, and results thereof are shown in the tables. The products were kept for 1 week and 2 weeks at 40° C., then, viscosity was measured and results thereof are shown in the tables.

Examples 18, 19 (Comparative Examples 9, 10)

Into a reaction vessel were charged polyols and polyisocyanate compounds shown in Tables 3, 4 and 6 in proportions shown in the tables, and they were reacted for 6 hours at 90 with stirring in nitrogen atmosphere to obtain products B. Each isocyanate group (NCO) content of the products B obtained in the examples was 2% or less. Subsequently, the products B were cooled to 50° C., and products Σ shown in Tables 3, 4 and 6 were charged in proportions shown in the examples, and the mixture was heated up to 90° C. and reacted for 1 hour under nitrogen atmosphere to produce products.

The properties and conditions of the resulted products were observed and isocyanate contents were measured, and results thereof are shown in the tables. The products were kept for 1 week and 2 weeks at 40° C., then, viscosity was measured and results thereof are shown in the tables.

Comparative Examples 1 to 3

Into a reaction vessel were charged polyols and polyisocyanate compounds shown in Table 5 in proportions shown in the table, and they were reacted for 3 hours at 90' with stirring in nitrogen atmosphere to obtain products B. In Comparative Example 1, KBM 903 was charged, and the reaction was stopped immediately. The properties and conditions of the resulted products were observed and isocyanate contents were measured, and results thereof are shown in the tables. The products were kept for 1 week and 2 weeks at 40° C., then, viscosity and isocyanate contents were measured and results thereof are shown in the tables.

Comparative Examples 4, 5

Into a reaction vessel were charged polyols and polyisocyanate compounds shown in Table 5 in proportions shown in the table, and they were reacted for 6 hours at 90° C. with stirring in nitrogen atmosphere to obtain products B.

The properties and conditions of the resulted products were observed and isocyanate contents were measured, and results thereof are shown in the tables. The products were kept for 1 week and 2 weeks at 40° C., then, viscosity and isocyanate contents were measured and results thereof are shown in the tables.

Comparative Example 11

A product was obtained in the same manner as in Comparative Example 2 except that 10 parts by weight of KBM 803 was further used in Comparative Example 2, As shown in tables, any of the products X obtained in the examples exhibited excellent storage stability, and could provide a resin composition having excellent curing property without foaming by addition of a tin catalyst (No. 918).

As shown in Comparative Example 1, a product having excellent stability can not be obtained by addition of only a silicon compound containing a primary amine. Further, as shown in Comparative Examples 2 to 5, if reaction with the product Σ is not conducted, a product having excellent storage stability can not be obtained or curing requires 2 days or more even if storage stability is excellent.

Further, as shown in Comparative Examples 6 to 10, a product having excellent storage stability can not be obtained if the remaining isocyanate in a prepolymer is not substituted by the product Σ in equivalent or more.

Then, a catalyst (No. 918; manufactured by Sankyo Yuki Gosei K.K.), calcium carbonate heavy of which water content had been controlled to 1000 ppm or less (trade name: NS 2300, manufactured by Nitto Hunka Kogyo K.K.) and partial amino silane (trade name: KBM 603, manufactured by Shin-Etsu Chemical Co., Ltd.) were compounded into the products obtained in Examples 4, 5, 6, 13, 21 or Comparative Example 11 in proportions shown in Table 7.

These compositions were sufficiently mixed by a planetary mixer under reduced pressure, then, time before surface tension was measured. Sheets having a size of 1.5 mm were made from the compositions and left for 7 days at a temperature of 23° C. and a relative humidity of 50%, and storage elasticity coefficients and loss elasticity coefficients were measured at 20° C. and the results are shown in Table 7.

Figure 2:
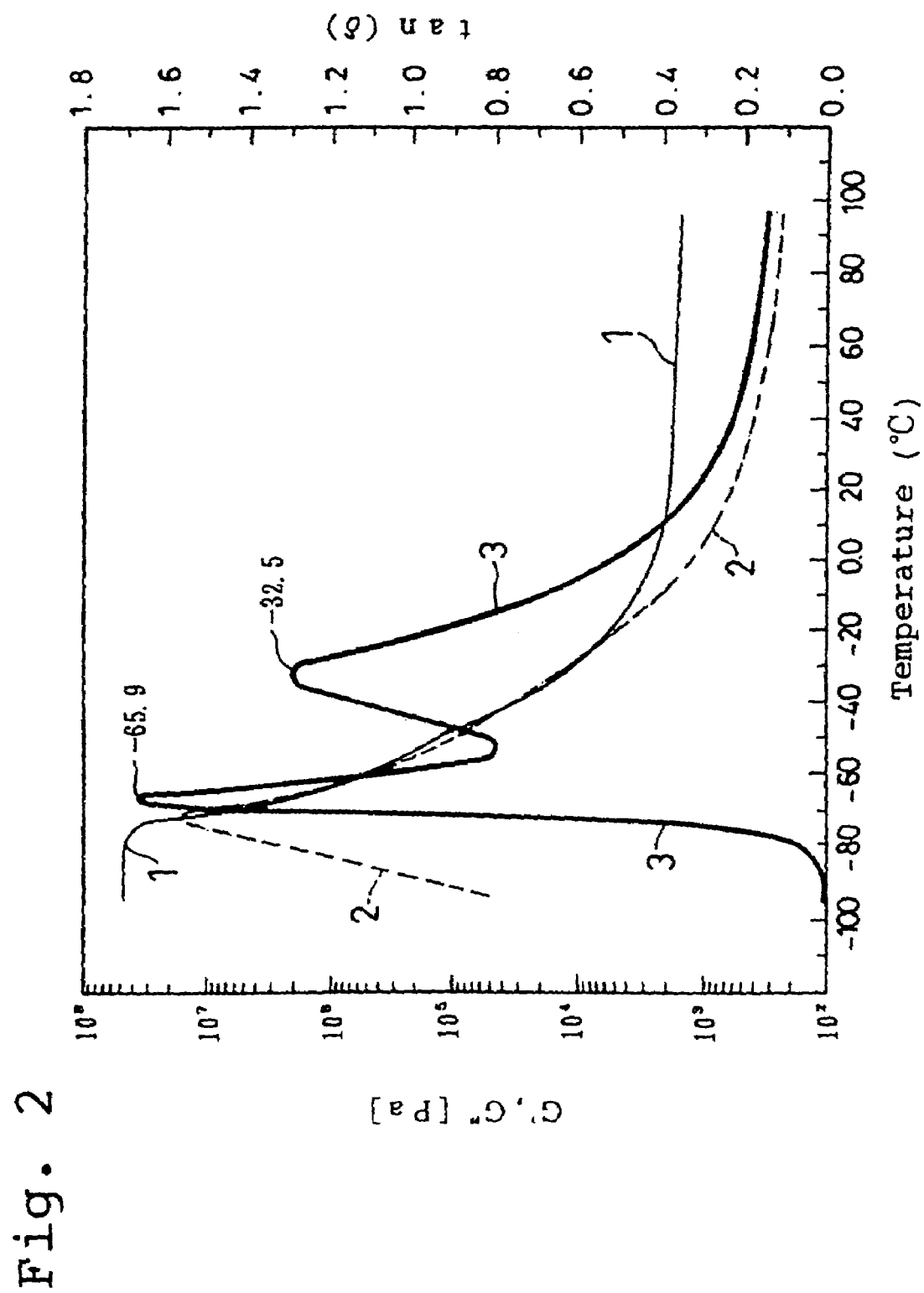
FIG. 2 shows a spectrum of dynamic viscoelasticity of the cured material of the product obtained in Example 21.

Dynamic viscoelasticity of the cured material was measured using RDS-11 manufactured by Rheometric Far East K.K. at a frequency of 1 Hz with temperature range of –100° C. to 100° C. at a temperature rising speed of 5° C./min. Spectrums of dynamic viscoelasticity of cured materials of the products obtained in Example 5 and Example 21 are shown in FIG. 1 and FIG. 2 respectively. Peak tops of tan δ are represented by tan δ1 (lower temperature side) and tan δ2 (higher temperature side), and temperatures there of are also shown in Table 7 together.

From these results, it is known that resin property is influenced by the difference between a hard monomer and a soft monomer. Further, it is known that curing time significantly differs depending on difference in modification method of the product Σ. Particularly, the products obtained in Examples 4, 5, 6 and 21 show a tension time of 10 minutes or shorter, therefore, it is known that a resin having higher curing speed can be obtained. Further, it is also known that the product obtained by the modification method in Example 13 can delay curing time. The product obtained by the modification method using only a mercaptosilane in Comparative Example 11 is not cured even after 1 week. The products obtained in Example 5 and 21 exhibit storage elasticity coefficients of $1\times10^4$ and $2\times10^3$, namely, significantly different resin property. Further, it is also known that glass transition temperature varies significantly by the difference of modification method (product Σ) even if the main chain is identical, peak of when tan δ is regarded glass transition temperature. Therefore, it is shown that formulation can be selected in view of both urethane prepolymer (product B) and modified material (product Σ) according to intended abilities.

Example 22 (Comparative Examples 12)

Into a reaction vessel were charged polyols and polyisocyanate compounds (d) shown in Table 4, and they were reacted for 3 hours at 90° C. with stirring in nitrogen atmosphere to obtain products B (in this example and comparative example and followings, the product B also include a product M). Each isocyanate group (NCO) content of the products B obtained in the examples was 3% or less. The systems were cooled to 50° C., and products Σ shown in Tables 4 were charged, and products were produced in the same manner as in Example 1. The properties and conditions of the resulted products were observed and isocyanate contents were measured, and results thereof are shown in Table 4. The products were kept for 1 week and 2 weeks at 40° C., then, viscosity and isocyanate contents were measured and results thereof are shown in Table 4.

Examples 23 to 25

Into a reaction vessel were charged polyols and polyisocyanate compounds (d) shown in Table 8, and they were reacted for 3 hours at 90° C. with stirring in nitrogen atmosphere to obtain products B. Isocyanate group (NCO) content of each product B obtained in the examples was 3% or less. The systems were cooled to 50° C., and products (Σ-18) (Example 23), (Σ-20) (Example 24) and (Σ-21) (Example 24) were charged, and they were reacted for 1 hour at 90° C. with stirring in nitrogen atmosphere, further, the compound (1-1) was added in an amount shown in Table 8 and reacted (Example 23), the compound (1-1) was added in an amount shown in Table 8 and reacted for 3 hours at 90° C. with stirring in a nitrogen atmosphere (Example 24) or the compound (1-1) was added in an amount shown in Table 8 and reacted for 3 hours at 90° C. with stirring in a nitrogen atmosphere (Example 25) to obtain products. The properties and conditions of the resulted products were observed and isocyanate contents were measured, and results thereof are shown in Table 8. The products were kept for 1 week and 2 weeks at 40° C., then, viscosity and isocyanate contents were measured and results thereof are shown in Table 8.

Examples 26 to 32

Into a reaction vessel were charged polyols and polyisocyanate compounds (d) shown in Tables 8 and 9, and they were reacted for 3 hours at 90° C. with stirring in nitrogen atmosphere to obtain products B. Isocyanate group (NCO) content of each product B obtained in the examples was 3% or less. The systems were cooled to 50° C., and products shown in Tables 8 and 9 were charged, and products were produced in the same manner as in Example 1 (in Example 27, reaction was conducted at 90° C., for 3 hours). The properties and conditions of the resulted products were observed and isocyanate contents were measured, and results thereof are shown in Tables 8 and 9. The products were kept for 1 week and 2 weeks at 40° C., then, viscosity and isocyanate contents were measured and results thereof are shown in Tables 8 and 9.

Examples 33, 34

Into a reaction vessel were charged polyols and polyisocyanate compounds (d) shown in Table 9, and they were reacted for 3 hours at 90° C. with stirring in nitrogen atmosphere to obtain products B. Isocyanate group (NCO) content of each product B obtained in the examples was 3% or less. The systems were cooled to 50', and products Σ shown in the table were charged, and ring-forming condensation reaction was conducted for 24 hours at 90° C. to produce products. The properties and conditions of the resulted products were observed and isocyanate contents were measured, and results thereof are shown in Table 9. The products were kept for 1 week and 2 weeks at 40° C., then, viscosity and isocyanate contents were measured and results thereof are shown in Table 9.

Examples 35

Into a reaction vessel were charged a polyol and a polyisocyanate compound (d) shown in Table 10, and they were reacted for 3 hours at 90° C. with stirring in nitrogen atmosphere to obtain a product B. The isocyanate group (NCO) content of the product B was 3% or less. The system was cooled to 50° C., and 22.1 g of hydroxyethyl acrylate was added, the mixture was heated up to 90° C. and reacted for 1 hour in nitrogen atmosphere, cooled to 40° C., then, 3.9 g of KBM 902 was further added, the mixture was stirred as it was for 1 hour without heating to produce a product. The properties and conditions of the resulted product were observed and isocyanate content was measured, and results thereof are shown in Table 10. The products were kept for 1 week and 2 weeks at 40° C., then, viscosity and isocyanate content were measured and results thereof are shown in Table 10.

Examples 36

Into a reaction vessel were charged a polyol and a polyisocyanate compound (d) shown in Table 10, and they were reacted for 3 hours at 90° C., with stirring in nitrogen atmosphere to obtain a product B. The isocyanate group (NCO) content of the product B was 3% or less. The system was cooled to 50° C., and 1.4 g of glycidol was added, the mixture was heated up to 90° C. and reacted for 1 hour in nitrogen atmosphere, then, 15.0 g of (Σ-1) was further added, and they were reacted for 2 hours at 60° C. to produce a product. The properties and conditions of the resulted product were observed and isocyanate content was measured, and results thereof are shown in Table 10. The products were kept for 1 week and 2 weeks at 40° C., then, viscosity and isocyanate content were measured and results thereof are shown in Table 10.

Examples 37

Into a reaction vessel were charged a polyol and a polyisocyanate compound (d) shown in Table 10, and they were reacted for 3 hours at 90° C. with stirring in nitrogen atmosphere to obtain a product B. The isocyanate group (NCO) content of the resulted product B was 3% or less. The system was cooled to 50° C., and 3.4 g of KBM 802 was added, the mixture was heated up to 90° C. and reacted for 5 hours in nitrogen atmosphere, then, 10.0 g of (Σ-1) was further added, and they were reacted for 0.5 hours at 90° C. to produce a product. The properties and conditions of the resulted product were observed and isocyanate content was measured, and results thereof are shown in Table 10. The products were kept for 1 week and 2 weeks at 40° C. , then, viscosity and isocyanate content were measured and results thereof are shown in Table 10.

Examples 38

Into a reaction vessel were charged a polyol and Sumidur 44S which is a polyisocyanate compound (d) shown in Table 10, and they were reacted for 3 hours at 90° C. with stirring in nitrogen atmosphere to obtain a product B. The system was cooled to 50° C., and 0.3 g of glycidol was added, the mixture was heated up to 90 and reacted for 2 hours in nitrogen atmosphere, then, 10.0 g of (Σ-1) was further added, and they were reacted for 30 minutes, then, cooled to room temperature. Then, 0.05 g of a ketimine derivative, 2 g of vinyl silane (trade name: KBE 1003 manufactured by Shin-Etsu Chemical Co., Ltd.) and 0.2 g of Stann BL were added and a product was produced. The properties and conditions of the resulted product were observed and isocyanate content was measured, and results thereof are shown in Table 10. The products were kept for 1 week and 2 weeks at 40° C., then, viscosity and isocyanate content were measured and results thereof are shown in Table 10.

Examples 39

Into a reaction vessel were charged a polyol and Sumidur 44S which is a polyisocyanate compound (d) shown in Table 10, and they were reacted for 3 hours at 90° C. with stirring in nitrogen atmosphere to obtain a product B. The system was cooled to 50° C. , and 1.4 g of glycidol was added, the mixture was heated up to 90° C. and reacted for 2 hours in nitrogen atmosphere, then, 15 g of (Σ-1) was further added, and they were reacted for 30 minutes, then, cooled to room temperature. Then, 0.3 g of a ketimine compound, 2 g of KBE 1003 and 0.2 g of Stann BL were added and a product was produced. The properties and conditions of the resulted product were observed and isocyanate content was measured, and results thereof are shown in Table 10. The products were kept for 1 week and 2 weeks at 40° C., then, viscosity and isocyanate content were measured and results thereof are shown in Table 10.

When 1 part of Stann BL was added to 100 parts of resin compositions produced in Examples 38 and 39, films were formed having higher toughness as compared with a film formed by adding Stann BL to the product produced in Example 7. In the Examples 38 and 39, poor curing property at lower temperature can be avoided since an alkoxysilyl group and an epoxy group exist in the same molecule.

Example 40

Into a reaction vessel, 400 g of Preminol 4010 was added and heated up to 90° C., and a mixture produced by adding 3 g of AIBN (azoisobutyronitrile) to 40 g of methyl methacrylate (MMA), 80 g of BA, 4 g of KBM 5103 and 3 g KBM 803 was added dropwise over 4 hours at 80° C., 3 g of AIBN was further added and reacted at the same temperature for 1 hour. Then, the mixture was cooled to 50° C., 16.4 g of Sumidur 44S was added, and they were reacted for 3 hours at 90° C. with stirring in nitrogen atmosphere, then, 60 g of ($\Sigma$-2) was further added, and they were reacted for 30 minutes to produce a product. The properties and conditions of the resulted product were observed and isocyanate content was measured, and results thereof are shown in Table 11. The products were kept for 1 week and 2 weeks at 40° C., then, viscosity and isocyanate content were measured and results thereof are shown in Table 11.

When 1 part of Stann BL was added to 100 parts of this product to obtain approximately the same cured material as that in Example 36.

Example 41

5.7 g of Sumidur 44s was added to 100 g of Preminol 4010, and they were reacted for 3 hours at 90° C. to produce a prepolymer. Then, a reaction product of 8.6 g of X-12-896 and 4.4 g of benzyl isothiocyanate was added to the above-described prepolymer, and reacted for 1 hour at 50° C. to produce a product. The properties and conditions of the resulted product were observed and isocyanate content was measured, and results thereof are shown in Table 11. The products were kept for 1 week and 2 weeks at 40° C., then, viscosity and isocyanate content were measured and results thereof are shown in Table 11.

Example 42

5.7 g of Desmojule was added to 100 g of Preminol 4010, and 5 ppm of Stann BL No. 918 was further added, and they were reacted for 3 hours at 90 to produce a prepolymer. Then, 0.45 g of ethylene glycol monobutyl ether (EGMBE) and 12.0 g of ($\Sigma$-1) were added to the above-described prepolymer, and reacted for 1 hour at 50° C. to produce a product. The properties and conditions of the resulted product were observed and isocyanate content was measured, and results thereof are shown in Table 11. The products were kept for 1 week and 2 weeks at 40° C., then, viscosity and isocyanate content were measured and results thereof are shown in Table 11.

Example 43

5.0 g of Desmojule was added to 100 g of Preminol 4010, and 5 ppm of Stann BL was further added, and they were reacted for 3 hours at 90° C. to produce a prepolymer. Then, 9.0 g of 338x and 4.0 g of ($\Sigma$-1) were added to the above-described prepolymer, and reacted for 1 hour at 50° C. to produce a product. The properties and conditions of the resulted product were observed and isocyanate content was measured, and results thereof are shown in Table 11. The products were kept for 1 week and 2 weeks at 40° C., then, viscosity and isocyanate content were measured and results thereof are shown in Table 11.

Example 44, 45

5.0 g of Sumidur 44S was added to 100 g of Preminol 4010, and they were reacted for 3 hours at 90 to produce a prepolymer. Then, a reaction product (Example 44) of 10.5 g of Plenact KR41B with 9.6 g of (1-1) or a reaction product (Example 45) of 5.2 g of Plenact KR 44 with 16.1 g of 2EHA was added to the above-described prepolymer, and reacted for 3 hour at 90° C. to produce products. The properties and conditions of the resulted products were observed and isocyanate contents were measured, and results thereof are shown in Table 11. The products were kept for 1 week and 2 weeks at 40° C., then, viscosity and isocyanate contents were measured and results thereof are shown in Table 11.

Example 46

8.7 g of Sumidur T-80 was added to 100 g of Premihol 5005, and they were reacted for 6 hours at 90° C. The mixture was cooled to 50° C. and 25 g of ($\Sigma$-1) was added and reacted for 1 hour at 50° C., then, cooled to room temperature, and 1 g of tetra-n-butoxytitanium and 1 g of KBM 1003 were added to produce a product. The properties and conditions of the resulted product were observed and isocyanate content was measured, and results thereof are shown in Table 12. The products were kept for 1 week and 2 weeks at 40° C., then, viscosity and isocyanate content were measured and results thereof are shown in Table 12. Further, the resulted product was left for 72 hours in air to obtain a cured material having elasticity.

Example 47

3.5 g of Sumidur T-80 was added to 100 g of Preminol 4010, and they were reacted for 6 hours at 90° C. Then, 0.2 g of ethanol was added and reacted for 1 hour at 90° C., then, the mixture was cooled to 50° C., and 4.2 g of KR 41B and 40 g of ($\Sigma$-1) were added and reacted for 3 hours at 80° C., then, the mixture was cooled to room temperature, and 1 g of tetrastearyloxytitanium and 1 g of KBM 1003 were added and reacted to produce a product. The properties and conditions of the resulted product were observed and isocyanate content was measured, and results thereof are shown in Table 12. The products were kept for 1 week and 2 weeks at 40° C., then, viscosity and isocyanate content were measured and results thereof are shown in Table 12.

Example 48

400 g of Preminol 4010 was charged into a reaction vessel and heated up to 90° C., and a mixture produced by adding 3 g of AIBN to 40 g of MMA, 80 g of BA, 0.5 g of hydroxypropyl acrylate and 3 g of KBM 803 was added dropwise at 80° C. over 4 hours, and 3 g of AIBN was further added and reacted for 1 hour at the same temperature. Then, the mixture was cooled to 50° C., and 14.8 g of Sumidur 44s was added, and reacted for 3 hours at 90° C. with stirring in nitrogen atmosphere, further, 60 g of ($\Sigma$-2) was added and reacted for 30 minutes to prepare a product. The properties and conditions of the resulted product were observed and isocyanate content was measured, and results thereof are shown in Table 12. The products were kept for 1 week and 2 weeks at 40° C., then, viscosity and isocyanate content were measured and results thereof are shown in Table 12. Further, 1 part of Stann BL was added to 100 parts of this product to obtain a cured material having elasticity.

Example 49

400 g of the product produced in Example 7 was charged into a reaction vessel and heated up to 80° C. in nitrogen atmosphere, then, a mixture produced by adding 3 g of AIBN to 40 g of MMA, 80 g of BA, 4 g of KBM 5103 and 3 g of KBM 803 was added dropwise at 80° C. over 4 hours, and 3 g of AIBN was further added and reacted for 1 hour at the same temperature to obtain a resin composition. The properties and conditions of the resulted product were observed and isocyanate content was measured, and results thereof are shown in Table 12. The products were kept for 1 week and 2 weeks at 40° C., then, viscosity and isocyanate content were measured and results thereof are shown in Table 12.

Example 50

400 g of the product produced in Example 7 was charged into a reaction vessel and heated up to 80° C. in nitrogen atmosphere, then, a mixture produced by adding 3 g of AIBN to 40 g of MMA, 80 g of alkyl(having 12 to 13 carbon atoms) methacrylate (tradename: Light Ester L-5, manufactured by Kyoei Kagakusha K.K.), 4 g of γ-methacryloylpropyltrimethoxisilane (trade name: KBM 503, manufactured by Shine-Etsu Chemical Co., Ltd.) and 3 g of KBM 803 was added dropwise at 80° C. over 4 hours, and 3 g of AIBN was further added and reacted for 1 hour at the same temperature to obtain a resin composition. The properties and conditions of the resulted product were observed and isocyanate content was measured, and results thereof are shown in Table 12. The products were kept for 1 week and 2 weeks at 40° C., then, viscosity and isocyanate content were measured and results thereof are shown in Table 12.

Example 51

Liquid A produced by mixing 100 parts of the product obtained in Example 3 and 5.0 parts of Ankamine K54 was mixed with liquid B produced by mixing at room temperature 50 parts of Epikote 828 and 2 parts of Stann BL to obtain a composition. This composition was harder than the cured material obtained in Example 3.

Example 52

100 parts of the product produced in Example 3, 30 parts of Epikote 828, 4 parts of a ketimine derivative, 2 parts of Stann BL and 2 parts of KBE 1003 were charged in this order into a reaction vessel, and mixed for 30 minutes at room temperature to obtain a composition.

Example 53

100 g of Preminol 4010 and 100 g of NS 2300 (the above-described calcium carbonate) were charged into a planetary mixer, and heated for dehydration for 1 hour at 110° C. The mixture was cooled to 50° C., and 4 g of Takenate 600 was charged in nitrogen flow and the mixture was heated up to 90° C., and reacted for 20 hours. Then, the mixture was cooled to 50° C. and 12 g of (Σ-2) was added to the mixture and reacted for 1 hour at 50° C. Then, the mixture was cooled to room temperature and 2 parts of Stann BL and a part by weight of KBM 1003 were added to produce a product. This product was left for 3 days to obtain a cured material having elasticity.

Example 54

One part of liquid A produced by stirring and mixing 100 parts of the product produced in Example 5, 20 parts of isobonyl acrylate and 2 parts of cumene hydroperoxide in an reaction vessel was mixed with one part of liquid B produced by stirring and mixing 50 parts of isobonyl acrylate, 3 parts of 2-hydroxy acrylate, 2 parts of ethylenethiourea and 2 parts of Stann BL in a reaction vessel, to obtain a room temperature-curing type 2-component composition.

Example 55

One part of liquid A produced by stirring and mixing 100 parts of the product produced in Example 5, 20 parts of isobonyl acrylate and 2 parts of cumene hydroperoxide in an reaction vessel was mixed with one part of liquid B produced by stirring and mixing 50 parts of the product produced in Example 5, 50 parts of isobonyl acrylate, 1 part of vanadium acetylacetonate, 0.5 parts of hydroquinone and 2 parts of Stann BL in a reaction vessel, to obtain a room temperature-curing type 2-component composition.

Example 56

One part of liquid A produced by stirring and mixing 100 parts of the product produced in Example 5 with a solution which had been produced by dissolving 0.1 part of chloroplatinic acid hexahydrate into 3 parts of ethanol was mixed with one part of liquid B produced by stirring and mixing 100 parts of the product produced in Example 5, 3 parts of tetramethyldisiloxane (trade name: T2030, manufactured by Chisso K.K.) and 2 parts of Stann BL, to obtain a heat-curing type 2-component composition.

Example 57

100 parts of HPVM 2203 was dehydrated for 1 hour at 110° C., then, cooled to 50° C. and 7.6 parts of Takenate 500 was added and reacted for 5 hours at 75° C.. Then, 8 parts of (Σ-1) was added and reacted for 1 hour at 75° C. The reaction product was a viscous liquid product.

Example 58

KBM 903 (221 g) and BA (128 g) were previously mixed and stirred for 1 hour at ambient temperature in nitrogen atmosphere, then, kept at 50° C. for 200 hours, and Desmojule I (222 g) was further added, and mixed and stirred for 1 hour, then, reacted for 2 hours at 50° C. to obtain a product. Then, 50 g of KBM 902 was added to 100 g of polypropylene glycol diacrylate (trade name: M-270, manufactured by Toagosei Co., Ltd.) and reacted for 2 days at 50° C., then, 1142 g of a reaction product produced in the above-described proportion was added and reacted for 2 hours at 50° C.. The reaction product was a viscous liquid product.

Example 59

Into a reaction vessel were charged 180 g of Dynacol 7360 and 420 g of Dynacol 7361, and dehydration was conducted under reduced pressure for 1 hour at 90° C., then, 45 g of Desmojule 1 and 0.05 g of Stann BL were added and reacted for 3 hours at 90 with stirring in nitrogen atmosphere, and 150 g of (W) was further added and reacted for 30 minutes at 80° C. Then, 1 g of Stann BL was added to produce a product. The reaction product was cured for 72 hours in air to obtain a tough cured material.

Example 60

A mixture of 50 parts of the product produced in Example 5, 100 parts of a modified silicone resin (trade name: S303, manufactured by Kaneka Corp.) and 1 part of Stann BL was left for 48 hours in air to obtain a cured material having elasticity.

Examples of preparation processes of the products Y and compositions containing the products Y will be shown below.

Compounds used in preparing the products Y are as shown below.

Compound (ab), Compound (eb), Compound (ib)
KBM 402 (γ-glycidoxypropylmethyldiethoxysilane)
KBM 603 (N-β(aminoethyl)γ-aminopropylmethoxysilane)
KBM 6063 (N-ζ(aminohexyl)γ-aminopropylmethyldimethoxysilane)
KBM 5102 (γ-acryloylpropylmethyldimethoxysilane)
(the above-described compounds are manufactured by Shin-Etsu Chemical Co., Ltd.)
KBE 903, KBM 903, KBM 902, KBM 5103, KBM 803, KBM 602, X-12-896 are compounds used in preparing the products X.

Compound (db), Compound (gb), Compound (jb)
MA (methyl acrylate)
BA (n-butyl acrylate)

(the above-described compounds are manufactured by Toagosei Co., Ltd.)
Light Ester HOA (2-hydroxyethyl acrylate)
Light Ester HO (2-hydroxyethyl methacrylate)
Light Acrylate 3EG-A (triethylene glycol diacrylate)
Light Ester G-201P (2-hydroxyl-3-acryloyloxypropyl methacrylate)
Epoxy Ester 70PA (acrylic acid addition product of propylene glycol diglycidyl ether)

(the above-described compounds are manufactured by Kyoeisha Kagaku K.K.)
PMI (phenylmaleimide)(manufactured by Nippon Shokubai)
2EHA is a compound used in preparing the products X.

Epoxy Resin
Epikote 828 (Bisphenol A type epoxy resin)(manufactured by Yuka Shell Corp.)

Polyol (Compound (c))
Preminol 4010, 3010, P-1000, P-3000 (these, are compounds used in preparing the products X.)

Polyisocyanate Compound (Compound (bb))
Sumidur HT (TMP adduct hexamethylene diisocyanate)
Sumidur N3200 (Biuret bonded hexamethylene diisocyanate)
Sumidur N3500 (isocyanurate bonded hexamethylene diisocyanate)

(the above-described compounds are manufactured by Sumitomo Beyer Urethane K.K.)
Sumidur 44S, Takenate 500, Takenate 600, Desmojule I and Sumidur T-80 are compound used in preparing the products X.

Polyamine Compound (Compound (e))
Jeffamine D-200 (manufactured by Texako Chemical Corp.)

Tin Catalyst
Stann BL, No. 918

Others
Commercially available reagents are used for all compounds.

Product Σ
The above-described compound (1) and/or compounds described below were charged in a reaction vessel, and mixed and stirred for 1 hour at room temperature in nitrogen atmosphere, then, kept for 200 hours at 50° C. to produce products Σ ((Σ-33) to (Σ-61)).

(Σ-33) KBM 602:(1-1)=206:292
(Σ-34) KBM 603:p-toluenesulfonyl isocyanate=222:197
(Σ-35) KBM 6063:(1-2)=278:266
(Σ-36) X-12-896:benzyl isocyanate=298:150
(Σ-37) sorbitol polyglycidyl ether:p-toluenesulfonyl isocyanate=406:197
(Σ-38) epoxy ester 70PA:p-toluenesulfonyl isocyanate=320:197
(Σ-39) 3-allyloxy-1,2-propanediol:p-toluenesulfonyl isocyanate=132:197
(Σ-40) 2-butyne-1,4-diol:p-toluenesulfonyl isocyanate=86:197
(Σ-41) KBM 903:BA=221:128
(Σ-42) KBM 902:acrylonitrile=205:53
(Σ-43) KBM 602:2EHA=206:368
(Σ-44) KBM 603:MA=222:172
(Σ-45) X-12-580:(1-1)=265:292
(Σ-46) (Σ-45):2EHA=557:184
(Σ-47) allylamine:BA=57:128
(Σ-48) propargylamine:MA=55:86
(Σ-49) KBM 5102:isopropylamine=200:59
(Σ-50) KBM 402:diisobutylamine=248:129
(Σ-51) KBM 802:phenylglycidyl ether=180:150
(Σ-52) KBM 5102:KBM 903=200:221
(Σ-53) KBM 802:KBM 402=180:248
(Σ-54) Epikote 828:KBM 802=380:180
(Σ-55) Light Acrylate 3EG-A:isopropylamine=258:59
(Σ-56) Light Ester G-201P:p-toluenesulfonyl isocyanate=202:197
(Σ-57) (Σ-56):isopropylamine=399:59
(Σ-58) glycidyl acrylate:n-octylmercaptane=128:146
(Σ-59) allylmercaptane:cyclohexene oxide=74:98
(Σ-60) KBM 903:phenylmaleimide=179:173
(Σ-61) (Σ-41): (Σ-42)=174.5:129

Then, isocyanate compounds (compound bb) described below were charge into a reaction vessel in proportions described below, and the above-described products Σ and compounds described below were added dropwise at room temperature in nitrogen atmosphere with mixing and stirring for 1 hour, then, they were reacted for 2 hours at 80° C. to obtain products Ω ((Ω-1) to (Ω-45)). The product Ω means a general term of the above-described products O, Q, S, U, V and W.

(Ω-1) (Σ-33):Sumidur 44S=498:250
(Ω-2) (Σ-34):Sumidur 44S=419:250
(Ω-3) (Σ-35):Sumidur 44S=544:250
(Ω-4) (Σ-36):Sumidur 44S=448:250
(Ω-5) (Σ-37):Sumidur 44S=603:250
(Ω-6) (Σ-38):Sumidur 44S=517:250
(Ω-7) (Σ-39):Sumidur 44S=329:250
(Ω-8) (Σ-40):Sumidur 44S=283:250
(Ω-9) (Σ-41):Desmojule I=349:222
(Ω-10) (Σ-42):Desmojule I=258:222
(Ω-11) (Σ-43):Desmojule I=574:222
(Ω-12) (Σ-44):Desmojule I=394:222
(Ω-13) (Σ-46):Desmojule I=741:222
(Ω-14) (Σ-47):Desmojule I=185:222
(Ω-15) (Σ-48):Desmojule I=141:222
(Ω-16) (Σ-49):Sumidur T-80=259:174
(Ω-17) (Σ-50):Sumidur T-80=377:174
(Ω-18) (Σ-51):Sumidur T-80=330:174
(Ω-19) (Σ-52):Sumidur T-80=421:174
(Ω-20) (Σ-53):Sumidur T-80=428:174
(Ω-21) (Σ-54):Sumidur T-80=560:174
(Ω-22) (Σ-55):Sumidur T-80=317:174
(Ω-23) (Σ-57):Sumidur T-80=458:174
(Ω-24) (Σ-58):Sumidur T-80=274:174
(Ω-25) (Σ-59):Sumidur T-80=172:174
(Ω-26) (Σ-60):Sumidur T-80=352:174
(Ω-27) (Σ-43):Sumidur N3200=1148:478
(Ω-28) (Σ-50):Sumidur HT=754:638
(Ω-29) (Σ-41):Sumidur N3500=698:504
(Ω-30) (Σ-43):Sumidur N3200=574:174
(Ω-31) (Σ-30):Light Ester HOA=748:116
(Ω-32) (Σ-30):Glycidol=748:74
(Ω-33) Glycidol:Takenate 500=74:188
(Ω-34) Light Ester HOA:Takenate 500=116:188
(Ω-35) Light Ester HO:Takenate 500=130:188
(Ω-36) KBM 903:Takenate 600=221:192
(Ω-37) KBM 803:Takenate 600=196:192
(Ω-38) Eugenol:Takenate 600=164:192
(Ω-39) allylalcohol:Takenate 600=58:192
(Ω-40) KBM 802:Sumidur 44S=180:250
(Ω-41) (Σ-61):Sumidur 44S=303.5:250
(Ω-42) (Σ-41):Sumidur 44S=174.5:250
(Ω-43) (Ω-42): (Σ-42)=424.5:129
(Ω-44) KBM 802:Sumidur 44S=90:250
(Ω-45) (Ω-44): (Σ-41)=340:174.5

Examples 61 to 102

Into a reaction vessel were charged polyol compounds shown in Tables 13 to 19 and the products Q in proportions shown in the tables, and they were reacted for 3 hours at 90° C. with stirring in nitrogen atmosphere to obtain products Y.

The properties and conditions of the resulted products Y were observed and isocyanate contents were measured, and results thereof are shown in the tables. The products were kept for 1 week and 2 weeks at 40° C., then, viscosity was measured and results thereof are shown in the tables.

As shown in the tables, it is known that any the resulted products Y exhibits excellent storage stability. From the results of Examples 100 and 101, it is known that intended resins can be obtained when (Σ-41) was previously mixed with (2-42) and reacted with Sumidur 44S, then, a polyol is reacted, or when Sumidur 44S is previously reacted with (Σ-41), then, (Σ-42) is reacted.

Further, 2 parts of a tin catalyst Stann BL was added to 100 parts of the resulted products Y-1 to Y-4, products Y-9 to Y-13, products Y-16 to Y21, products Y-26 to Y-31, products Y-35 to Y-36 or Products Y-39 to Y-42, respectively, and they were left for 100 hours under the conditions of a temperature of 23° C., and a relative humidity of 65%, to obtain cured materials having elasticity.

Examples 103

6 parts of (Σ-41) was added to 100 parts of the resulted product Y-32, and reacted for 2 hours at 90° C. to obtain a product Y-43. The properties and conditions of the resulted product Y-43 were observed and isocyanate content was measured, and results thereof are shown in Table 20. The product was kept for 1 week and 2 weeks at 40° C., then, viscosity was measured and results thereof are shown in Table 20.

Examples 104

400 g of the product Y-10 was charged into a reaction vessel, and heated up to 80° C. in nitrogen atmosphere, then, a mixture produced by adding 3 g of AIBN to 40 g of MMA, 80 g of BA, 4 g of KBM 5103 and 3 g of KBM 803 was added dropwise at 80° C. over 4 hours, and 3 g of AIBN was further added and reacted for 1 hour at the same temperature to obtain a product. The properties and conditions of the resulted product were observed and isocyanate content was measured, and results thereof are shown in Table 20. The product was kept for 1 week and 2 weeks at 40° C., then, viscosity was measured and results thereof are shown in Table 20.

Further, 1 part of a tin catalyst Stann BL was added to 100 parts of the resulted product and the mixture was left for 100 hours under the conditions of a temperature of 23° C. and a relative humidity of 65%, to obtain a cured material having higher toughness as compared with the cured material obtained in Example 70.

Example 105

Into a reaction vessel, 100 g of Preminol 4010 was added and heated up to 90° C. in nitrogen atmosphere, and a mixture produced by adding 1 g of AIBN to 10 g MMA, 20 g of BA, 1 g of KBM 5103 and 1 g KBM 803 was added dropwise over 4 hours at 80° C., 1 g of AIBN was further added and reacted at the same temperature for 1 hour. Then, the mixture was cooled to 50° C., 11 g of (Ω-9) was added, and they were reacted for 3 hours at 90° C. with stirring in nitrogen atmosphere to produce a product. The properties and conditions of the resulted product were observed and isocyanate content was measured, and results thereof are shown in Table 20. The products were kept for 1 week and 2 weeks at 40° C., then, viscosity and isocyanate content were measured and results thereof are shown in Table 20.

Further, 1 part of a tin catalyst Stann BL was added to 100 parts of the resulted product and the mixture was left for 100 hours under the conditions of a temperature of 23° C. and a relative humidity of 65%, to obtain a cured material having higher toughness like the cured material obtained in Example 104.

Example 106

100 g of Preminol 4010 and 100 g of NS 2300 were charged into a planetary mixer, and heated for dehydration for 1 hour at 110° C. The mixture was cooled to 50° C., and 11 g of (Ω-9) was charged in nitrogen flow and the mixture was heated up to 90° C., and reacted for 20 hours. Then, the mixture was cooled to 50° C. and 12 g of (Σ-2) was added and reacted for 1 hour at 50° C. Then, the mixture was cooled to room temperature and 2 g of Stann BL and 1 g of KBM 1003 were added to produce a product. This product was left for 100 hours under the conditions of a temperature of 23° C. and a relative humidity of 65%, to obtain a cured material having higher elasticity.

Example 107

Liquid A produced by mixing 100 parts of the product Y-9 and 5.0 parts of Ankamine K54 was mixed with liquid B produced by mixing at room temperature 50 parts of Epikote 828 and 2 parts of Stann BL to obtain a composition. This composition was harder than the cured material of the product Y-9.

Example 108

100 parts of the product Y-9, 30 parts of Epikote 828, 4 parts of a ketimine derivative, 2 parts of Stann BL and 2 parts of KBE 1003 were charged in this order into a reaction vessel, and mixed for 30 minutes at room temperature to obtain a composition. The resulted composition was left for 100 hours under the conditions of a temperature of 23° C. and a relative humidity of 65%, to obtain a cured material having higher toughness as compared with the cured material of the product Y-9.

Example 109

One part of liquid A produced by stirring and mixing 100 parts of the product Y-22, 20 parts of isobonyl acrylate and 2 parts of cumene hydroperoxide in an reaction vessel was mixed with one part of liquid B produced by stirring and mixing 50 parts of isobonyl acrylate, 3 parts of 2-hydroxy acrylate, 2 parts of ethylenethiourea and 2 parts of Stann BL in a reaction vessel, to obtain a room temperature-curing type 2-component composition.

Example 110

One part of liquid A produced by stirring and mixing 100 parts of the product Y-30, 20 parts of isobonyl acrylate and 2 parts of cumene hydroperoxide in an reaction vessel was mixed with one part of liquid B produced by stirring and mixing 50 parts of the product Y-33, 50 parts of isobonyl acrylate, 1 part of vanadium acetylacetonate, 0.5 parts of hydroquinon and 2 parts of Stann BL in a reaction vessel, to obtain a room temperature-curing type 2-component composition.

Example 111

One part of liquid A produced by stirring and mixing 100 parts of the product Y-30, 20 parts of isobonyl acrylate and 2 parts of cumene hydroperoxide in an reaction vessel, was mixed with one part of liquid B produced by stirring and mixing 50 parts of the product Y-6, 50 parts of isobonyl acrylate, 1 part of vanadium acetylacetonate, 0.5 parts of hydroquinone and 2 parts of Stann BL in a reaction vessel, to obtain a room temperature-curing type 2-component composition.

Example 112

One part of liquid A produced by stirring and mixing 100 parts of the product Y-7 with a solution which had been produced by dissolving 0.1 part of chloroplatinic acid hexahydrate into 3 parts of ethanol, was mixed with one part of liquid B produced by stirring and mixing 100 parts of the product Y-7, 3 parts of tetramethyldisiloxane (T2030) and 2 parts of Stann BL, to obtain a heat-curing type 2-component composition.

Example 113

One part of liquid A produced by stirring and mixing 100 parts of the product Y-8 with a solution which had been produced by dissolving 0.1 part of chloroplatinic acid hexahydrate into 3 parts of ethanol, was mixed with one part of liquid B produced by stirring and mixing 100 parts of the product Y-8, 3 parts of tetramethyldisiloxane (T2030) and 2 parts of Stann BL, to obtain a heat-curing type 2-component composition.

Example 114

100 parts of HPVM 2203 was dehydrated for 1 hour at 110, then, cooled to 50' and 55 parts of (Ω-9) was added and reacted for 1 hour at 75° C. The reaction product was a viscous liquid product.

Example 115

One part of liquid A produced by stirring and mixing 100 parts of Epikote 828 and 2 parts of Stann BL was mixed with one part of liquid B produced by reacting 5 parts of (Ω-5) with 100 parts of Jeffamine D-200 at room temperature for 2 hours, to obtain a 2-component reaction type epoxy resin having excellent curing property at lower temperature.

INDUSTRIAL APPLICABILITY

The urethane resin obtained by the process of the present invention is effective as a base resin for a reactive adhesive (including a hot melt adhesive and the like), sealing material and the like. It is guessed that requirement for no solvent in rubber systems, solvent systems and the like (for example, contact type use is considered in which an adhesive is applied on the both surfaces of substrates, and when a certain length of open time lapses and tack is generated, the substrates are contacted) will be raised from now on in view of environment, and the resin obtained by the present invention and the resin composition of the present invention using this resin are also effective as means for responding to such requirement.

The process of the resent invention is also effective particularly in the preparation of an adhesive since it can easily produces such resin having the excellent properties as described above.

TABLE 1

|  | Example 1 | Example 1 | Example 1 | Example 1 | Example 1 | Example 1 |
|---|---|---|---|---|---|---|
| Preminol 4010 | 100 | 100 | 100 | 100 | 100 | 100 |
| Sumidur 44S | 12.2 | 7.4 | 5.7 | 5.7 | 5.7 | 5.7 |

TABLE 1-continued

|  | Example 1 | Example 1 | Example 1 | Example 1 | Example 1 | Example 1 |
|---|---|---|---|---|---|---|
| Product Σ |  |  |  |  |  |  |
| (Σ-1) | 27.5 | 20.0 | 20.0 |  |  |  |
| (Σ-2) |  |  |  | 15.0 |  |  |
| (Σ-3) |  |  |  |  | 13.0 |  |
| (Σ-4) |  |  |  |  |  | 18.0 |
| Product X |  |  |  |  |  |  |
| Viscosity (23° C., mPa · S) |  |  |  |  |  |  |
| after one week (40° C.) | 27500 | 19600 | 8300 | 13500 | 14500 | 18000 |
| after two weeks (40° C.) | 27000 | 19000 | 8050 | 13250 | 14500 | 19000 |
| NCO content (%) | 0 | 0 | 0 | 0 | 0 | 0 |
| directly after | Colorless | Colorless | Colorless | Colorless | White | Colorless |
| Property and condition | transparent liquid | transparent liquid | transparent liquid | transparent liquid | liquid | transparent liquid |

TABLE 2

|  | Example 7 | Example 8 | Example 9 | Example 10 | Example 11 | Example 12 |
|---|---|---|---|---|---|---|
| Preminol 4010 | 100 | 100 | 100 | 100 | 100 | 100 |
| Sumidur 44S | 4.1 | 5.7 | 5.7 | 5.7 | 5.7 | 5.7 |
| Product Σ |  |  |  |  |  |  |
| (Σ-2) | 15.0 |  |  |  |  |  |
| (Σ-5) |  | 27.5 |  |  |  |  |
| (Σ-6) |  |  | 12.0 |  |  |  |
| (Σ-7) |  |  |  | 13.4 |  |  |
| (Σ-8) |  |  |  |  | 17.4 |  |
| (Σ-9) |  |  |  |  |  | 17.7 |
| Product X |  |  |  |  |  |  |
| Viscosity (23° C., mPa · S) |  |  |  |  |  |  |
| after one week (40° C.) | 8500 | 15000 | 12450 | 17400 | 67000 | 14500 |
| after two weeks (40° C.) | 9200 | 14000 | 12000 | 17700 | 67000 | 14500 |
| NCO content (%) | 0 | 0 | 0 | 0 | 0 | 0 |
| directly after | Colorless | Colorless | White | Yellow | Colorless | Pale yellow |
| Property and condition | transparent liquid | transparent liquid | liquid | liquid | transparent liquid | liquid |

TABLE 3

|  | Example 13 | Example 14 | Example 15 | Example 16 | Example 17 | Example 18 |
|---|---|---|---|---|---|---|
| Preminol 4010 | 100 | 100 | 100 | 100 | 100 | 100 |
| P-1000 |  |  |  |  | 20 |  |
| Sumidur 44S | 5.7 | 5.7 | 5.7 | 5.7 | 11.3 |  |
| Takenate 500 |  |  |  |  |  | 5.0 |
| Product Σ |  |  |  |  |  |  |
| (Σ-10) | 18.0 |  |  |  |  |  |
| (Σ-11) |  | 20.0 |  |  |  |  |
| (Σ-12) |  |  | 16.0 |  |  |  |
| (Σ-13) |  |  |  | 16.0 |  |  |
| (Σ-4) |  |  |  |  | 20.0 | 15.0 |
| Product X |  |  |  |  |  |  |
| Viscosity (23° C., mPa · S) |  |  |  |  |  |  |
| after one week (40° C.) | 9200 | 9000 | 12000 | 16500 | 24000 | 9000 |
| after two weeks (40° C.) | 9000 | 9000 | 12000 | 16500 | 24500 | 9500 |
| NCO content (%) | 0 | 0 | 0 | 0 | 0 | 0 |
| directly after | Colorless | Colorless | White | Yellow | Colorless | Colorless |
| Property and condition | transparent liquid | transparent liquid | liquid | liquid | transparent liquid | transparent liquid |

TABLE 4

|  | Example 19 | Example 20 | Example 21 | Example 22 | Comparative Example 12 |
|---|---|---|---|---|---|
| Preminol 4010 | 100 | 100 | 100 | 100 | 100 |
| Preminol 3010 |  | 30 |  |  |  |
| Takenate 600 | 4.4 |  |  |  |  |
| Sumidur 44S |  | 10.0 | 5.7 | 5.7 | 5.7 |
| Product Σ |  |  |  |  |  |
| (Σ-2) | 16.0 |  |  |  |  |
| (Σ-14) |  | 13.4 |  |  |  |
| (Σ-17) |  |  | 13.0 |  |  |
| (Σ-18) |  |  |  |  | 10.1 |
| (Σ-19) |  |  |  | 14.7 |  |
| Product X |  |  |  |  |  |
| Viscosity (23° C., mPa · S) |  |  |  |  |  |
| after one week (40° C.) | 7500 | 80000 | 10000 | 18000 | 15000 |
| after two weeks (40° C.) | 7800 | 85000 | 10000 | 18500 | 27000 |
| NCO content (%) | 0 | 0 | 0 | 0 | 0 |
| directly after |  |  |  |  |  |
| Property and condition | Colorless transparent liquid | Opalescent liquid | Opalescent liquid | Colorless transparent liquid | Colorless transparent liquid |

TABLE 5

|  | Comparative Example 1 | Comparative Example 2 | Comparative Example 3 | Comparative Example 4 | Comparative Example 5 |
|---|---|---|---|---|---|
| Preminol 4010 | 100 | 100 | 100 | 100 | 100 |
| Sumidur 44S | 5.7 | 5.7 | 7.4 |  |  |
| Desmojule I |  |  |  | 5.0 |  |
| Takenate 600 |  |  |  |  | 4.4 |
| KBM903 | 6.5 |  |  |  |  |
| Final product |  |  |  |  |  |
| Viscosity (23° C., mPa · S) |  |  |  |  |  |
| after one week (40° C.) | Generation of gel | 14000 | 17000 | 5000 | 6000 |
| after two weeks (40° C.) | directly after reaction | 28000 | 30000 | 5500 | 6500 |
| NCO content (%) | — | 1.6 | 1.9 | 1.7 | 1.8 |
| directly after | — | 1.3 | 1.7 | 1.6 | 1.7 |
| after one week (40° C.) | — | 1.1 | 1.2 | 1.5 | 1.7 |
| after two weeks (40° C.) | — | Colorless transparent liquid | Colorless transparent liquid | Colorless transparent liquid | Colorless transparent liquid |
| Property and condition |  |  |  |  |  |

TABLE 6

|  | Comparative Example 6 | Comparative Example 7 | Comparative Example 8 | Comparative Example 9 | Comparative Example 10 |
|---|---|---|---|---|---|
| Preminol 4010 | 100 | 100 | 100 | 100 | 100 |
| Preminol 3010 | 30 | 30 |  |  |  |
| Sumidur 44S | 10 | 10 | 7.4 |  |  |
| Desmojule I |  |  |  | 5.0 |  |
| Takenate 600 |  |  |  |  | 4.4 |
| Product Σ |  |  |  |  |  |
| (Σ-15) | 13.4 |  |  |  |  |
| (Σ-16) |  | 13.4 |  |  |  |
| (Σ-2) |  |  | 10.0 | 9.0 | 9.0 |
| Final product |  |  |  |  |  |
| Viscosity (23° C., mPa · S) |  |  |  |  |  |
| after one week (40° C.) | 166000 | 120000 | 8000 | 9200 | 70000 |
| after two weeks (40° C.) | 240000 | 178000 | 16000 | 13500 | 120000 |
| NCO content (%) | 0.17 | 0.22 | 0.62 | 0.84 | 0.18 |
| directly after | 0.03 | 0.02 | 0.44 | 0.53 | 0.10 |
| after one week (40° C.) | 0.01 | 0.01 | 0.33 | 0.35 | 0.09 |

TABLE 6-continued

|  | Comparative Example 6 | Comparative Example 7 | Comparative Example 8 | Comparative Example 9 | Comparative Example 10 |
|---|---|---|---|---|---|
| after two weeks (40° C.) Property and condition | Opalescent liquid | Opalescent liquid | Colorless transparent liquid | Colorless transparent liquid | Colorless transparent liquid |

TABLE 7

| Name of product X | Example 4 | Example 5 | Example 6 | Example 13 | Example 21 | Example 11 |
|---|---|---|---|---|---|---|
| Amount used of the above-mentioned product | 100 | 100 | 100 | 100 | 100 | 100 |
| Amount used of NS2300 (g) | 100 | 100 | 100 | 100 | 100 | 100 |
| Amount used of No. 918 (g) | 4 | 4 | 4 | 4 | 4 | 4 |
| Amount used of KBM 603 (g) |  |  |  | 1 |  |  |
| Surface tension time | within 10 minutes | within 10 minutes | within 10 minutes | within 1 hour | within 10 minutes | not cured |
| Storage elasticity coefficient (G') (Pa) | $9 \times 10^3$ | $1 \times 10^4$ | $1 \times 10^4$ | $1 \times 10^4$ | $2 \times 10^3$ | — |
| Loss elasticity coefficient (G") (Pa) | $9 \times 10^2$ | $1 \times 10^3$ | $2 \times 10^3$ | $2 \times 10^3$ | $6 \times 10^2$ | — |
| $\tan\delta_1$ (° C.) | −65.9 | −62.7 | −70.1 | −63.8 | −65.9 | — |
| $\tan\delta_2$ (° C.) | −32.5 | −31.1 | −38.8 | −37.0 | −32.5 | — |

TABLE 8

|  | Example 23 | Example 24 | Example 25 | Example 26 | Example 27 | Example 28 |
|---|---|---|---|---|---|---|
| Preminol 4010 | 100 | 100 | 100 |  | 100 | 100 |
| P-1000 | 10 |  |  |  |  |  |
| P-3000 |  |  |  | 100 |  |  |
| Sumidur 44S | 8.5 | 5.7 | 5.7 | 15.4 | 6.0 | 5.7 |
| Product Σ |  |  |  |  |  |  |
| (Σ-18) | 22.1 |  |  |  |  |  |
| (1-1) | 10.5 | 11.8 | 12.1 |  |  |  |
| (Σ-20) |  | 20.0 |  |  |  |  |
| (Σ-21) |  |  | 19.0 |  |  |  |
| (Σ-22) |  |  |  | 30 |  |  |
| (Σ-24) |  |  |  |  | 28.2 |  |
| (Σ-25) |  |  |  |  |  | 30.0 |
| Product X Viscosity (23° C., mPa·S) |  |  |  |  |  |  |
| after one week (40° C.) | 85000 | 120000 | 910000 | 280000 | 1220000 | 24000 |
| after two weeks (40° C.) | 87000 | 120500 | 915000 | 278000 | 1225000 | 24000 |
| NCO content (%) | 0 | 0 | 0 | 0 | 0 | 0 |
| directly after Property and condition | Yellow transparent liquid | white viscous liquid | White transparent liquid | pale red liquid | Yellow transparent liquid | White transparent liquid |

TABLE 9

|  | Example 29 | Example 30 | Example 31 | Example 32 | Example 33 | Example 34 |
|---|---|---|---|---|---|---|
| Preminol 4010 | 100 | 100 | 100 | 100 | 100 | 100 |
| Sumidur 44S | 15.5 | 6.0 | 5.7 | 5.7 | 5.0 | 5.0 |
| Product Σ |  |  |  |  |  |  |
| (Σ-26) | 30.0 |  |  |  |  |  |
| (Σ-28) |  | 30.0 |  |  |  |  |
| (Σ-29) |  |  | 20.0 |  |  |  |
| (Σ-30) |  |  |  | 18.0 |  |  |
| (Σ-31) |  |  |  |  | 12.0 |  |
| (Σ-32) |  |  |  |  |  | 14.0 |
| Product X Viscosity (23° C., mPa·S) |  |  |  |  |  |  |
| after one week (40° C.) | 26000 | 32500 | 280000 | 1220000 | 78000 | 85000 |
| after two weeks (40° C.) | 26500 | 32000 | 278000 | 1225000 | 78500 | 87000 |
| NCO content (%) | 0 | 0 | 0 | 0 | 0 | 0 |

TABLE 9-continued

|  | Example 29 | Example 30 | Example 31 | Example 32 | Example 33 | Example 34 |
| --- | --- | --- | --- | --- | --- | --- |
| directly after Property and condition | white viscous liquid | transparent liquid | White transparent liquid | White transparent liquid | Colorless transparent liquid | Colorless transparent liquid |

TABLE 10

|  | Example 35 | Example 36 | Example 37 | Example 38 | Example 39 |
| --- | --- | --- | --- | --- | --- |
| Preminol 4010 | 100 | 100 | 100 | 100 | 100 |
| Sumidur 44S | 5.7 | 7.4 | 5.0 | 5.7 | 5.0 |
| Product Σ |  |  |  |  |  |
| (Σ-1) |  | 15.0 | 10.0 | 10.0 | 15.0 |
| 2-hydroxyethyl acrylate | 2.0 |  |  |  |  |
| KBM902 | 3.9 |  |  |  |  |
| Glycidol |  | 1.4 |  | 0.3 | 1.4 |
| KBM 802 |  |  | 3.4 |  |  |
| Ketimine compound |  |  |  | 0.05 | 0.3 |
| KBM 1003 |  |  |  | 2 | 2 |
| Stann BL |  |  |  | 0.2 | 0.2 |
| Product X Viscosity (23° C., mPa · S) |  |  |  |  |  |
| after one week (40° C.) | 31000 | 16000 | 15000 | 27000 | 35000 |
| after two weeks (40° C.) | 32000 | 16000 | 15500 | 31000 | 38000 |
| NCO content (%) | 0 | 0 | 0 | 0 | 0 |
| directly after Property and condition | White transparent liquid | White transparent liquid | White transparent liquid | White transparent liquid | White transparent liquid |

TABLE 11

|  | Example 40 | Example 41 | Example 42 | Example 43 | Example 44 | Example 45 |
| --- | --- | --- | --- | --- | --- | --- |
| Product X Viscosity (23° C., mPa · S) |  |  |  |  |  |  |
| after one week (40° C.) | 170000 | 26000 | 51000 | 61000 | 58000 | 38000 |
| after two weeks (40° C.) | 175000 | 26500 | 53000 | 63000 | 62000 | 41000 |
| NCO content (%) | 0 | 0 | 0 | 0 | 0 | 0 |
| directly after Property and condition | White liquid | Colorless transparent liquid | Colorless transparent liquid | Colorless transparent liquid | Colorless transparent liquid | Colorless transparent liquid |

TABLE 12

|  | Example 46 | Example 47 | Example 40 | Example 49 | Example 50 |
| --- | --- | --- | --- | --- | --- |
| Product X Viscosity (23° C., mPa · S) |  |  |  |  |  |
| after one week (40° C.) | 120000 | 28000 | 175000 | 150000 | 58000 |
| after two weeks (40° C.) | 125000 | 32000 | 176000 | 160000 | 62000 |
| NCO content (%) | 0 | 0 | 0 | 0 | 0 |
| directly after Property and condition | Colorless transparent liquid | Colorless transparent liquid | White liquid | White liquid | White liquid |

TABLE 13

|  | Example 61 | Example 62 | Example 63 | Example 64 | Example 65 | Example 66 |
| --- | --- | --- | --- | --- | --- | --- |
| Preminol 4010 | 100 | 100 | 100 | 100 | 100 | 100 |
| Product (Ω-1) | 14 |  |  |  |  |  |
| (Ω-2) |  | 13 |  |  |  |  |
| (Ω-3) |  |  | 15 |  |  |  |
| (Ω-4) |  |  |  | 13 |  |  |

TABLE 13-continued

|  | Example 61 | Example 62 | Example 63 | Example 64 | Example 65 | Example 66 |
|---|---|---|---|---|---|---|
| (Ω-5) |  |  |  |  | 17 |  |
| (Ω-6) |  |  |  |  |  | 15 |
| Product Y | Y-1 | Y-2 | Y-3 | Y-4 | Y-5 | Y-6 |
| Viscosity (23° C., mPa · S) |  |  |  |  |  |  |
| after one week (40° C.) | 10000 | 11000 | 35000 | 20000 | 25000 | 18000 |
| after two weeks (40° C.) | 10500 | 11500 | 37000 | 20500 | 27000 | 18500 |
| NCO content (%) | 0 | 0 | 0 | 0 | 0 | 0 |
| directly after Property and condition | Colorless transparent liquid | Colorless transparent liquid | Yellow transparent liquid | Colorless transparent liquid | Yellow transparent liquid | Yellow transparent liquid |

TABLE 14

|  | Example 67 | Example 68 | Example 69 | Example 70 | Example 71 | Example 72 |
|---|---|---|---|---|---|---|
| Preminol 4010 | 100 | 100 | 100 | 100 | 100 | 100 |
| Product (Ω-7) | 11 |  |  |  |  |  |
| (Ω-8) |  | 10 |  |  |  |  |
| (Ω-9) |  |  | 11 |  |  |  |
| (Ω-10) |  |  |  | 9 |  |  |
| (Ω-11) |  |  |  |  | 15 |  |
| (Ω-12) |  |  |  |  |  | 12 |
| Product Y | Y-7 | Y-8 | Y-9 | Y-10 | Y-11 | Y-12 |
| Viscosity (23° C., mPa · S) |  |  |  |  |  |  |
| after one week (40° C.) | 45000 | 10000 | 40000 | 26000 | 15000 | 12000 |
| after two weeks (40° C.) | 47500 | 10500 | 43000 | 28000 | 16000 | 13000 |
| NCO content (%) | 0 | 0 | 0 | 0 | 0 | 0 |
| directly after Property and condition | Yellow transparent liquid | Yellow transparent liquid | Yellow transparent liquid | Colorless transparent liquid | Colorless transparent liquid | White liquid |

TABLE 15

|  | Example 73 | Example 74 | Example 75 | Example 76 | Example 77 | Example 78 |
|---|---|---|---|---|---|---|
| Preminol 4010 | 100 | 100 | 100 | 100 | 100 | 100 |
| Product (Ω-13) | 19 |  |  |  |  |  |
| (Ω-14) |  | 8 |  |  |  |  |
| (Ω-15) |  |  | 7 |  |  |  |
| (Ω-16) |  |  |  | 8 |  |  |
| (Ω-17) |  |  |  |  | 11 |  |
| (Ω-18) |  |  |  |  |  | 10 |
| Product Y | Y-13 | Y-14 | Y-15 | Y-16 | Y-17 | Y-18 |
| Viscosity (23° C., mPa · S) |  |  |  |  |  |  |
| after one week (40° C.) | 20000 | 38000 | 85000 | 44000 | 33000 | 24000 |
| after two weeks (40° C.) | 21000 | 40000 | 87000 | 45000 | 35000 | 24500 |
| NCO content (%) | 0 | 0 | 0 | 0 | 0 | 0 |
| directly after Property and condition | Colorless transparent liquid | Colorless transparent liquid | Colorless transparent liquid | Colorless transparent liquid | Yellow transparent liquid | Colorless transparent liquid |

TABLE 16

|  | Example 79 | Example 80 | Example 81 | Example 82 | Example 83 | Example 84 |
|---|---|---|---|---|---|---|
| Preminol 4010 | 100 | 100 | 100 | 100 | 100 | 100 |
| Product (Ω-19) | 11 |  |  |  |  |  |
| (Ω-20) |  | 12 |  |  |  |  |
| (Ω-21) |  |  | 14 |  |  |  |
| (Ω-22) |  |  |  | 9 |  |  |
| (Ω-23) |  |  |  |  | 12 |  |
| (Ω-24) |  |  |  |  |  | 8 |
| Product Y | Y-19 | Y-20 | Y-21 | Y-22 | Y-23 | Y-24 |
| Viscosity (23° C., mPa · S) |  |  |  |  |  |  |
| after one week (40° C.) | 15000 | 19000 | 60000 | 58000 | 85000 | 32000 |
| after two weeks (40° C.) | 15000 | 20500 | 61000 | 59000 | 87000 | 32050 |

TABLE 16-continued

|  | Example 79 | Example 80 | Example 81 | Example 82 | Example 83 | Example 84 |
|---|---|---|---|---|---|---|
| NCO content (%) | 0 | 0 | 0 | 0 | 0 | 0 |
| directly after Property and condition | Yellow transparent liquid | Yellow transparent liquid | Colorless transparent liquid | Yellow transparent liquid | Colorless transparent liquid | Colorless transparent liquid |

TABLE 17

|  | Example 85 | Example 86 | Example 87 | Example 88 | Example 89 | Example 90 |
|---|---|---|---|---|---|---|
| Preminol 4010 | 100 | 100 | 100 | 100 | 100 | 100 |
| Product (Ω-25) | 6 |  |  |  |  |  |
| (Ω-26) |  | 10 |  |  |  |  |
| (Ω-27) |  |  | 32 |  |  |  |
| (Ω-28) |  |  |  | 27 |  |  |
| (Ω-29) |  |  |  |  | 24 |  |
| (Ω-31) |  |  |  |  |  | 17 |
| Product Y | Y-25 | Y-26 | Y-27 | Y-28 | Y-29 | Y-30 |
| Viscosity (23° C., mPa · S) |  |  |  |  |  |  |
| after one week (40° C.) | 47000 | 16000 | 55000 | 24000 | 34000 | 16000 |
| after two weeks (40° C.) | 47000 | 16500 | 56000 | 25000 | 38000 | 17000 |
| NCO content (%) | 0 | 0 | 0 | 0 | 0 | 0 |
| directly after Property and condition | Yellow transparent liquid | Yellow transparent liquid | Yellow transparent liquid | Yellow transparent liquid | Yellow transparent liquid | Yellow transparent liquid |

TABLE 18

|  | Example 91 | Example 92 | Example 93 | Example 94 | Example 95 | Example 96 |
|---|---|---|---|---|---|---|
| Preminol 4010 | 100 | 100 | 100 | 100 | 100 | 100 |
| Product (Ω-32) | 16 |  |  |  |  |  |
| (Ω-33) |  | 5 |  |  |  |  |
| (Ω-34) |  |  | 6 |  |  |  |
| (Ω-35) |  |  |  | 6 |  |  |
| (Ω-36) |  |  |  |  | 8 |  |
| (Ω-37) |  |  |  |  |  | 7 |
| Product Y | Y-31 | Y-32 | Y-33 | Y-34 | Y-35 | Y-36 |
| Viscosity (23° C., mPa · S) |  |  |  |  |  |  |
| after one week (40° C.) | 31000 | 19000 | 35000 | 26000 | 12000 | 14000 |
| after two weeks (40° C.) | 33000 | 20000 | 35500 | 28000 | 13000 | 16000 |
| NCO content (%) | 0 | 0 | 0 | 0 | 0 | 0 |
| directly after Property and condition | Yellow transparent liquid | Yellow transparent liquid | Yellow transparent liquid | Colorless transparent liquid | Colorless transparent liquid | Colorless transparent liquid |

TABLE 19

|  | Example 97 | Example 98 | Example 99 | Example 100 | Example 101 | Example 102 |
|---|---|---|---|---|---|---|
| Preminol 4010 | 100 | 100 | 100 | 100 | 100 | 100 |
| Product (Ω-38) | 7 |  |  |  |  |  |
| (Ω-39) |  | 5 |  |  |  |  |
| (Ω-40) |  |  | 6 |  |  |  |
| (Ω-41) |  |  |  | 6 |  |  |
| (Ω-43) |  |  |  |  | 8 |  |
| (Ω-45) |  |  |  |  |  | 7 |
| Product Y | Y-37 | Y-38 | Y-39 | Y-40 | Y-41 | Y-42 |
| Viscosity (23° C., mPa · S) |  |  |  |  |  |  |
| after one week (40° C.) | 46000 | 17000 | 35000 | 68000 | 65000 | 50000 |
| after two weeks (40° C.) | 47000 | 18500 | 37000 | 70000 | 67000 | 55000 |
| NCO content (%) | 0 | 0 | 0 | 0 | 0 | 0 |
| directly after Property and condition | Yellow transparent liquid | Yellow transparent liquid | Colorless transparent liquid | Colorless transparent liquid | Colorless transparent liquid | Colorless transparent liquid |

TABLE 20

| | Example 103 | Example 104 | Example 105 |
|---|---|---|---|
| Preminol 4010 | 100 | 100 | 100 |
| Product Y | Y-43 | | |
| Viscosity (23° C., mPa · S) | | | |
| after one week (40° C.) | 65000 | 110000 | 150000 |
| after two weeks (40° C.) | 70000 | 120000 | 155000 |
| NCO content (%) | 0 | 0 | 0 |
| directly after Property and condition | Colorless transparent liquid | White liquid | White liquid |

The invention claimed is:

1. A process for the preparation of urethane resins comprising the steps of:
    (1) reacting a compound (compound(ab)) having at least one active hydrogen being reactive with an isocyanate group in one molecule and having 1 to 10 silicon atoms directly bonded to an alkoxy group with a compound(i) selected from the group consisting of an α, β-unsaturated carbonyl compound and an α, β-unsaturated nitrile compound, in order to produce a product(N) which has active hydrogen being reactive with an isocyanate group in one molecule, the number of active hydrogens in one molecule being less than two;
    (2) reacting said product(N), with a compound(j) in order to obtain a silicon compound (product(O)) which has isocyanate groups in one molecule, the number of isocyanate groups in one molecule being less than two and which has a hydrolysable alkoxy group directly bonded to at least one silicon atom, wherein said compound (j) has at least two isocyanate groups; and
    (3) reacting said product(O), with a polyol compound (compound(c)).

2. The process for the preparation of urethane resins according to claim 1, wherein said at least one active hydrogen of compound(ab) is a hydrogen of a group selected from the group consisting of a primary amino group and a secondary amino group.

3. A process for the preparation of urethane resins comprising the steps of:
    (1) reacting a compound(eb) with a compound(fb) and further reacting with a compound(i) in order to obtain a silicon compound (product(R)), or after reacting said compound(eb) with said compound(fb), further reacting with a compound(i) in order to obtain the silicon compound (product(R)), the silicon compound (product (R)) having an alkoxy group directly bonded to at least one silicon atom and which has secondary amino groups in one molecule, the number of secondary amino groups in one molecule being less than two, wherein, said compound(eb) is a silicon compound having at least one acryloyl group (organic group (VIII)) and having an alkoxy group bonded to at least one silicon atom, wherein, said compound(fb) is capable of reacting with said organic group(VIII) to form a secondary amino compound, and wherein, said compound(i) is selected from the group consisting of an α, β-unsaturated carbonyl compound and an α, β-unsaturated nitrile compound;
    (2) reacting said product(R), with a compounds) having at least two isocyanate groups, in order to produce a silicon compound (product(S)) having at least one alkoxy group directly bonded to at least one silicon atom and having an isocyanate group, the number of which is less than two; and
    (3) reacting said product(S), with a polyol compound (compound(c)).

4. The process for the preparation of the urethane resins according to claim 3, wherein the said compound(fb) is a compound having a primary amino group.

* * * * *